United States Patent
Li et al.

(10) Patent No.: US 10,292,082 B2
(45) Date of Patent: May 14, 2019

(54) BACKHAUL LINK ESTABLISHMENT METHOD, BASE STATION, AND DEVICE

(71) Applicant: Huawei Technologies Co., Ltd., Shenzhen, Guangdong (CN)

(72) Inventors: Mingchao Li, Beijing (CN); Xin Xiong, Beijing (CN); Yi Shi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 15/678,467

(22) Filed: Aug. 16, 2017

(65) Prior Publication Data
US 2017/0347302 A1    Nov. 30, 2017

Related U.S. Application Data

(63) Continuation of application No. PCT/CN2015/073218, filed on Feb. 17, 2015.

(51) Int. Cl.
| | |
|---|---|
| *H04W 36/22* | (2009.01) |
| *H04W 16/04* | (2009.01) |
| *H04W 76/10* | (2018.01) |
| *H04W 40/22* | (2009.01) |
| *H04W 28/08* | (2009.01) |
| *H04W 76/22* | (2018.01) |
| *H04W 76/12* | (2018.01) |

(Continued)

(52) U.S. Cl.
CPC .......... *H04W 36/22* (2013.01); *H04W 16/04* (2013.01); *H04W 28/085* (2013.01); *H04W 40/22* (2013.01); *H04W 76/10* (2018.02); *H04W 76/12* (2018.02); *H04W 76/22* (2018.02); *H04W 36/125* (2018.08); *H04W 36/385* (2013.01); *H04W 84/045* (2013.01); *H04W 88/04* (2013.01); *Y02D 70/00* (2018.01)

(58) Field of Classification Search
CPC ..................................................... H04W 36/22
See application file for complete search history.

(56) References Cited

U.S. PATENT DOCUMENTS

| | | | |
|---|---|---|---|
| 2010/0046418 A1 | 2/2010 | Horn et al. | |
| 2012/0082073 A1* | 4/2012 | Andreasen | H04L 12/4633 370/310 |

(Continued)

FOREIGN PATENT DOCUMENTS

| | | |
|---|---|---|
| CN | 103354655 A | 10/2013 |
| CN | 104113881 A | 10/2014 |

(Continued)

*Primary Examiner* — John D Blanton

(57) ABSTRACT

The present disclosure provides a backhaul link establishment method, a base station, and a device. The method includes: sending, by a base station, an offloading bearer request message to a first LPN according to a backhaul offloading establishment request message; receiving, by the base station, an offloading bearer acknowledgement message sent by the first LPN; sending, by the base station, an offloading bearer configuration message to a first UE-relay; and sending, by the base station, a received ID of a service bearer and received second S1 configuration information of the service bearer to a core network element by using an MME. In this way, backhaul load on uplink/downlink resources of the base station is reduced.

20 Claims, 17 Drawing Sheets

(51) Int. Cl.
   *H04W 36/38* (2009.01)
   *H04W 84/04* (2009.01)
   *H04W 88/04* (2009.01)
   *H04W 36/12* (2009.01)

(56) References Cited

U.S. PATENT DOCUMENTS

| | | |
|---|---|---|
| 2012/0322363 A1 | 12/2012 | Tsubouchi et al. |
| 2013/0148558 A1 | 6/2013 | Malladi et al. |
| 2013/0229942 A1 | 9/2013 | Kubota |
| 2014/0177840 A1 | 6/2014 | Liu |
| 2015/0045032 A1 | 2/2015 | Tomici et al. |
| 2015/0092688 A1 | 4/2015 | Jeong et al. |
| 2015/0257024 A1* | 9/2015 | Baid .................... H04W 24/10 370/338 |
| 2016/0050646 A1 | 2/2016 | Wang |
| 2017/0325276 A1 | 11/2017 | Aminaka et al. |

FOREIGN PATENT DOCUMENTS

| | | |
|---|---|---|
| JP | 2015-500606 A | 1/2015 |
| KR | 10-2013-0106326 A | 9/2013 |
| KR | 10-2014-0073377 A | 6/2014 |
| KR | 10-2014-0136512 A | 11/2014 |
| WO | 2010/143625 A1 | 12/2010 |
| WO | 2011/111214 A1 | 9/2011 |
| WO | 2012/073410 A1 | 6/2012 |
| WO | 2013/142361 A1 | 9/2013 |
| WO | 2014/000128 A1 | 1/2014 |
| WO | 2014/014776 A1 | 1/2014 |
| WO | 2014054200 A1 | 4/2014 |
| WO | 2014145845 A1 | 9/2014 |
| WO | 2014/169718 A1 | 10/2014 |

* cited by examiner

```
┌─────────────────────────────────────────────────────────────┐
│ A base station receives a backhaul offloading establishment │
│ request message sent by an MME, where the backhaul          │
│ offloading establishment request message includes an ID of  │
│ a first LPN, an ID of a first UE-relay, an ID of a first    │
│ to-be-established bearer of the first LPN, first S1         │
│ configuration information of the first to-be-established    │
│ bearer, and an indicator for a QoS requirement that the     │
│ first to-be-established bearer needs to meet, the first LPN │
│ is one of at least one LPN, and the first UE-relay is one   │
│ of at least one UE-relay                                    │
└─────────────────────────────────────────────────────────────┘  S101
                              │
                              ▼
┌─────────────────────────────────────────────────────────────┐
│ The base station sends an offloading bearer request message │
│ to the first LPN according to the ID of the first LPN,      │
│ where the offloading bearer request message carries the ID  │
│ of the first UE-relay, the ID of the first                  │
│ to-be-established bearer, and the indicator for the QoS     │
│ requirement that the first to-be-established bearer needs   │
│ to meet, and is used to instruct the first LPN to determine │
│ data radio bearer DRB configuration information of a        │
│ second to-be-established bearer, and the second             │
│ to-be-established bearer is a bearer that can be            │
│ established by the first UE-relay and that is determined by │
│ the first LPN from the first to-be-established bearer       │
│ according to the indicator for the QoS requirement that the │
│ first to-be-established bearer needs to meet and the ID of  │
│ the first to-be-established bearer that are in the          │
│ offloading bearer request message                           │
└─────────────────────────────────────────────────────────────┘  S102
                              │
                              ▼
┌─────────────────────────────────────────────────────────────┐
│ The base station receives an offloading bearer              │
│ acknowledgement message that is sent by the first LPN and   │
│ that carries the DRB configuration information of the       │
│ second to-be-established bearer and an ID of the second     │
│ to-be-established bearer                                    │
└─────────────────────────────────────────────────────────────┘  S103
                              │
                              ▼
┌─────────────────────────────────────────────────────────────┐
│ The base station determines first S1 configuration          │
│ information of the second to-be-established bearer          │
│ according to the ID of the second to-be-established bearer  │
│ and the first S1 configuration information of the first     │
│ to-be-established bearer                                    │
└─────────────────────────────────────────────────────────────┘  S104
                              │
                              ▼
┌─────────────────────────────────────────────────────────────┐
│ The base station sends an offloading bearer configuration   │
│ message to the first UE-relay according to the ID of the    │
│ first UE-relay, where the offloading bearer configuration   │
│ message includes the ID of the second to-be-established     │
│ bearer, the DRB configuration information of the second     │
│ to-be-established bearer, and the first S1 configuration    │
│ information of the second to-be-established bearer, and the │
│ offloading bearer configuration message is used to instruct │
│ the first UE-relay to establish a service bearer for the    │
│ first LPN                                                   │
└─────────────────────────────────────────────────────────────┘  S105
                              │
                              ▼
┌─────────────────────────────────────────────────────────────┐
│ The base station sends, to a core network element by using  │
│ the MME, a received ID of the service bearer and received   │
│ second S1 configuration information of the service bearer   │
│ that are sent by the first UE-relay, where the ID of the    │
│ service bearer is the ID of the second to-be-established    │
│ bearer                                                      │
└─────────────────────────────────────────────────────────────┘  S106
```

FIG. 2

CONT.
FROM
FIG. 3A

The base station determines first S1 configuration information of the second to-be-established bearer according to the ID of the second to-be-established bearer and the first S1 configuration information of the first to-be-established bearer — S205

The base station sends an offloading bearer configuration message to the first UE-relay according to the ID of the first UE-relay, where the offloading bearer configuration message includes the ID of the second to-be-established bearer, the DRB configuration information of the second to-be-established bearer, and the first S1 configuration information of the second to-be-established bearer, and the offloading bearer configuration message is used to instruct the first UE-relay to establish a service bearer for the first LPN — S206

The base station receives an offloading bearer configuration acknowledgement message sent by the first UE-relay, where the offloading bearer configuration acknowledgement message includes an ID of the service bearer and second S1 configuration information of the service bearer — S207

The base station sends a backhaul offloading establishment request acknowledgement message to the MME, where the backhaul offloading establishment request acknowledgement message includes the ID of the service bearer and the second S1 configuration information of the service bearer, the backhaul offloading establishment request acknowledgement message is used to instruct the MME to send, to a core network element, a bearer modification request message that carries the ID of the service bearer and the second S1 configuration information of the service bearer, and the bearer modification request message is used to indicate the service bearer to the core network element — S208

FIG. 3B

CONT.
FROM
FIG. 4A

▼

| The base station receives an offloading bearer acknowledgement message that is sent by the first LPN and that carries the DRB configuration information of the second to-be-established bearer and an ID of the second to-be-established bearer | S305 |

▼

| The base station determines first S1 configuration information of the second to-be-established bearer according to the ID of the second to-be-established bearer and the first S1 configuration information of the first to-be-established bearer | S306 |

▼

| The base station sends an offloading bearer configuration message to the first UE-relay, where the offloading bearer configuration message includes the ID of the second to-be-established bearer, the DRB configuration information of the second to-be-established bearer, and the first S1 configuration information of the second to-be-established bearer, and the offloading bearer configuration message is used to instruct the first UE-relay to establish a service bearer for the first LPN | S307 |

▼

| The base station receives an offloading bearer configuration acknowledgement message sent by the first UE-relay, where the offloading bearer configuration acknowledgement message includes an ID of the service bearer and second S1 configuration information of the service bearer | S308 |

▼

| The base station sends a backhaul offloading establishment request acknowledgement message to the MME, where the backhaul offloading establishment request acknowledgement message includes the ID of the service bearer and the second S1 configuration information of the service bearer, the backhaul offloading establishment request acknowledgement message is used to instruct the MME to send, to a core network element, a bearer modification request message that carries the ID of the service bearer and the second S1 configuration information of the service bearer, and the bearer modification request message is used to indicate the service bearer to the core network element | S309 |

FIG. 4B

```
┌─────────────────────────────────────────────────────────────┐
│  A first LPN receives an offloading bearer request message  │
│  that is sent by a base station according to an identity ID │
│  of the first LPN in a backhaul offloading establishment    │
│  request message sent by an MME, where the backhaul         │
│  offloading establishment request message includes the ID   │
│  of the first LPN, an ID of a first UE-relay, an ID of a    │
│  first to-be-established bearer of the first LPN, first S1  │
│  configuration information of the first to-be-established   │
│  bearer, and an indicator for a quality of service QoS      │    S401
│  requirement that the first to-be-established bearer needs  │
│  to meet, the offloading bearer request message carries the │
│  ID of the first UE-relay, the ID of the first              │
│  to-be-established bearer of the first LPN, and the         │
│  indicator for the QoS requirement that the first           │
│  to-be-established bearer needs to meet, the first LPN is   │
│  one of at least one LPN, and the first UE-relay is one of  │
│  at least one UE-relay                                      │
└─────────────────────────────────────────────────────────────┘
```

A first LPN receives an offloading bearer request message that is sent by a base station according to an identity ID of the first LPN in a backhaul offloading establishment request message sent by an MME, where the backhaul offloading establishment request message includes the ID of the first LPN, an ID of a first UE-relay, an ID of a first to-be-established bearer of the first LPN, first S1 configuration information of the first to-be-established bearer, and an indicator for a quality of service QoS requirement that the first to-be-established bearer needs to meet, the offloading bearer request message carries the ID of the first UE-relay, the ID of the first to-be-established bearer of the first LPN, and the indicator for the QoS requirement that the first to-be-established bearer needs to meet, the first LPN is one of at least one LPN, and the first UE-relay is one of at least one UE-relay — S401

The first LPN determines, according to the offloading bearer request message, data radio bearer DRB configuration information of a second to-be-established bearer that can be established by the first UE-relay, where the second to-be-established bearer is a bearer that can be established by the first UE-relay and that is determined by the first LPN from the first to-be-established bearer of the first LPN according to the indicator for the QoS requirement that the first to-be-established bearer needs to meet and the ID of the first to-be-established bearer that are in the offloading bearer request message — S402

The first LPN sends an offloading bearer acknowledgement message to the base station, where the offloading bearer acknowledgement message includes the DRB configuration information of the second to-be-established bearer and an ID of the second to-be-established bearer, the offloading bearer acknowledgement message is used to instruct the base station to send an offloading bearer configuration message to the first UE-relay according to the ID of the first UE-relay, the offloading bearer configuration message includes the ID of the second to-be-established bearer, the DRB configuration information of the second to-be-established bearer, and first S1 configuration information of the second to-be-established bearer, the offloading bearer configuration message is used to instruct the first UE-relay to establish a service bearer for the first LPN, and the first S1 configuration information of the second to-be-established bearer is determined by the base station according to the ID of the second to-be-established bearer and the first S1 configuration information of the first to-be-established bearer — S403

FIG. 5

A first UE-relay receives an offloading bearer configuration message that is sent by a base station according to an identity ID of the first UE-relay, where the offloading bearer configuration message includes an ID of a second to-be-established bearer, first S1 configuration information of the second to-be-established bearer, and DRB configuration information of the second to-be-established bearer, the second to-be-established bearer is a bearer that can be established by the first UE-relay and that is determined by a first LPN from a first to-be-established bearer of the first LPN according to an indicator for a QoS requirement that the first to-be-established bearer needs to meet and an ID of the first to-be-established bearer of the first LPN that are in an offloading bearer request message sent by the base station, the offloading bearer request message carries the ID of the first UE-relay, the ID of the first to-be-established bearer, and the indicator for the QoS requirement that the first to-be-established bearer needs to meet, the offloading bearer request message is used to instruct the first LPN to determine the DRB configuration information of the second to-be-established bearer, the first LPN is one of at least one LPN, and the first UE-relay is one of at least one UE-relay ~~ S701

↓

The first UE-relay establishes a service bearer for the first LPN according to the first S1 configuration information of the second to-be-established bearer and the DRB configuration information of the second to-be-established bearer ~~ S702

↓

The first UE-relay sends an ID of the service bearer and second S1 configuration information of the service bearer to a core network element by using the base station and an MME, where the ID of the service bearer is the ID of the second to-be-established bearer ~~ S703

FIG. 8

BACKHAUL LINK ESTABLISHMENT METHOD, BASE STATION, AND DEVICE

CROSS-REFERENCE TO RELATED APPLICATIONS

This application is a continuation of International Application No. PCT/CN2015/073218, filed on Feb. 17, 2015, the disclosure of which is hereby incorporated by reference in its entirety.

TECHNICAL FIELD

The present application relates to communications technologies, and in particular, to a backhaul link establishment method, a base station, and a device.

BACKGROUND

During development of the 3rd Generation (3G) Mobile Communication technology or the 4th Generation (4G) Mobile Communication technology, an operator proposes small cell deployment for a dramatic increase of mobile data service traffic. A user can enjoy a high-rate data service in a small cell, especially in an indoor or outdoor hotspot scenario.

A low power node (LPN) is used for small cell deployment. Transmit power of the low power node is lower than that of a macro base station, and there may be multiple low power nodes. A link between the LPN and user equipment (UE) is referred to as an access link, and a link between the LPN and a base station is referred to as a backhaul link. The backhaul link may be a wireless backhaul or a wired backhaul. Backhaul links of multiple LPNs share uplink/downlink resources of a base station. The uplink/downlink resource may be an uplink/downlink spectrum resource (that is, an air interface resource) of the base station, or may be an uplink/downlink physical transmission resource (that is, a wired transmission resource such as a fiber or an asymmetric digital subscriber line (DSL)) between the LPN and the base station.

However, shortening of a coverage radius of a small cell is accompanied with a decrease of users in coverage of the small cell. When user equipment moves and/or a service class ratio changes, a service of the small cell fluctuates obviously. Consequently, there is also an obvious change in a backhaul link capacity requirement imposed by a network on the small cell. When a user in the coverage of the small cell uses a large-traffic service, a backhaul link capacity required for the large-traffic service is larger than a backhaul capacity required for a low bandwidth consuming service. Therefore, multiple backhaul links of an LPN cause capacity impact on uplink/downlink resources shared by the multiple backhaul links. Consequently, backhaul load on the uplink/downlink resources increases, and data transmission reliability is affected.

SUMMARY

Embodiments of the present disclosure provide a backhaul link establishment method, a base station, and a device, so as to resolve the following prior-art technical problem: When a user in coverage of a small cell uses a large-traffic service, multiple backhaul links of an LPN cause capacity impact on uplink/downlink resources of a base station, and consequently, backhaul load on the uplink/downlink resources increases.

According to a fourth aspect, an embodiment of the present disclosure provides a base station, applicable to a network for deploying a small cell, where the network includes at least one user equipment relay UE-relay, at least one low power node LPN, the base station, a mobility management entity MME, and a core network element, the UE-relay is wiredly connected to the core network element, the UE-relay is wirelessly connected to the LPN, and the base station includes:

a receiver, configured to receive a backhaul offloading establishment request message sent by the MME, where the backhaul offloading establishment request message includes an identity ID of a first LPN, an ID of a first UE-relay, an ID of a first to-be-established bearer of the first LPN, first S1 configuration information of the first to-be-established bearer, and an indicator for a quality of service QoS requirement that the first to-be-established bearer needs to meet, the first LPN is one of the at least one LPN, and the first UE-relay is one of the at least one UE-relay;

a transmitter, configured to send an offloading bearer request message to the first LPN according to the ID of the first LPN that is received by the receiver, where the offloading bearer request message carries the ID of the first UE-relay, the ID of the first to-be-established bearer, and the indicator for the QoS requirement that the first to-be-established bearer needs to meet, the offloading bearer request message is used to instruct the first LPN to determine data radio bearer DRB configuration information of a second to-be-established bearer, and the second to-be-established bearer is a bearer that can be established by the first UE-relay and that is determined by the first LPN from the first to-be-established bearer according to the indicator for the QoS requirement that the first to-be-established bearer needs to meet and the ID of the first to-be-established bearer that are in the offloading bearer request message; where the receiver is further configured to receive an offloading bearer acknowledgement message that is sent by the first LPN and that carries the DRB configuration information of the second to-be-established bearer and an ID of the second to-be-established bearer; and a processor, configured to determine first S1 configuration information of the second to-be-established bearer according to the ID of the second to-be-established bearer and the first S1 configuration information of the first to-be-established bearer that are received by the receiver; where the transmitter is further configured to: send an offloading bearer configuration message to the first UE-relay according to the ID of the first UE-relay that is received by the receiver, where the offloading bearer configuration message includes the ID of the second to-be-established bearer, the DRB configuration information of the second to-be-established bearer, and the first S1 configuration information of the second to-be-established bearer, and the offloading bearer configuration message is used to instruct the first UE-relay to establish a service bearer for the first LPN; and send, to the core network element by using the MME, a received ID of the service bearer and received second S1 configuration information of the service bearer that are sent by the first UE-relay, where the ID of the service bearer is the ID of the second to-be-established bearer.

With reference to the fourth aspect, in a first possible implementation of the fourth aspect, the service bearer includes a DRB bearer that is established by the first UE-relay according to the DRB configuration information of the second to-be-established bearer, and an S1 bearer that is established by the first UE-relay according to the first S1 configuration information of the second to-be-established bearer.

With reference to the first possible implementation of the fourth aspect, in a second possible implementation of the fourth aspect, the transmitter is further configured to: before the receiver receives the backhaul offloading establishment request message sent by the MME, send at least one first initial backhaul message to the MME, where each first initial backhaul message includes an ID of one LPN, an ID of the at least one UE-relay, transmission capability information of the LPN, and transmission capability information of each UE-relay; where the indicator for the QoS requirement that the first to-be-established bearer needs to meet is the QoS requirement that the first to-be-established bearer needs to meet, the first LPN is an LPN for which a bearer needs to be established and that is determined by the MME according to transmission capability information of each LPN, the ID of the first LPN is determined by the MME according to the transmission capability information of each LPN and an ID of each LPN, the first UE-relay is a UE-relay that can establish a bearer for the first LPN and that is determined by the MME according to the transmission capability information of each UE-relay, and the ID of the first UE-relay is determined by the MME according to the transmission capability information of each UE-relay and an ID of each UE-relay.

With reference to the first possible implementation of the fourth aspect, in a third possible implementation of the fourth aspect, the processor is further configured to: before the receiver receives the backhaul offloading establishment request message sent by the MME, obtain, from the at least one LPN, a second LPN whose backhaul capacity is limited; and the transmitter is further configured to send at least one second initial backhaul message to the MME, where each second initial backhaul message includes an ID of one second LPN, an ID of the at least one UE-relay, transmission capability information of the second LPN, transmission capability information of each UE-relay, and an ID of a first to-be-offloaded bearer of the second LPN; where the first LPN is an LPN for which an offloading bearer needs to be established and that is determined by the MME from the second LPN according to transmission capability information of each second LPN, the ID of the first LPN is determined by the MME according to the transmission capability information of each second LPN and an ID of each second LPN, the first UE-relay is a UE-relay that can establish an offloading bearer for the first LPN and that is determined by the MME according to the transmission capability information of each UE-relay, the ID of the first UE-relay is determined by the MME according to the transmission capability information of each UE-relay and an ID of each UE-relay, the first to-be-established bearer is an offloading bearer that is determined by the MME and that is corresponding to a second to-be-offloaded bearer of the first LPN, the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer and transmission capability information of the first UE-relay and/or transmission capability information of the first LPN, and the indicator for the QoS requirement that the first to-be-established bearer needs to meet is an ID of the second to-be-offloaded bearer.

With reference to the third possible implementation of the fourth aspect, in a fourth possible implementation of the fourth aspect, if a DRB bearer in the second to-be-offloaded bearer is a downlink DRB bearer, the DRB bearer in the service bearer is an uplink DRB bearer; or if a DRB bearer in the second to-be-offloaded bearer is an uplink DRB bearer, the DRB bearer in the service bearer is a downlink DRB bearer.

With reference to any one of the first possible implementation of the fourth aspect to the fourth possible implementation of the fourth aspect, in a fifth possible implementation of the fourth aspect, the backhaul offloading establishment request message further includes a traffic flow template of the first UE-relay, the offloading bearer configuration message further includes the traffic flow template of the first UE-relay, and the traffic flow template of the first UE-relay is used to instruct the first UE-relay to establish a mapping relationship between the DRB bearer and the S1 bearer in the service bearer.

According to a fifth aspect, an embodiment of the present disclosure provides a device, where the device is a first low power node LPN, the device is applicable to a network for deploying a small cell, the network includes at least one user equipment relay UE-relay, at least one low power node LPN, a base station, a mobility management entity MME, and a core network element, the UE-relay is wiredly connected to the core network element, the UE-relay is wirelessly connected to the LPN, the first LPN is one of the at least one LPN, and the device includes:

a receiver, configured to receive an offloading bearer request message that is sent by the base station according to an identity ID of the first LPN in a backhaul offloading establishment request message sent by the MME, where the backhaul offloading establishment request message includes the ID of the first LPN, an ID of a first UE-relay, an ID of a first to-be-established bearer of the first LPN, first S1 configuration information of the first to-be-established bearer, and an indicator for a quality of service QoS requirement that the first to-be-established bearer needs to meet, the offloading bearer request message carries the ID of the first UE-relay, the ID of the first to-be-established bearer of the first LPN, and the indicator for the QoS requirement that the first to-be-established bearer needs to meet, and the first UE-relay is one of the at least one UE-relay;

a processor, configured to determine, according to the offloading bearer request message received by the receiver, data radio bearer DRB configuration information of a second to-be-established bearer that can be established by the first UE-relay, where the second to-be-established bearer is a bearer that can be established by the first UE-relay and that is determined by the first LPN from the first to-be-established bearer of the first LPN according to the indicator for the QoS requirement that the first to-be-established bearer needs to meet and the ID of the first to-be-established bearer that are in the offloading bearer request message; and a transmitter, configured to send an offloading bearer acknowledgement message to the base station, where the offloading bearer acknowledgement message includes the DRB configuration information that is of the second to-be-established bearer and that is determined by the processor and an ID of the second to-be-established bearer, the offloading bearer acknowledgement message is used to instruct the base station to send an offloading bearer configuration message to the first UE-relay according to the ID of the first UE-relay, the offloading bearer configuration message includes the ID of the second to-be-established bearer, the DRB configuration information of the second to-be-established bearer, and first S1 configuration information of the second to-be-established bearer, the offloading bearer configuration message is used to instruct the first UE-relay to establish a service bearer for the first LPN, and the first S1 configuration information of the second to-be-established bearer is determined by the base station according to the ID of the second to-be-established bearer and the first S1 configuration information of the first to-be-established bearer.

With reference to the fifth aspect, in a first possible implementation of the fifth aspect, the service bearer includes a DRB bearer that is established by the first UE-relay according to the DRB configuration information of the second to-be-established bearer, and an S1 bearer that is established by the first UE-relay according to the first S1 configuration information of the second to-be-established bearer.

With reference to the first possible implementation of the fifth aspect, in a second possible implementation of the fifth aspect, the indicator for the QoS requirement that the first to-be-established bearer needs to meet is the QoS requirement that the first to-be-established bearer needs to meet, the first LPN is an LPN for which a bearer needs to be established and that is determined by the MME according to transmission capability information of an LPN in at least one first initial backhaul message sent by the base station, the ID of the first LPN is determined by the MME according to the transmission capability information of the LPN and an ID of the LPN, the first UE-relay is a UE-relay that can establish a bearer for the first LPN and that is determined by the MME according to transmission capability information of each UE-relay in the at least one first initial backhaul message sent by the base station, the ID of the first UE-relay is determined by the MME according to the transmission capability information of each UE-relay and an ID of each UE-relay, and each first initial backhaul message includes an ID of one LPN, an ID of the at least one UE-relay, transmission capability information of the LPN, and the transmission capability information of each UE-relay.

With reference to the first possible implementation of the fifth aspect, in a third possible implementation of the fifth aspect, the first LPN is an LPN for which an offloading bearer needs to be established and that is determined by the MME from a second LPN according to transmission capability information of the second LPN in at least one second initial backhaul message sent by the base station, the ID of the first LPN is determined by the MME according to the transmission capability information of the second LPN and an ID of the second LPN, and the second LPN is an LPN whose backhaul capacity is limited and that is determined by the base station from the at least one LPN;

the first UE-relay is a UE-relay that can establish an offloading bearer for the first LPN and that is determined by the MME according to transmission capability information of each UE-relay in the at least one second initial backhaul message sent by the base station, the ID of the first UE-relay is determined by the MME according to the transmission capability information of each UE-relay and an ID of each UE-relay, and each second initial backhaul message includes an ID of one second LPN, an ID of the at least one UE-relay, transmission capability information of the second LPN, the transmission capability information of each UE-relay, and an ID of a first to-be-offloaded bearer of the second LPN; and the first to-be-established bearer is an offloading bearer that is determined by the MME and that is corresponding to the second to-be-offloaded bearer, the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer of the first LPN and transmission capability information of the first UE-relay and/or transmission capability information of the first LPN, and the indicator for the QoS requirement that the first to-be-established bearer needs to meet is an ID of the second to-be-offloaded bearer.

With reference to the third possible implementation of the fifth aspect, in a fourth possible implementation of the fifth aspect, if a DRB bearer in the second to-be-offloaded bearer is a downlink DRB bearer, the DRB bearer in the service bearer is an uplink DRB bearer; or if a DRB bearer in the second to-be-offloaded bearer is an uplink DRB bearer, the DRB bearer in the service bearer is a downlink DRB bearer.

With reference to any one of the fifth aspect or the first possible implementation to the fourth possible implementation of the fifth aspect, in a fifth possible implementation of the fifth aspect, the processor is specifically configured to: determine, according to the indicator for the QoS requirement that the first to-be-established bearer needs to meet, a DRB QoS requirement that the first to-be-established bearer needs to meet; obtain a status of an air interface between the first LPN and the first UE-relay, and establish the second to-be-established bearer according to the air interface status and the DRB QoS requirement that the first to-be-established bearer needs to meet; and determine the DRB configuration information of the second to-be-established bearer, where the second to-be-established bearer is a first to-be-established bearer that is determined by the first LPN from the first to-be-established bearer and whose DRB QoS requirement matches the air interface status.

According to a sixth aspect, an embodiment of the present disclosure provides a device, where the device is a first user equipment relay UE-relay, the device is applicable to a network for deploying a small cell, the network includes at least one user equipment relay UE-relay, at least one low power node LPN, a base station, a mobility management entity MME, and a core network element, the UE-relay is wiredly connected to the core network element, the UE-relay is wirelessly connected to the LPN, the first UE-relay is one of the at least one UE-relay, and the device includes:

a receiver, configured to receive an offloading bearer configuration message that is sent by the base station according to an identity ID of the first UE-relay, where the offloading bearer configuration message includes an identity ID of a second to-be-established bearer, first S1 configuration information of the second to-be-established bearer, and data radio bearer DRB configuration information of the second to-be-established bearer, the second to-be-established bearer is a bearer that can be established by the first UE-relay and that is determined by a first LPN from a first to-be-established bearer of the first LPN according to an indicator for a quality of service QoS requirement that the first to-be-established bearer needs to meet and an ID of the first to-be-established bearer of the first LPN that are in an offloading bearer request message sent by the base station, the offloading bearer request message carries the ID of the first UE-relay, the ID of the first to-be-established bearer, and the indicator for the QoS requirement that the first to-be-established bearer needs to meet, the offloading bearer request message is used to instruct the first LPN to determine the DRB configuration information of the second to-be-established bearer, and the first LPN is one of the at least one LPN;

a processor, configured to establish a service bearer for the first LPN according to the first S1 configuration information of the second to-be-established bearer and the DRB configuration information of the second to-be-established bearer that are received by the receiver; and a transmitter, configured to send an ID of the service bearer established by the processor and second S1 configuration information of the service bearer to the core network element by using the base station and the MME, where the ID of the service bearer is the ID of the second to-be-established bearer.

With reference to the sixth aspect, in a first possible implementation of the sixth aspect, the processor is specifically configured to: establish an S1 bearer between the first UE-relay and the core network element according to the first S1 configuration information that is of the second to-be-established bearer and that is received by the receiver, and establish a DRB bearer between the first UE-relay and the first LPN according to the DRB configuration information that is of the second to-be-established bearer and that is received by the receiver.

With reference to the first possible implementation of the sixth aspect, in a second possible implementation of the sixth aspect, the indicator for the QoS requirement that the first to-be-established bearer needs to meet is the QoS requirement that the first to-be-established bearer needs to meet; and the first LPN is an LPN for which an offloading bearer needs to be established and that is determined by the MME from an LPN according to transmission capability information of the LPN in at least one first initial backhaul message sent by the base station, an ID of the first LPN is determined by the MME according to the transmission capability information of the LPN and an ID of the LPN, the first UE-relay is a UE-relay that can establish a bearer for the first LPN and that is determined by the MME according to transmission capability information of each UE-relay in the at least one first initial backhaul message sent by the base station, the ID of the first UE-relay is determined by the MME according to the transmission capability information of each UE-relay and an ID of each UE-relay, and each first initial backhaul message includes an ID of one LPN, an ID of the at least one UE-relay, transmission capability information of the LPN, and the transmission capability information of each UE-relay.

With reference to the first possible implementation of the sixth aspect, in a third possible implementation of the sixth aspect, the indicator for the QoS requirement that the first to-be-established bearer needs to meet is an ID of a second to-be-offloaded bearer of the first LPN;

the first LPN is an LPN for which an offloading bearer needs to be established and that is determined by the MME from a second LPN according to transmission capability information of the second LPN in at least one second initial backhaul message sent by the base station, an ID of the first LPN is determined by the MME according to the transmission capability information of the second LPN and an ID of the second LPN, the second LPN is an LPN whose backhaul capacity is limited and that is determined by the base station from the at least one LPN, the first UE-relay is a UE-relay that can establish an offloading bearer for the first LPN and that is determined by the MME according to transmission capability information of each UE-relay in the at least one second initial backhaul message sent by the base station, the ID of the first UE-relay is determined by the MME according to the transmission capability information of each UE-relay and an ID of each UE-relay, and each second initial backhaul message includes an ID of one second LPN, an ID of the at least one UE-relay, transmission capability information of the second LPN, the transmission capability information of each UE-relay, and an ID of a first to-be-offloaded bearer of the second LPN; and the first to-be-established bearer is an offloading bearer that is determined by the MME and that is corresponding to the second to-be-offloaded bearer of the first LPN, and the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer of the first LPN and transmission capability information of the first UE-relay and/or transmission capability information of the first LPN.

With reference to the third possible implementation of the sixth aspect, in a fourth possible implementation of the sixth aspect, if a DRB bearer in the second to-be-offloaded bearer is a downlink DRB bearer, the DRB bearer in the service bearer is an uplink DRB bearer; or if a DRB bearer in the second to-be-offloaded bearer is an uplink DRB bearer, the DRB bearer in the service bearer is a downlink DRB bearer.

With reference to any one of the sixth aspect or the first possible implementation to the fourth possible implementation of the sixth aspect, in a fifth possible implementation of the sixth aspect, the offloading bearer configuration message further includes a traffic flow template of the first UE-relay, and the traffic flow template of the first UE-relay is used to instruct the first UE-relay to establish a mapping relationship between the DRB bearer and the S1 bearer in the service bearer.

According to a seventh aspect, an embodiment of the present disclosure provides a backhaul link establishment method, where the method is applicable to a network for deploying a small cell, the network includes at least one user equipment relay UE-relay, at least one low power node LPN, a base station, a mobility management entity MME, and a core network element, the UE-relay is wiredly connected to the core network element, the UE-relay is wirelessly connected to the LPN, and the method includes:

receiving, by the base station, a backhaul offloading establishment request message sent by the MME; where the backhaul offloading establishment request message includes an identity ID of a first LPN, an ID of a first UE-relay, an ID of a first to-be-established bearer of the first LPN, first S1 configuration information of the first to-be-established bearer, and an indicator for a quality of service QoS requirement that the first to-be-established bearer needs to meet, the first LPN is one of the at least one LPN, and the first UE-relay is one of the at least one UE-relay;

sending, by the base station, an offloading bearer request message to the first LPN according to the ID of the first LPN, where the offloading bearer request message carries the ID of the first UE-relay, the ID of the first to-be-established bearer, and the indicator for the QoS requirement that the first to-be-established bearer needs to meet, the offloading bearer request message is used to instruct the first LPN to determine data radio bearer DRB configuration information of a second to-be-established bearer, and the second to-be-established bearer is a bearer that can be established by the first UE-relay and that is determined by the first LPN from the first to-be-established bearer according to the indicator for the QoS requirement that the first to-be-established bearer needs to meet and the ID of the first to-be-established bearer that are in the offloading bearer request message;

receiving, by the base station, an offloading bearer acknowledgement message that is sent by the first LPN and that carries the DRB configuration information of the second to-be-established bearer and an ID of the second to-be-established bearer;

determining, by the base station, first S1 configuration information of the second to-be-established bearer according to the ID of the second to-be-established bearer and the first S1 configuration information of the first to-be-established bearer;

sending, by the base station, an offloading bearer configuration message to the first UE-relay according to the ID of the first UE-relay, where the offloading bearer configuration message includes the ID of the second to-be-established bearer, the DRB configuration information of the second to-be-established bearer, and the first S1 configuration information of the second to-be-established bearer, and the offloading bearer configuration message is used to instruct the first UE-relay to establish a service bearer for the first LPN; and sending, by the base station to the core network element by using the MME, a received ID of the service bearer and received second S1 configuration information of the service bearer that are sent by the first UE-relay, where the ID of the service bearer is the ID of the second to-be-established bearer.

With reference to the seventh aspect, in a first possible implementation of the seventh aspect, the service bearer includes a DRB bearer that is established by the first UE-relay according to the DRB configuration information of the second to-be-established bearer, and an S1 bearer that is established by the first UE-relay according to the first S1 configuration information of the second to-be-established bearer.

With reference to the first possible implementation of the seventh aspect, in a second possible implementation of the seventh aspect, before the receiving, by the base station, a backhaul offloading establishment request message sent by the MME, the method further includes:

sending, by the base station, at least one first initial backhaul message to the MME, where each first initial backhaul message includes an ID of one LPN, an ID of the at least one UE-relay, transmission capability information of the LPN, and transmission capability information of each UE-relay; where the indicator for the QoS requirement that the first to-be-established bearer needs to meet is the QoS requirement that the first to-be-established bearer needs to meet, the first LPN is an LPN for which a bearer needs to be established and that is determined by the MME according to transmission capability information of each LPN, the ID of the first LPN is determined by the MME according to the transmission capability information of each LPN and an ID of each LPN, the first UE-relay is a UE-relay that can establish a bearer for the first LPN and that is determined by the MME according to the transmission capability information of each UE-relay, and the ID of the first UE-relay is determined by the MME according to the transmission capability information of each UE-relay and an ID of each UE-relay.

With reference to the first possible implementation of the seventh aspect, in a third possible implementation of the seventh aspect, before the receiving, by the base station, a backhaul offloading establishment request message sent by the MME, the method further includes:

obtaining, by the base station from the at least one LPN, a second LPN whose backhaul capacity is limited; and sending, by the base station, at least one second initial backhaul message to the MME, where each second initial backhaul message includes an ID of one second LPN, an ID of the at least one UE-relay, transmission capability information of the second LPN, transmission capability information of each UE-relay, and an ID of a first to-be-offloaded bearer of the second LPN; where the first LPN is an LPN for which an offloading bearer needs to be established and that is determined by the MME from the second LPN according to transmission capability information of each second LPN, the ID of the first LPN is determined by the MME according to the transmission capability information of each second LPN and an ID of each second LPN, the first UE-relay is a UE-relay that can establish an offloading bearer for the first LPN and that is determined by the MME according to the transmission capability information of each UE-relay, the ID of the first UE-relay is determined by the MME according to the transmission capability information of each UE-relay and an ID of each UE-relay, the first to-be-established bearer is an offloading bearer that is determined by the MME and that is corresponding to a second to-be-offloaded bearer of the first LPN, the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer and transmission capability information of the first UE-relay and/or transmission capability information of the first LPN, and the indicator for the QoS requirement that the first to-be-established bearer needs to meet is an ID of the second to-be-offloaded bearer.

With reference to the third possible implementation of the seventh aspect, in a fourth possible implementation of the seventh aspect, if a DRB bearer in the second to-be-offloaded bearer is a downlink DRB bearer, the DRB bearer in the service bearer is an uplink DRB bearer; or if a DRB bearer in the second to-be-offloaded bearer is an uplink DRB bearer, the DRB bearer in the service bearer is a downlink DRB bearer.

With reference to any one of the first possible implementation of the seventh aspect to the fourth possible implementation of the seventh aspect, in a fifth possible implementation of the seventh aspect, the backhaul offloading establishment request message further includes a traffic flow template of the first UE-relay, the offloading bearer configuration message further includes the traffic flow template of the first UE-relay, and the traffic flow template of the first UE-relay is used to instruct the first UE-relay to establish a mapping relationship between the DRB bearer and the S1 bearer in the service bearer.

According to an eighth aspect, an embodiment of the present disclosure provides a backhaul link establishment method, where the method is applicable to a network for deploying a small cell, the network includes at least one user equipment relay UE-relay, at least one low power node LPN, a base station, a mobility management entity MME, and a core network element, the UE-relay is wiredly connected to the core network element, the UE-relay is wirelessly connected to the LPN, and the method includes:

receiving, by a first LPN, an offloading bearer request message that is sent by the base station according to an identity ID of the first LPN in a backhaul offloading establishment request message sent by the MME, where the backhaul offloading establishment request message includes the ID of the first LPN, an ID of a first UE-relay, an ID of a first to-be-established bearer of the first LPN, first S1 configuration information of the first to-be-established bearer, and an indicator for a quality of service QoS requirement that the first to-be-established bearer needs to meet, the offloading bearer request message carries the ID of the first UE-relay, the ID of the first to-be-established bearer of the first LPN, and the indicator for the QoS requirement that the first to-be-established bearer needs to meet, the first LPN is one of the at least one LPN, and the first UE-relay is one of the at least one UE-relay;

determining, by the first LPN according to the offloading bearer request message, data radio bearer DRB configuration information of a second to-be-established bearer that can be established by the first UE-relay, where the second to-be-established bearer is a bearer that can be established by the first UE-relay and that is determined by the first LPN from the first to-be-established bearer of the first LPN according to the indicator for the QoS requirement that the first to-be-established bearer needs to meet and the ID of the first to-be-established bearer that are in the offloading bearer request message; and sending, by the first LPN, an offloading bearer acknowledgement message to the base station, where the offloading bearer acknowledgement message includes the DRB configuration information of the second to-be-established bearer and an ID of the second to-be-established bearer, the offloading bearer acknowledgement message is used to instruct the base station to send an offloading bearer configuration message to the first UE-relay according to the ID of the first UE-relay, the offloading bearer configuration message includes the ID of the second to-be-established bearer, the DRB configuration information of the second to-be-established bearer, and first S1 configuration information of the second to-be-established bearer, the offloading bearer configuration message is used to instruct the first UE-relay to establish a service bearer for the first LPN, and the first S1 configuration information of the second to-be-established bearer is determined by the base station according to the ID of the second to-be-established bearer and the first S1 configuration information of the first to-be-established bearer.

With reference to the eighth aspect, in a first possible implementation of the eighth aspect, the service bearer includes a DRB bearer that is established by the first UE-relay according to the DRB configuration information of the second to-be-established bearer, and an S1 bearer that is established by the first UE-relay according to the first S1 configuration information of the second to-be-established bearer.

With reference to the first possible implementation of the eighth aspect, in a second possible implementation of the eighth aspect, the indicator for the QoS requirement that the first to-be-established bearer needs to meet is the QoS requirement that the first to-be-established bearer needs to meet, the first LPN is an LPN for which a bearer needs to be established and that is determined by the MME according to transmission capability information of an LPN in at least one first initial backhaul message sent by the base station, the ID of the first LPN is determined by the MME according to the transmission capability information of the LPN and an ID of the LPN, the first UE-relay is a UE-relay that can establish a bearer for the first LPN and that is determined by the MME according to transmission capability information of each UE-relay in the at least one first initial backhaul message sent by the base station, the ID of the first UE-relay is determined by the MME according to the transmission capability information of each UE-relay and an ID of each UE-relay, and each first initial backhaul message includes an ID of one LPN, an ID of the at least one UE-relay, transmission capability information of the LPN, and the transmission capability information of each UE-relay.

With reference to the first possible implementation of the eighth aspect, in a third possible implementation of the eighth aspect, the first LPN is an LPN for which an offloading bearer needs to be established and that is determined by the MME from a second LPN according to transmission capability information of the second LPN in at least one second initial backhaul message sent by the base station, the ID of the first LPN is determined by the MME according to the transmission capability information of the second LPN and an ID of the second LPN, and the second LPN is an LPN whose backhaul capacity is limited and that is determined by the base station from the at least one LPN;

the first UE-relay is a UE-relay that can establish an offloading bearer for the first LPN and that is determined by the MME according to transmission capability information of each UE-relay in the at least one second initial backhaul message sent by the base station, the ID of the first UE-relay is determined by the MME according to the transmission capability information of each UE-relay and an ID of each UE-relay, and each second initial backhaul message includes an ID of one second LPN, an ID of the at least one UE-relay, transmission capability information of the second LPN, the transmission capability information of each UE-relay, and an ID of a first to-be-offloaded bearer of the second LPN; and the first to-be-established bearer is an offloading bearer that is determined by the MME and that is corresponding to the second to-be-offloaded bearer, the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer of the first LPN and transmission capability information of the first UE-relay and/or transmission capability information of the first LPN, and the indicator for the QoS requirement that the first to-be-established bearer needs to meet is an ID of the second to-be-offloaded bearer.

With reference to the third possible implementation of the eighth aspect, in a fourth possible implementation of the eighth aspect, if a DRB bearer in the second to-be-offloaded bearer is a downlink DRB bearer, the DRB bearer in the service bearer is an uplink DRB bearer; or if a DRB bearer in the second to-be-offloaded bearer is an uplink DRB bearer, the DRB bearer in the service bearer is a downlink DRB bearer.

With reference to any one of the eighth aspect or the first possible implementation to the fourth possible implementation of the eighth aspect, in a fifth possible implementation of the eighth aspect, the determining, by the first LPN according to the offloading bearer request message, DRB configuration information of a second to-be-established bearer that can be established by the first UE-relay includes:

determining, by the first LPN according to the indicator for the QoS requirement that the first to-be-established bearer needs to meet, a DRB QoS requirement that the first to-be-established bearer needs to meet;

obtaining, by the first LPN, a status of an air interface between the first LPN and the first UE-relay, and determining the second to-be-established bearer according to the air interface status and the DRB QoS requirement that the first to-be-established bearer needs to meet, where the second to-be-established bearer is a first to-be-established bearer that is determined by the first LPN from the first to-be-established bearer and whose DRB QoS requirement matches the air interface status; and determining, by the first LPN, the DRB configuration information of the second to-be-established bearer.

According to a ninth aspect, an embodiment of the present disclosure provides a backhaul link establishment method, where the method is applicable to a network for deploying a small cell, the network includes at least one user equipment relay UE-relay, at least one low power node LPN, a base station, a mobility management entity MME, and a core network element, the UE-relay is wiredly connected to the core network element, the UE-relay is wirelessly connected to the LPN, and the method includes:

receiving, by a first UE-relay, an offloading bearer configuration message that is sent by the base station according to an identity ID of the first UE-relay, where the offloading bearer configuration message includes an identity ID of a second to-be-established bearer, first S1 configuration information of the second to-be-established bearer, and data radio bearer DRB configuration information of the second to-be-established bearer, the second to-be-established bearer is a bearer that can be established by the first UE-relay and that is determined by a first LPN from a first to-be-established bearer of the first LPN according to an indicator for a quality of service QoS requirement that the first to-be-established bearer needs to meet and an ID of the first to-be-established bearer of the first LPN that are in an offloading bearer request message sent by the base station, the offloading bearer request message carries the ID of the first UE-relay, the ID of the first to-be-established bearer, and the indicator for the QoS requirement that the first to-be-established bearer needs to meet, the offloading bearer request message is used to instruct the first LPN to determine the DRB configuration information of the second to-be-established bearer, the first LPN is one of the at least one LPN, and the first UE-relay is one of the at least one UE-relay;

establishing, by the first UE-relay, a service bearer for the first LPN according to the first S1 configuration information of the second to-be-established bearer and the DRB configuration information of the second to-be-established bearer; and sending, by the first UE-relay, an ID of the service bearer and second S1 configuration information of the service bearer to the core network element by using the base station and the MME, where the ID of the service bearer is the ID of the second to-be-established bearer.

With reference to the ninth aspect, in a first possible implementation of the ninth aspect, the establishing, by the first UE-relay, a service bearer for the first LPN according to the first S1 configuration information of the second to-be-established offloading bearer and the DRB configuration information of the second to-be-established bearer includes:

establishing, by the first UE-relay, an S1 bearer between the first UE-relay and the core network element according to the first S1 configuration information of the second to-be-established bearer; and establishing, by the first UE-relay, a DRB bearer between the first UE-relay and the first LPN according to the DRB configuration information of the second to-be-established bearer.

With reference to the first possible implementation of the ninth aspect, in a second possible implementation of the ninth aspect, the indicator for the QoS requirement that the first to-be-established bearer needs to meet is the QoS requirement that the first to-be-established bearer needs to meet; and the first LPN is an LPN for which an offloading bearer needs to be established and that is determined by the MME from an LPN according to transmission capability information of the LPN in at least one first initial backhaul message sent by the base station, an ID of the first LPN is determined by the MME according to the transmission capability information of the LPN and an ID of the LPN, the first UE-relay is a UE-relay that can establish a bearer for the first LPN and that is determined by the MME according to transmission capability information of each UE-relay in the at least one first initial backhaul message sent by the base station, the ID of the first UE-relay is determined by the MME according to the transmission capability information of each UE-relay and an ID of each UE-relay, and each first initial backhaul message includes an ID of one LPN, an ID of the at least one UE-relay, transmission capability information of the LPN, and the transmission capability information of each UE-relay.

With reference to the first possible implementation of the ninth aspect, in a third possible implementation of the ninth aspect, the indicator for the QoS requirement that the first to-be-established bearer needs to meet is an ID of a second to-be-offloaded bearer of the first LPN;

the first LPN is an LPN for which an offloading bearer needs to be established and that is determined by the MME from a second LPN according to transmission capability information of the second LPN in at least one second initial backhaul message sent by the base station, an ID of the first LPN is determined by the MME according to the transmission capability information of the second LPN and an ID of the second LPN, the second LPN is an LPN whose backhaul capacity is limited and that is determined by the base station from the at least one LPN, the first UE-relay is a UE-relay that can establish an offloading bearer for the first LPN and that is determined by the MME according to transmission capability information of each UE-relay in the at least one second initial backhaul message sent by the base station, the ID of the first UE-relay is determined by the MME according to the transmission capability information of each UE-relay and an ID of each UE-relay, and each second initial backhaul message includes an ID of one second LPN, an ID of the at least one UE-relay, transmission capability information of the second LPN, the transmission capability information of each UE-relay, and an ID of a first to-be-offloaded bearer of the second LPN; and the first to-be-established bearer is an offloading bearer that is determined by the MME and that is corresponding to the second to-be-offloaded bearer of the first LPN, and the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer of the first LPN and transmission capability information of the first UE-relay and/or transmission capability information of the first LPN.

With reference to the third possible implementation of the ninth aspect, in a fourth possible implementation of the ninth aspect, if a DRB bearer in the second to-be-offloaded bearer is a downlink DRB bearer, the DRB bearer in the service bearer is an uplink DRB bearer; or if a DRB bearer in the second to-be-offloaded bearer is an uplink DRB bearer, the DRB bearer in the service bearer is a downlink DRB bearer.

With reference to any one of the ninth aspect or the first possible implementation to the fourth possible implementation of the ninth aspect, in a fifth possible implementation of the ninth aspect, the offloading bearer configuration message further includes a traffic flow template of the first UE-relay, and the traffic flow template of the first UE-relay is used to instruct the first UE-relay to establish a mapping relationship between the DRB bearer and the S1 bearer in the service bearer.

According to the backhaul link establishment method, the base station, and the device that are provided in the embodiments of the present disclosure, a base station receives a backhaul offloading establishment request message sent by an MME, and sends an offloading bearer request message to a first LPN according to the backhaul offloading establishment request message, so that the first LPN determines a second to-be-established bearer that can be established by a first UE-relay. Then, the base station receives an offloading bearer acknowledgement message that is sent by the first LPN and that carries DRB configuration information of the second to-be-established bearer and an ID of the second to-be-established bearer, and sends, to the first UE-relay, an offloading bearer configuration message that carries the ID of the second to-be-established bearer, the DRB configuration information of the second to-be-established bearer, and first S1 configuration information of the second to-be-established bearer, so that the first UE-relay establishes a service bearer for the first LPN according to the offloading bearer configuration message. According to the method provided in the embodiments of the present disclosure, a UE-relay is deployed in a network, and a backhaul link is established for a first LPN by using the UE-relay and an idle uplink/downlink resource of the first LPN, or offloading bearers are established, by using the UE-relay and an idle uplink/downlink resource of a first LPN, for some E-RAB bearers that are of the first LPN and whose capacities are limited, so that impact on uplink/downlink resources of a base station that is caused by a prior-art backhaul link between the base station and the LPN is reduced, backhaul load on the uplink/downlink resources of the base station is reduced, and reliable data transmission is ensured.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

FIG. 2 is a schematic flowchart of Embodiment 1 of a backhaul link establishment method according to the embodiments of the present disclosure;

FIG. 3A and FIG. 3B are a schematic flowchart of Embodiment 2 of a backhaul link establishment method according to the embodiments of the present disclosure;

FIG. 4A and FIG. 4B are a schematic flowchart of Embodiment 3 of a backhaul link establishment method according to the embodiments of the present disclosure;

FIG. 5 is a schematic flowchart of Embodiment 4 of a backhaul link establishment method according to the embodiments of the present disclosure;

FIG. 8 is a schematic flowchart of Embodiment 7 of a backhaul link establishment method according to the embodiments of the present disclosure;

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

A base station (for example, an access point) involved in this application may refer to a device that is in an access network and that communicates, over an air interface, with a wireless terminal by using one or more sectors. The base station may be configured to mutually convert a received over-the-air frame and an IP packet and serve as a router between the wireless terminal and a remaining portion of the access network. The remaining portion of the access network may include an internet protocol (IP) network. For example, the base station may be a base transceiver station (BTS) in GSM or CDMA, may be a NodeB (NodeB) in WCDMA, or may be an evolved NodeB (eNB, or eNodeB, evolutional Node B) in LTE. This is not limited in this application.

A user equipment relay, that is, a UE-relay involved in this application may be a terminal with a relay function. The terminal may be a wireless terminal or a wired terminal. The wireless terminal may refer to a device that provides voice and/or data connectivity for a user, a handheld device with a wireless connection function, or another processing device connected to a wireless modem. The wireless terminal may communicate with one or more core networks by using a radio access network (for example, RAN). For example, the wireless terminal may be a mobile terminal, such as a mobile phone (or referred to as a "cellular" phone) or a computer with a mobile terminal.

An LPN involved in this application may be a radio node (RN). For example, the LPN may be a pico base station (Pico), a femtocell (Femto), a relay node (relay), or the like. A core network element involved in this application may be a serving gateway (S-GW) in a core network, or may be another data control gateway in a core network. Specific content of the LPN and the core network element is not limited in this application.

Figure 1:
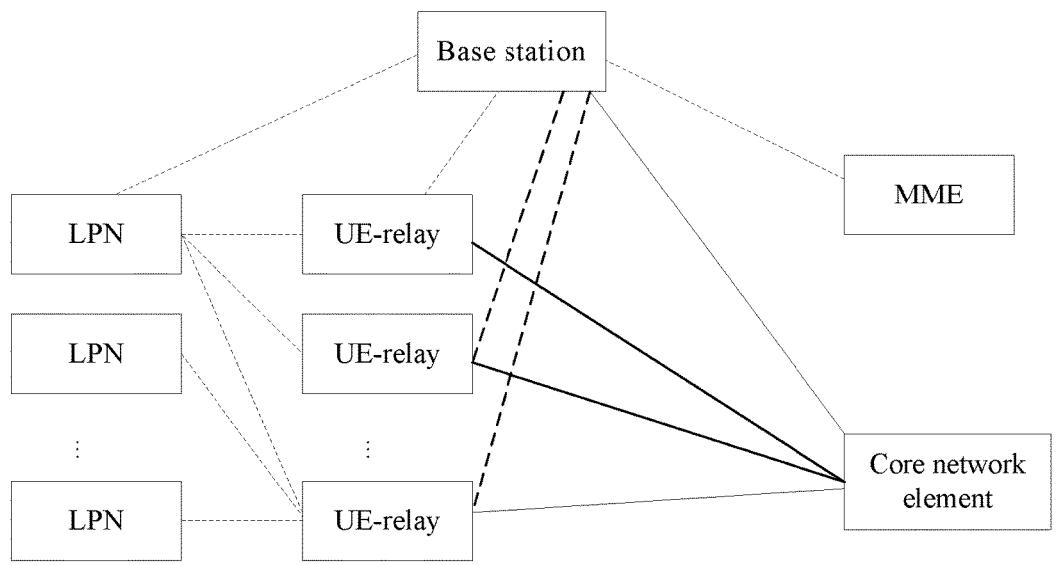
FIG. 1 is a schematic architectural diagram of a network for deploying a small cell according to an embodiment of the present disclosure.

This application is applicable to a network, shown in FIG. 1, for deploying a small cell. The network includes at least one UE-relay, at least one LPN, a base station, a mobility management entity (MME), and a core network element. The UE-relay is wiredly connected to the core network element, and the UE-relay is wirelessly connected to the LPN. In addition, the base station is wiredly connected to the core network element, and the base station may be wirelessly or wiredly connected to the LPN. In the following embodiments, an example in which the base station is wirelessly connected to the LPN is used, and uplink/downlink resources mentioned in the following embodiments are uplink/downlink spectrum resources of the base station. Therefore, a data bearer between the base station and the core network element is an S1 bearer, and a data bearer between the base station and the LPN is a data radio bearer (DRB). An evolved UMTS terrestrial radio access network (E-UTRAN) radio access bearer (E-RAB) includes the S1 bearer and the DRB bearer. DRB bearers (backhaul links) in the E-RAB bearer share uplink/downlink resources of the base station. For example, when the core network element needs to send downlink data to the LPN, the DRB bearer in the E-RAB bearer occupies downlink resources of the base station. When the LPN needs to send uplink data to the core network element, the DRB bearer in the E-RAB bearer occupies uplink resources of the base station. One LPN may include multiple E-RAB bearers, and each E-RAB bearer includes a backhaul link between the base station and the LPN. In FIG. 1, a solid line represents a wired connection, and a dashed line represents a wireless connection. It should be noted that a connection relationship, shown in FIG. 1, between the LPN and the UE-relay is merely for illustration. A manner of a connection between the LPN and the UE-relay is not limited in this application.

It should be noted that, that the UE-relay is wiredly connected to the core network element is merely for describing a case in which there is a data transmission capability between the UE-relay and the core network element. However, whether actual data transmission can be performed between the UE-relay and the core network element needs to depend on a data bearer between the UE-relay and the core network element. The UE-relay and the core network element can perform actual data transmission only after the data bearer is established between the UE-relay and the core network element. Likewise, that the UE-relay is wirelessly connected to the LPN is merely for describing a case in which there is a data transmission capability between the UE-relay and the LPN. However, whether actual data transmission can be performed between the UE-relay and the LPN needs to depend on a radio bearer between the UE-relay and the LPN. The UE-relay and the LPN can perform actual data transmission only after the radio bearer is established between the UE-relay and the LPN. In addition, the UE-relay involved in the embodiments of the present disclosure is user equipment that has a data relay function and that can perform data communication with a core network. Such devices are collectively referred to as UE-relays in this application.

The following describes technical solutions of the present disclosure in detail by using specific embodiments. The following specific embodiments may be mutually combined, and same or similar concepts or processes may not be repeatedly described in some embodiments.

FIG. 2 is a schematic flowchart of Embodiment 1 of a backhaul link establishment method according to the embodiments of the present disclosure. As shown in FIG. 2, the method includes the following steps.

S101. A base station receives a backhaul offloading establishment request message sent by an MME, where the backhaul offloading establishment request message includes an identity (ID) of a first LPN, an ID of a first UE-relay, an ID of a first to-be-established bearer of the first LPN, first S1 configuration information of the first to-be-established bearer, and an indicator for a quality of service (QoS) requirement that the first to-be-established bearer needs to meet, the first LPN is one of the at least one LPN, and the first UE-relay is one of the at least one UE-relay.

Specifically, the base station receives the backhaul offloading establishment request message sent by the MME. The first LPN corresponding to the ID of the first LPN in the backhaul offloading establishment request message may be an LPN that is in a network, for which a bearer needs to be established, and that is determined by the MME. Optionally, the first LPN may be an LPN that is in the network and whose backhaul capacity is limited, or may be an LPN for which a unique E-RAB bearer needs to be established by using a UE-relay (that is, no bearer is previously established between the LPN and the base station or between the LPN and a core network element). The first UE-relay may be a UE-relay that can establish a bearer for the first LPN and that is determined by the MME. Optionally, the first UE-relay may be a UE-relay that can establish an offloading bearer for the first LPN and that is determined by the MME (the offloading bearer is used to offload one or more to-be-offloaded E-RAB bearers of the first LPN), or may be a UE-relay that can establish a unique E-RAB bearer for the first LPN and that is determined by the MME.

In addition, the backhaul offloading establishment request message includes the ID of the first LPN, the ID of the first UE-relay, the ID of the first to-be-established bearer of the first LPN, the first S1 configuration information of the first to-be-established bearer, and the indicator for the QoS requirement that the first to-be-established bearer needs to meet. The base station may learn, by using the ID of the first LPN, an LPN that is in the network and for which a bearer currently needs to be established, learn, by using the ID of the first UE-relay, a UE-relay that is required by the first LPN to establish a bearer for the first LPN, learn, by using the ID of the first to-be-established bearer, an ID of a bearer currently to be established by the first UE-relay, learn, by using the first S1 configuration information of the first to-be-established bearer, information required for an S1 bearer in the first to-be-established bearer, and learn, by using the indicator for the QoS requirement that the first to-be-established bearer needs to meet, the QoS requirement that the first to-be-established bearer needs to meet. Optionally, the QoS requirement indicator of the first to-be-established bearer may be an explicit QoS requirement of the first to-be-established bearer, or may be an implicit QoS requirement of the first to-be-established bearer. For example, when the first to-be-established bearer is an offloading bearer of an E-RAB bearer of the first LPN, the QoS requirement indicator of the first to-be-established bearer may be an ID of the E-RAB bearer. In this case, the base station is implicitly notified of the QoS requirement of the first to-be-established bearer by using the ID of the E-RAB bearer.

Optionally, the first S1 configuration information of the first to-be-established bearer may be information such as a transport layer address (an IP address of the core network element, for example, an ID address of an S-GW) or a GPRS Tunneling Protocol tunnel endpoint identifier (GTP-TEID), or both, that are related to the first to-be-established bearer.

S102. The base station sends an offloading bearer request message to the first LPN according to the ID of the first LPN, where the offloading bearer request message carries the ID of the first UE-relay, the ID of the first to-be-established bearer, and the indicator for the QoS requirement that the first to-be-established bearer needs to meet, the offloading bearer request message is used to instruct the first LPN to determine data radio bearer DRB configuration information of a second to-be-established bearer, and the second to-be-established bearer is a bearer that can be established by the first UE-relay and that is determined by the first LPN from the first to-be-established bearer according to the indicator for the QoS requirement that the first to-be-established bearer needs to meet and the ID of the first to-be-established bearer that are in the offloading bearer request message.

Specifically, when the base station learns, according to the ID of the first LPN, that the current first LPN is an LPN for which a bearer needs to be established, the base station sends the offloading bearer request message to the first LPN. The offloading bearer request message may be used to instruct the first LPN to determine the DRB configuration information of the second to-be-established bearer. The offloading bearer request message may carry the ID of the first UE-relay, the ID of the first to-be-established bearer, and the indicator for the QoS requirement that the first to-be-established bearer needs to meet. Therefore, the first LPN may further determine, from the first to-be-established bearer according to the indicator for the QoS requirement that the first to-be-established bearer needs to meet and the ID of the first to-be-established bearer that are in the offloading bearer request message, the second to-be-established bearer that can be established by the first UE-relay, and determine the DRB configuration information of the second to-be-established bearer.

Optionally, because the first LPN may include multiple first to-be-established bearers, the first LPN may determine, based on the ID of the first to-be-established bearer and the indicator for the QoS requirement that the first to-be-established bearer needs to meet and with reference to transmission capability information of the first UE-relay or with reference to a status of an air interface between the first LPN and the first UE-relay, the second to-be-established bearer that can be established by the first UE-relay. After determining the second to-be-established bearer, the first LPN further determines the DRB configuration information of the second to-be-established bearer. Optionally, the DRB configuration information of the second to-be-established bearer may be an identity of a DRB bearer in the second to-be-established bearer, or may be at least one of information about configurations of a DRB bearer in the second to-be-established bearer at the following layers: a Packet Data Convergence Protocol (PDCP) layer, a Radio Link Control (RLC) layer, a Media Access Control (MAC) layer, and a physical layer.

S103. The base station receives an offloading bearer acknowledgement message that is sent by the first LPN and that carries the DRB configuration information of the second to-be-established bearer and an ID of the second to-be-established bearer.

Specifically, after determining the DRB configuration information of the second to-be-established bearer, the first LPN sends the offloading bearer acknowledgement message to the base station. The offloading bearer acknowledgement message includes the DRB configuration information that is of the second to-be-established bearer and that is determined by the first LPN and the ID of the second to-be-established bearer. The base station learns, by using the ID of the second to-be-established bearer, a bearer that can be established by the first UE-relay.

It should be noted that the ID of the second to-be-established bearer is actually an ID of a first to-be-established bearer that can be established by the first UE-relay and that is determined by the first LPN from the first to-be-established bearer. For example, it is assumed that there are three first to-be-established bearers corresponding to IDs of the first to-be-established bearers in a backhaul offloading establishment request message that is sent by the MME and received by the base station, the IDs of the first to-be-established bearers are respectively A, B, and C, and there are three pieces of first S1 configuration information of the first to-be-established bearers: respectively first S1 configuration information of A, first S1 configuration information of B, and first S1 configuration information of C. Assuming that second to-be-established bearers that can be established by the first UE-relay and that are determined by the first LPN are A and B, IDs of the second to-be-established bearers in an offloading bearer acknowledgement message are A and B.

S104. The base station determines first S1 configuration information of the second to-be-established bearer according to the ID of the second to-be-established bearer and the first S1 configuration information of the first to-be-established bearer.

Specifically, after learning the first S1 configuration information of the first to-be-established bearer, the base station may determine the first S1 configuration information of the second to-be-established bearer according to the ID of the second to-be-established bearer in the offloading bearer acknowledgement message. Optionally, the first S1 configuration information of the second to-be-established bearer may be the same as first S1 configuration information of some or all of first to-be-established bearers. For example, according to the example in S103, the IDs of the second to-be-established bearers are A and B, first S1 configuration information of the second to-be-established bearers are the first S1 configuration information of A and the first S1 configuration information of B.

S105. The base station sends an offloading bearer configuration message to the first UE-relay according to the ID of the first UE-relay, where the offloading bearer configuration message includes the ID of the second to-be-established bearer, the DRB configuration information of the second to-be-established bearer, and the first S1 configuration information of the second to-be-established bearer, and the offloading bearer configuration message is used to instruct the first UE-relay to establish a service bearer for the first LPN.

Specifically, after receiving the DRB configuration information of the second to-be-established bearer and the ID of the second to-be-established bearer, according to the ID of the first UE-relay, the base station adds the ID of the second to-be-established bearer, the DRB configuration information of the second to-be-established bearer, and the first S1 configuration information of the second to-be-established bearer to the offloading bearer configuration message, and sends the offloading bearer configuration message to the first UE-relay. It should be noted that the first S1 configuration information of the second to-be-established bearer herein is actually first S1 configuration information of a bearer that can be established by the first UE-relay and that is determined by the first LPN from the first to-be-established bearer (that is, the first S1 configuration information of the second to-be-established bearer is actually first S1 configuration information of some first to-be-established bearers that can be established by the first UE-relay. According to the description in the foregoing example, the first S1 configuration information of the second to-be-established bearer is the first S1 configuration information of A and the first S1 configuration information of B).

Further, the first UE-relay establishes the service bearer for the first LPN according to the offloading bearer configuration message. Optionally, the service bearer established by the first UE-relay may include a wired bearer and a radio bearer. An idle uplink resource or downlink resource of the first LPN is used for the radio bearer. In this embodiment of the present disclosure, when the core network element needs to send downlink data to the first LPN, the first UE-relay may be deployed, so that the first UE-relay can establish a backhaul link (the backhaul link is an uplink radio bearer) for the first LPN by using an idle uplink resource of the first LPN. Therefore, downlink resources of the base station are prevented from being used to establish a downlink backhaul link for the first LPN to transmit the downlink data, and backhaul load on the downlink resources of the base station is reduced. In this embodiment of the present disclosure, when the first LPN needs to send uplink data to the core network element, the first UE-relay may be deployed, so that the first UE-relay can establish a backhaul link (the backhaul link is a downlink radio bearer) for the first LPN by using an idle downlink resource of the first LPN. Therefore, uplink resources of the base station are prevented from being used to establish an uplink backhaul link for the first LPN to transmit the uplink data, and backhaul load on the uplink resources of the base station is reduced.

S106. The base station sends, to a core network element by using the MME, a received ID of the service bearer and received second S1 configuration information of the service bearer that are sent by the first UE-relay, where the ID of the service bearer is the ID of the second to-be-established bearer.

Specifically, after the first UE-relay establishes the service bearer for the first LPN, the first UE-relay sends the ID of the service bearer and the second S1 configuration information of the service bearer to the MME by using the base station, and the MME forwards the ID of the service bearer and the second S1 configuration information of the service bearer to the core network element. It should be noted that the ID of the service bearer is the ID of the second to-be-established bearer, and the second S1 configuration information of the service bearer may carry a GTP-TEID and a transport layer address of the first UE-relay on a UE-relay side, so that the core network element learns, by using the second S1 configuration information of the second to-be-established bearer, a UE-relay to which data is to be sent, and learns, by using the ID of the service bearer, a service bearer for sending the data to the first UE-relay.

In an existing network for deploying a small cell, a backhaul link between each LPN and a base station may be a wireless backhaul or a wired backhaul. When the backhaul link is a wireless backhaul, multiple wireless backhauls share uplink/downlink spectrum resources of the base station. When the backhaul link is a wired backhaul, multiple wired backhauls share uplink/downlink physical transmission resources of the base station. That is, prior-art backhaul links share uplink/downlink resources of the base station. When a user in coverage of an LPN uses a large-traffic service, a required backhaul link capacity is relatively large. Therefore, multiple backhaul links of the LPN cause capacity impact on uplink/downlink resources shared by the multiple backhaul links. Consequently, backhaul load on the uplink/downlink resources increases, and data transmission reliability is affected. According to the solution provided in this embodiment of the present disclosure, a UE-relay is deployed in a network, and E-RAB bearers are established for some LPNs by using the UE-relay and idle uplink/downlink resources of the LPNs, that is, backhaul links of the LPNs are all established by using the UE-relay and the idle uplink/downlink resources of the LPNs (that is, there is no bearer between the LPNs and a base station previously), so that a quantity of prior-art backhaul links between the base station and the LPN is reduced, and then, impact on uplink/downlink resources of the base station that is caused by the backhaul link between the LPN and the base station is reduced. Alternatively, some E-RAB bearers that are of an LPN and whose capacities are limited may be offloaded by using the UE-relay and an idle uplink/downlink resource of the LPN, that is, offloading bearers may be established for these E-RAB bearers of the LPN, and data on the E-RABs may be transmitted by using the offloading bearers, so that load on backhaul links in the E-RAB bearers is reduced, and then, impact on uplink/downlink resources of a base station that is caused by a prior-art backhaul link between the base station and the LPN is reduced.

According to the backhaul link establishment method provided in this embodiment of the present disclosure, a base station receives a backhaul offloading establishment request message sent by an MME, and sends an offloading bearer request message to a first LPN according to the backhaul offloading establishment request message, so that the first LPN determines a second to-be-established bearer that can be established by a first UE-relay. Then, the base station receives an offloading bearer acknowledgement message that is sent by the first LPN and that carries DRB configuration information of the second to-be-established bearer and an ID of the second to-be-established bearer, and sends, to the first UE-relay, an offloading bearer configuration message that carries the ID of the second to-be-established bearer, the DRB configuration information of the second to-be-established bearer, and first S1 configuration information of the second to-be-established bearer, so that the first UE-relay establishes a service bearer for the first LPN according to the offloading bearer configuration message. According to the method provided in this embodiment of the present disclosure, a UE-relay is deployed in a network, and a backhaul link is established for a first LPN by using the UE-relay and an idle uplink/downlink resource of the first LPN, or offloading bearers are established, by using the UE-relay and an idle uplink/downlink resource of a first LPN, for some E-RAB bearers that are of the first LPN and whose capacities are limited, so that impact on uplink/downlink resources of a base station that is caused by a prior-art backhaul link between the base station and the LPN is reduced, backhaul load on the uplink/downlink resources of the base station is reduced, and reliable data transmission is ensured.

Further, the service bearer that is established by the first UE-relay according to the offloading bearer configuration message sent by the base station may include a DRB bearer that is established by the first UE-relay according to the DRB configuration information of the second to-be-established bearer, and an S1 bearer that is established by the first UE-relay according to the first S1 configuration information of the second to-be-established bearer.

Figure 3A:
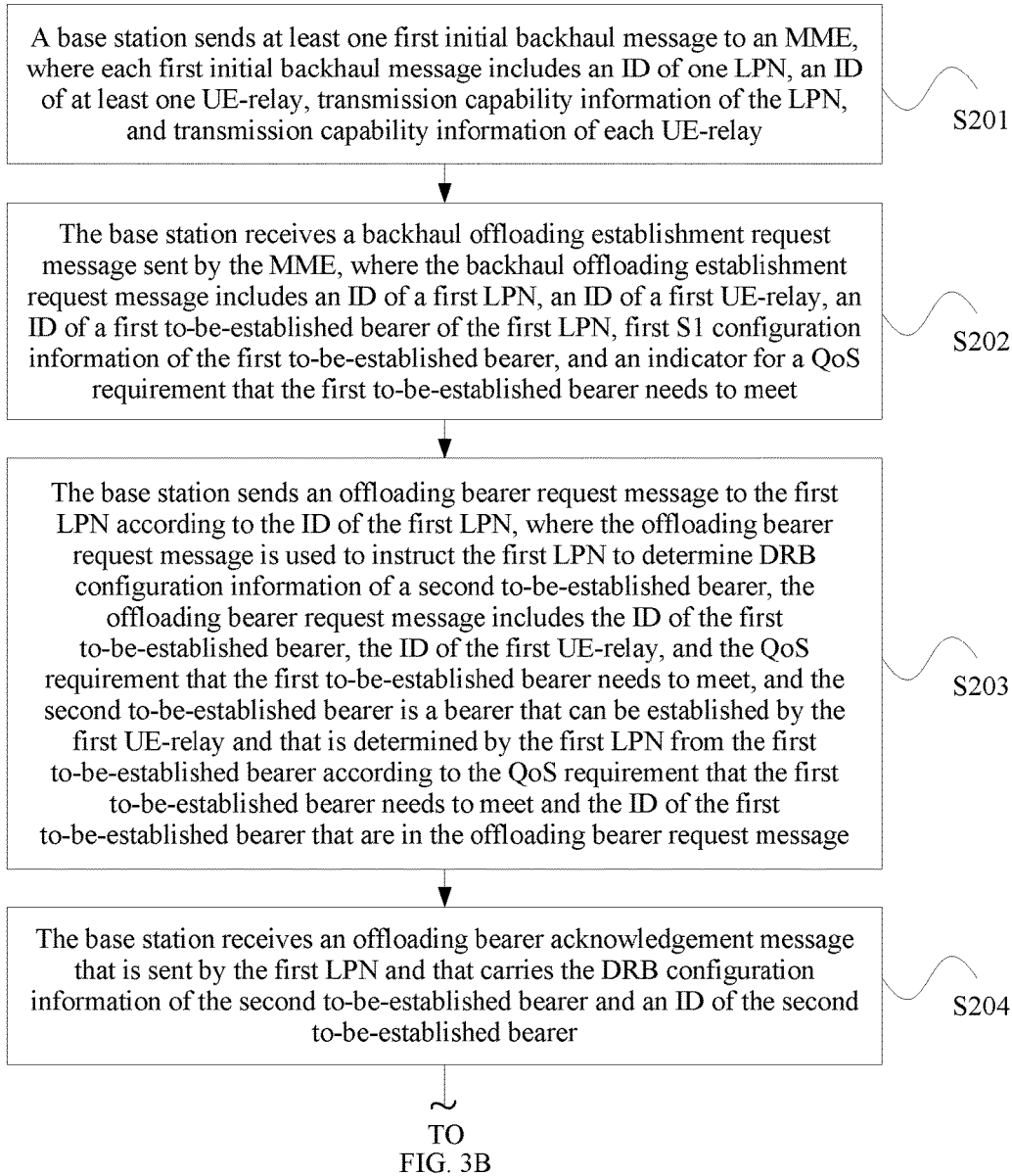

FIG. 3A and FIG. 3B are a schematic flowchart of Embodiment 2 of a backhaul link establishment method according to the embodiments of the present disclosure. This embodiment involves a specific process in which a first UE-relay establishes a service bearer for a first LPN when no service bearer is established between the first LPN and each of a base station and a core network element. As shown in FIG. 3A and FIG. 3B, the method includes the following steps.

S201. The base station sends at least one first initial backhaul message to an MME, where each first initial backhaul message includes an ID of one LPN, an ID of at least one UE-relay, transmission capability information of the LPN, and transmission capability information of each UE-relay.

Specifically, each LPN in a network is corresponding to one first initial backhaul message. Therefore, the base station needs to send the at least one first initial backhaul message to the MME. Each first initial backhaul message includes an ID of an LPN corresponding to the first initial backhaul message, the ID of the at least one UE-relay, transmission capability information of the LPN, and transmission capability information of each UE-relay. It should be noted that the at least one UE-relay corresponding to the ID of the at least one UE-relay included in the first initial backhaul message may be specifically a UE-relay that has a capability of establishing a bearer for an LPN. The transmission capability information of the LPN may be non-access stratum protocol data unit (non-access stratum protocol data unit, NAS-PDU for short) information of the LPN, and the transmission capability information of the UE-relay may be specifically NAS-PDU information of the UE-relay.

S202. The base station receives a backhaul offloading establishment request message sent by the MME, where the backhaul offloading establishment request message includes an ID of the first LPN, an ID of the first UE-relay, an ID of a first to-be-established bearer of the first LPN, first S1 configuration information of the first to-be-established bearer, and an indicator for a QoS requirement that the first to-be-established bearer needs to meet.

In this embodiment, the indicator for the QoS requirement that the first to-be-established bearer needs to meet is the QoS requirement that the first to-be-established bearer needs to meet, the first LPN is an LPN for which a bearer needs to be established and that is determined by the MME according to transmission capability information of each LPN, the ID of the first LPN is determined by the MME according to the transmission capability information of each LPN and an ID of each LPN, the first UE-relay is a UE-relay that can establish a bearer for the first LPN and that is determined by the MME according to the transmission capability information of each UE-relay, and the ID of the first UE-relay is determined by the MME according to the transmission capability information of each UE-relay and an ID of each UE-relay.

Specifically, after receiving the first initial backhaul message sent by the base station, the MME determines, according to the transmission capability information of each LPN in the first initial backhaul message, that the first LPN is an LPN for which a bearer needs to be established, and determines, according to the transmission capability information of each UE-relay in the first initial backhaul message, that the first UE-relay is a UE-relay that can establish a bearer for the first LPN. Then, the MME sends the backhaul offloading establishment request message to the base station.

After the base station receives the backhaul offloading establishment request message sent by the MME, the base station may learn, by using the ID of the first LPN, an LPN for which a bearer currently needs to be established, learn, by using the ID of the first UE-relay, a UE-relay that is required by the first LPN to establish a bearer for the first LPN, learn, by using the ID of the first to-be-established bearer, an ID of a bearer currently to be established by the first UE-relay, learn, by using the first S1 configuration information of the first to-be-established bearer, information required for an S1 bearer in the first to-be-established bearer, and learn, by using the indicator for the QoS requirement that the first to-be-established bearer needs to meet, the QoS requirement that the first to-be-established bearer needs to meet.

S203. The base station sends an offloading bearer request message to the first LPN according to the ID of the first LPN, where the offloading bearer request message is used to instruct the first LPN to determine DRB configuration information of a second to-be-established bearer, the offloading bearer request message includes the ID of the first to-be-established bearer, the ID of the first UE-relay, and the indicator for the QoS requirement that the first to-be-established bearer needs to meet, and the second to-be-established bearer is a bearer that can be established by the first UE-relay and that is determined by the first LPN from the first to-be-established bearer according to the indicator for the QoS requirement that the first to-be-established bearer needs to meet and the ID of the first to-be-established bearer that are in the offloading bearer request message.

Specifically, because the base station has already learned, by using the ID of the first LPN, an LPN for which a bearer currently needs to be established, according to the ID of the first LPN, the base station may add the ID of the first to-be-established bearer, the QoS requirement that the first to-be-established bearer needs to meet, and the ID of the first UE-relay that are in the backhaul offloading establishment request message to the offloading bearer request message, and send the offloading bearer establishment request message to the first LPN. The first LPN learns, according to the QoS requirement that the first to-be-established bearer needs to meet, DRB QoS requirement that the first to-be-established bearer needs to meet. The DRB QoS requirement is actually a QoS requirement that a DRB bearer in the first to-be-established bearer needs to meet. Then, the first LPN obtains a status (for example, channel quality or a packet loss rate) of an air interface between the first LPN and the first UE-relay, and determines whether the air interface status meets the determined DRB QoS requirement (that is, determines that the status of the air interface between the first LPN and the first UE-relay is suitable for establishing a DRB bearer in which first to-be-established bearer), so as to determine the second to-be-established bearer and then determine the DRB configuration information of the second to-be-established bearer.

According to the example in Embodiment 1, assuming that there are three first to-be-established bearers corresponding to IDs of the first to-be-established bearers in a backhaul offloading establishment request message, and the IDs of the first to-be-established bearers are respectively A, B, and C, there are also three first to-be-established bearers corresponding to IDs of the first to-be-established bearers in an offloading bearer request message sent by the base station to the first LPN, and IDs of the first to-be-established bearers are respectively A, B, and C. Then, the first LPN determines that the status of the air interface between the first LPN and the first UE-relay is suitable for establishing first to-beestablished bearers whose IDs are A and B, and the first LPN determines the two first to-be-established bearers as second to-be-established bearers. IDs of the second to-be-established bearers are A and B.

Then, the first LPN sends an offloading bearer acknowledgement message to the base station. The offloading bearer acknowledgement message carries the DRB configuration information of the second to-be-established bearer and an ID of the second to-be-established bearer.

S204. The base station receives an offloading bearer acknowledgement message that is sent by the first LPN and that carries the DRB configuration information of the second to-be-established bearer and an ID of the second to-be-established bearer.

S205. The base station determines first S1 configuration information of the second to-be-established bearer according to the ID of the second to-be-established bearer and the first S1 configuration information of the first to-be-established bearer.

S206. The base station sends an offloading bearer configuration message to the first UE-relay according to the ID of the first UE-relay, where the offloading bearer configuration message includes the ID of the second to-be-established bearer, the DRB configuration information of the second to-be-established bearer, and the first S1 configuration information of the second to-be-established bearer, and the offloading bearer configuration message is used to instruct the first UE-relay to establish a service bearer for the first LPN.

It should be noted that the first S1 configuration information of the second to-be-established bearer is actually first S1 configuration information of a first to-be-established bearer that can be established by the first UE-relay and that is determined by the first LPN. According to the description in the foregoing example, the first S1 configuration information of the second to-be-established bearer is first S1 configuration information of A and first S1 configuration information of B in the foregoing example.

Specifically, the first UE-relay establishes the service bearer for the first LPN according to the offloading bearer configuration message. Optionally, the service bearer established by the first UE-relay may include a DRB bearer that is established by the first UE-relay according to the DRB configuration information of the second to-be-established bearer, and an S1 bearer that is established by the first UE-relay according to the first S1 configuration information of the second to-be-established bearer. In this embodiment of the present disclosure, when the core network element needs to send downlink data to the first LPN, the first UE-relay may be deployed, so that the first UE-relay can establish an uplink backhaul link (that is, an uplink DRB bearer) for the first LPN by using an idle uplink resource of the first LPN. Therefore, downlink resources of the base station are prevented from being used to establish a downlink DRB bearer for the first LPN to transmit the downlink data, and backhaul load on the downlink resources of the base station is reduced. In this embodiment of the present disclosure, when the first LPN needs to send uplink data to the core network element, the first UE-relay may be deployed, so that the first UE-relay can establish a downlink backhaul link (that is, a downlink DRB bearer) for the first LPN by using an idle downlink resource of the first LPN. Therefore, uplink resources of the base station are prevented from being used to establish an uplink DRB bearer for the first LPN to transmit the uplink data, and backhaul load on the uplink resources of the base station is reduced. Therefore, when the first UE-relay establishes an uplink DRB bearer for the first LPN by using an uplink resource of the first LPN, the downlink resources of the base station are prevented from being used to establish a downlink DRB bearer for the first LPN, and the backhaul load on the downlink resources of the base station is reduced. When the first UE-relay establishes a downlink DRB bearer for the first LPN by using a downlink resource of the first LPN, the uplink resources of the base station are prevented from being used to establish an uplink DRB bearer for the first LPN, and the backhaul load on the uplink resources of the base station is reduced.

S207. The base station receives an offloading bearer configuration acknowledgement message sent by the first UE-relay, where the offloading bearer configuration acknowledgement message includes an ID of the service bearer and second S1 configuration information of the service bearer.

Specifically, after the first UE-relay establishes the service bearer for the first LPN, the first UE-relay adds the ID of the service bearer and the second S1 configuration information of the service bearer to the offloading bearer configuration acknowledgement message, and sends the offloading bearer configuration acknowledgement message to the base station. It should be noted that the ID of the service bearer is the ID of the second to-be-established bearer, and the second S1 configuration information of the service bearer may carry a GTP-TEID and a transport layer address of the first UE-relay on a UE-relay side.

S208. The base station sends a backhaul offloading establishment request acknowledgement message to the MME, where the backhaul offloading establishment request acknowledgement message includes the ID of the service bearer and the second S1 configuration information of the service bearer, the backhaul offloading establishment request acknowledgement message is used to instruct the MME to send, to the core network element, a bearer modification request message that carries the ID of the service bearer and the second S1 configuration information of the service bearer, and the bearer modification request message is used to indicate the service bearer to the core network element.

Specifically, the base station reads the ID of the service bearer and the second S1 configuration information of the service bearer from the offloading bearer configuration acknowledgement message, adds the ID of the service bearer and the second S1 configuration information of the service bearer to the backhaul offloading establishment request acknowledgement message, and sends the backhaul offloading establishment request acknowledgement message to the MME, so that the MME sends, to the core network element, the bearer modification request message that carries the ID of the service bearer and the second S1 configuration information of the service bearer, and indicates specific content of the service bearer to the core network element by using the bearer modification request message. In this case, the core network element learns, by using the second S1 configuration information of the second to-be-established bearer in the bearer modification request message, a UE-relay to which data is to be sent, and learns, by using the ID of the service bearer, a bearer for sending the data to the first UE-relay.

Optionally, the backhaul offloading establishment request message may further include a traffic flow template of the first UE-relay, the offloading bearer configuration message may further include the traffic flow template of the first UE-relay, and the traffic flow template of the first UE-relay is used to instruct the first UE-relay to establish a mapping relationship between the DRB bearer and the S1 bearer in the service bearer, so that a correspondence between a wired bearer and a radio bearer in a data transmission process is learned expressly, data misrepresentation is avoided, and data transmission reliability is further improved.

According to the backhaul link establishment method provided in this embodiment of the present disclosure, after sending a first initial backhaul message to an MME, a base station receives a backhaul offloading establishment request message sent by the MME, and sends, to a first LPN according to the backhaul offloading establishment request message, an offloading bearer request message that carries an ID of a first to-be-established bearer, an ID of a first UE-relay, and a QoS requirement that the first to-be-established bearer needs to meet, so that the first LPN determines a second to-be-established bearer that can be established by the first UE-relay. Then, the base station receives an offloading bearer acknowledgement message that is sent by the first LPN and that carries DRB configuration information of the second to-be-established bearer and an ID of the second to-be-established bearer, and sends, to the first UE-relay, an offloading bearer configuration message that carries the ID of the second to-be-established bearer, the DRB configuration information of the second to-be-established bearer, and first S1 configuration information of the second to-be-established bearer, so that the first UE-relay establishes a service bearer for the first LPN according to the offloading bearer configuration message. According to the method provided in this embodiment of the present disclosure, a UE-relay is deployed in a network, and an E-RAB bearer is established for an LPN in the network by using the UE-relay and an idle uplink/downlink resource of the LPN, that is, some backhaul links between a base station and the LPN are established by using uplink/downlink resources of the first LPN, so that a quantity of prior-art backhaul links between the base station and the LPN is reduced, then, impact on uplink/downlink resources of the base station that is caused by the backhaul link between the LPN and the base station is reduced, backhaul load on the uplink/downlink resources of the base station is reduced, and reliable data transmission is ensured.

Figure 4A:
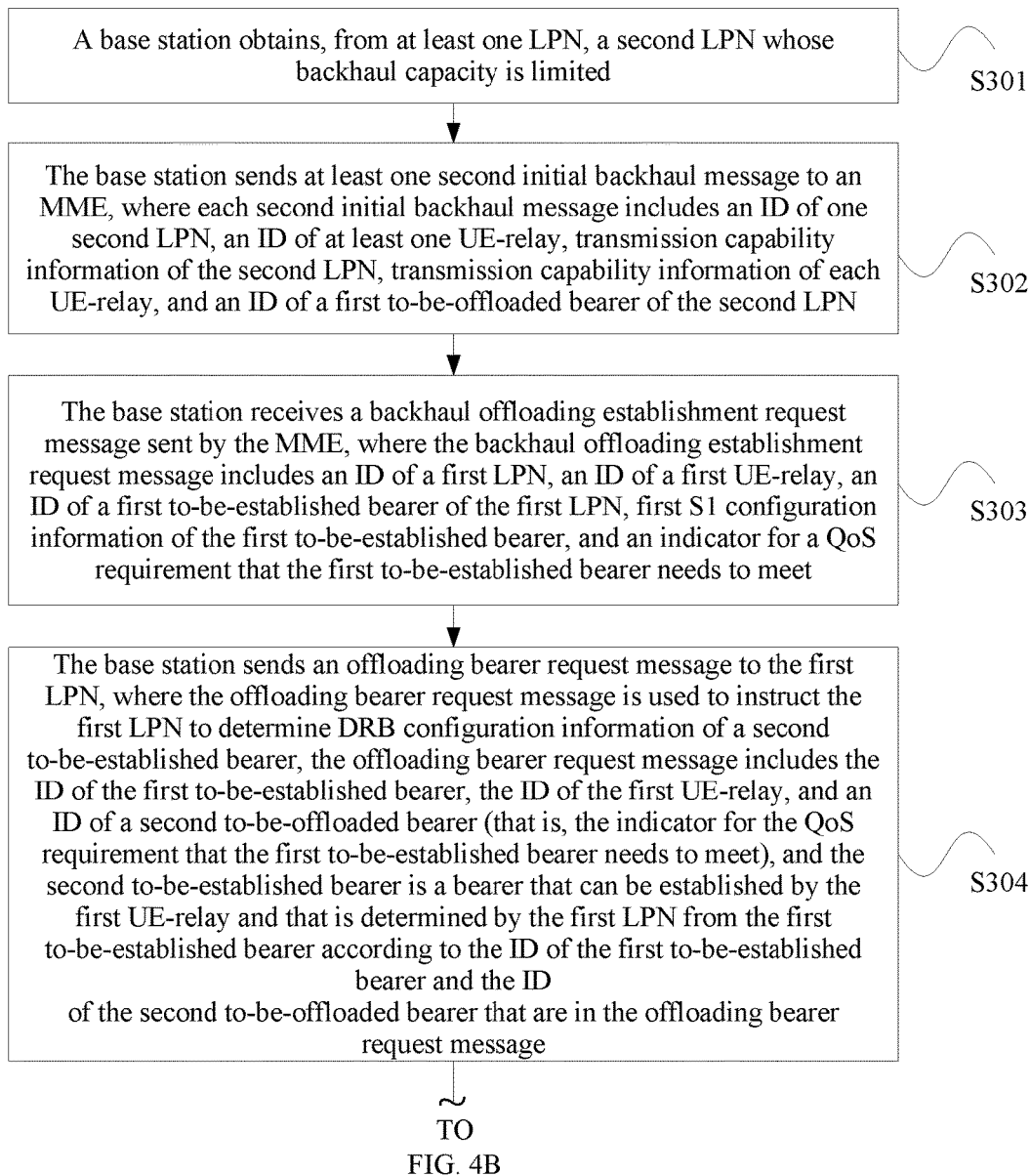

FIG. 4A and FIG. 4B are a schematic flowchart of Embodiment 3 of a backhaul link establishment method according to the embodiments of the present disclosure. This embodiment involves a specific process in which after a base station learns that backhaul capacities of some LPNs in a network are limited, a UE-relay offloads the LPNs whose backhaul capacities are limited. As shown in FIG. 4A and FIG. 4B, the method includes the following steps.

S301. The base station obtains, from at least one LPN, a second LPN whose backhaul capacity is limited.

Specifically, the base station may learn, by means of signaling interaction with an LPN, whether a backhaul capacity of the LPN is limited. Optionally, the LPN may report, to the base station, an explicit signaling message indicating whether the backhaul capacity of the LPN is limited, or may report measurement data related to the backhaul capacity to the base station, and the base station determines whether the backhaul capacity of the LPN is limited, so as to determine the second LPN whose backhaul capacity is limited.

S302. The base station sends at least one second initial backhaul message to an MME, where each second initial backhaul message includes an ID of one second LPN, an ID of at least one UE-relay, transmission capability information of the second LPN, transmission capability information of each UE-relay, and an ID of a first to-be-offloaded bearer of the second LPN.

Specifically, each second LPN in a network is corresponding to one second initial backhaul message. Therefore, the base station needs to send the at least one second initial backhaul message to the MME. Each second initial backhaul message includes an ID of a second LPN corresponding to the second initial backhaul message, the ID of the at least one UE-relay, transmission capability information of the second LPN, and the transmission capability information of each UE-relay. It should be noted that the at least one UE-relay included in the second initial backhaul message may be specifically a UE-relay that has a capability of establishing an offloading bearer for a second LPN. The transmission capability information of the second LPN may be NAS-PDU information of the second LPN, and the transmission capability information of the UE-relay may be specifically NAS-PDU information of the UE-relay.

S303. The base station receives a backhaul offloading establishment request message sent by the MME, where the backhaul offloading establishment request message includes an ID of a first LPN, an ID of a first UE-relay, an ID of a first to-be-established bearer of the first LPN, first S1 configuration information of the first to-be-established bearer, and an indicator for a QoS requirement that the first to-be-established bearer needs to meet.

In this embodiment, the indicator for the QoS requirement that the first to-be-established bearer needs to meet may be specifically an ID of the following second to-be-offloaded bearer. The first LPN is an LPN for which an offloading bearer needs to be established and that is determined by the MME from the second LPN according to transmission capability information of each second LPN, the ID of the first LPN is determined by the MME according to the transmission capability information of each second LPN and an ID of each second LPN, the first UE-relay is a UE-relay that can establish an offloading bearer for the first LPN and that is determined by the MME according to the transmission capability information of each UE-relay, the ID of the first UE-relay is determined by the MME according to the transmission capability information of each UE-relay and an ID of each UE-relay, the first to-be-established bearer is an offloading bearer that is determined by the MME and that is corresponding to a second to-be-offloaded bearer of the first LPN, and the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer and transmission capability information of the first UE-relay and/or transmission capability information of the first LPN.

Specifically, after receiving the second initial backhaul message sent by the base station, the MME determines, from the second LPN according to the transmission capability information of each second LPN in the second initial backhaul message, that the first LPN is an LPN for which an offloading bearer needs to be established (that is, determines that the first LPN is an LPN that currently needs to be offloaded. Although backhaul capacities of all the second LPNs are limited, the MME determines that some second LPNs whose backhaul capacities are not greatly limited may not be offloaded first, and the MME may first select, as a first LPN, a second LPN whose backhaul capacity is greatly limited, and offload the second LPN), and determines, according to the transmission capability information of each UE-relay in the second initial backhaul message, that the first UE-relay is a UE-relay that can establish an offloading bearer for the first LPN.

In addition, after determining the first LPN and the first UE-relay, the MME screens the first to-be-offloaded bearer of the first LPN to determine the second to-be-offloaded bearer of the first LPN (the second to-be-offloaded bearer is a currently to-be-offloaded bearer). Specifically, the MME determines, from all first to-be-offloaded bearers of the first LPN according to IDs of the first to-be-offloaded bearers of the first LPN and the transmission capability information of the first UE-relay and/or the transmission capability information of the first LPN, a to-be-offloaded bearer that can be offloaded by using the first UE-relay. For example, assuming that the first UE-relay uses a wired fiber of a maximum of 1 M for offloading (a wired fiber of 1 M may be considered as a capacity limit of an S1 bearer), because the MME knows a capacity of each first to-be-offloaded bearer of the first LPN, the MME may learn a first to-be-offloaded bearer for which the current first UE-relay can establish an offloading bearer, so as to determine a second to-be-offloaded bearer. For another example, assuming that both 1#first to-be-offloaded bearer and 2#first to-be-offloaded bearer of the current first LPN that are determined by the MME have quite heavy load, but the first LPN can still bear load on the 2#first to-be-offloaded bearer, the MME determines that offloading needs to be performed only on the 1#first to-be-offloaded bearer, and therefore, determines that the 1#first to-be-offloaded bearer is a second to-be-offloaded bearer. In addition, the first to-be-established bearer is an offloading bearer corresponding to the second to-be-offloaded bearer, that is, the first to-be-established bearer is used as an offloading bearer of the second to-be-offloaded bearer to offload the second to-be-offloaded bearer. That is, in this embodiment, there is a mapping relationship between an ID of the second to-be-offloaded bearer and the ID of the first to-be-established bearer. After the MME determines the first LPN, the first UE-relay, and the first to-be-established bearer, the MME sends the backhaul offloading establishment request message to the base station.

The base station receives the backhaul offloading establishment request message sent by the MME, and the base station may learn, by using the ID of the first LPN, an LPN for which an offloading bearer currently needs to be established, and learn, by using the ID of the first UE-relay, a UE-relay that is required by the first LPN to establish an offloading bearer for the first LPN, and learn, by using the ID of the first to-be-established bearer, an ID of an offloading bearer currently to be established by the first UE-relay (that is, the first to-be-established bearer is an offloading bearer), learn, by using the first S1 configuration information of the first to-be-established bearer, information required for an S1 bearer in the first to-be-established bearer, and learn, by using the ID of the second to-be-offloaded bearer, a QoS requirement that the second to-be-offloaded bearer needs to meet, so as to learn the QoS requirement that the first to-be-established bearer corresponding to the second to-be-offloaded bearer needs to meet.

S304. The base station sends an offloading bearer request message to the first LPN, where the offloading bearer request message is used to instruct the first LPN to determine DRB configuration information of a second to-be-established bearer, the offloading bearer request message includes the ID of the first to-be-established bearer, the ID of the first UE-relay, and an ID of a second to-be-offloaded bearer (that is, the indicator for the QoS requirement that the first to-be-established bearer needs to meet), and the second to-be-established bearer is a bearer that can be established by the first UE-relay and that is determined by the first LPN from the first to-be-established bearer according to the ID of the first to-be-established bearer and the ID of the second to-be-offloaded bearer that are in the offloading bearer request message.

Specifically, the base station adds the ID of the first to-be-established bearer, the ID of the first UE-relay, and the ID of the second to-be-offloaded bearer that are in the backhaul offloading establishment request message to the offloading bearer establishment request message, and sends the offloading bearer establishment request message to the first LPN. The first LPN learns, according to the ID of the second to-be-offloaded bearer, the QoS requirement that the second to-be-offloaded bearer needs to meet, so as to learn the QoS requirement that the first to-be-established bearer corresponding to the second to-be-offloaded bearer needs to meet, and then learn DRB QoS that the first to-be-established bearer needs to meet. The DRB QoS requirement is actually a QoS requirement that a DRB bearer in the first to-be-established bearer needs to meet. Then, the first LPN obtains a status (for example, channel quality or a packet loss rate) of an air interface between the first LPN and the first UE-relay, and determines whether the air interface status meets the determined DRB QOS requirement (that is, determines that the status of the air interface between the first LPN and the first UE-relay is suitable for establishing a DRB bearer in which first to-be-established bearer), so as to determine the second to-be-established bearer and then determine the DRB configuration information of the second to-be-established bearer.

For example, it is assumed that second LPNs carried in a second initial backhaul message sent by the base station to the MME are respectively A#second LPN, B#second LPN, and C#second LPN, IDs of the second LPNs are respectively A, B, and C, and each second LPN includes at least one first to-be-offloaded bearer. It is assumed that the base station determines that the A#second LPN is a first LPN, and IDs of first to-be-offloaded bearers of the A#second LPN are respectively 1#, 2#, and 3#. The MME determines, according to the IDs of the first to-be-offloaded bearers of the A#second LPN and transmission capability information of the A#second LPN and/or the transmission capability information of the first UE-relay, that 1# and 2# are to-be-offloaded bearers that can be offloaded by using the first UE-relay, that is, determines that 1# and 2# are second to-be-offloaded bearers, and determines that 1#' is an ID of a first to-be-established bearer corresponding to the 1#second to-be-offloaded bearer and 2#' is an ID of a first to-be-established bearer corresponding to the 2#second to-be-offloaded bearer. Then, the MME sends, to the base station, a backhaul offloading establishment request message that carries the ID of the first LPN, the ID of the first UE-relay, 1#', 2#', first S1 configuration information of the 1#' first to-be-established bearer, first S1 configuration information of the 2#' first to-be-established bearer, 1#, and 2#.

Then, the base station adds the ID of the first LPN, the ID of the first UE-relay, 1#, and 2# to an offloading bearer request message, and sends the offloading bearer request message to the first LPN, and the first LPN learns, according to the IDs (1# and 2#) of the second to-be-offloaded bearers, QoS requirements that the second to-be-offloaded bearers need to meet, so as to learn QoS requirements that the first to-be-established bearers (1#' and 2#') corresponding to the second to-be-offloaded bearers need to meet and then learn DRB QoS requirements that the first to-be-established bearers (1#' and 2#') need to meet. Then, the first LPN obtains a status of an air interface between the first LPN and the first UE-relay, and determines whether the air interface status meets the determined DRB QOS requirements (that is, determines that the status of the air interface between the first LPN and the first UE-relay is suitable for establishing a DRB bearer in which first to-be-established bearer). Assuming that the first LPN determines that the status of the air interface between the first LPN and the first UE-relay matches a DRB QoS requirement of 1#', the first LPN determines that 1#' is a second to-be-established bearer, and determines DRB configuration information of 1#'.

Then, the first LPN (that is, the A#second LPN) sends an offloading bearer acknowledgement message to the base station. The offloading bearer acknowledgement message carries the DRB configuration information of the second to-be-established bearer and an ID of the second to-be-established bearer.

S305. The base station receives an offloading bearer acknowledgement message that is sent by the first LPN and that carries the DRB configuration information of the second to-be-established bearer and an ID of the second to-be-established bearer.

S306. The base station determines first S1 configuration information of the second to-be-established bearer according to the ID of the second to-be-established bearer and the first S1 configuration information of the first to-be-established bearer.

S307. The base station sends an offloading bearer configuration message to the first UE-relay, where the offloading bearer configuration message includes the ID of the second to-be-established bearer, the DRB configuration information of the second to-be-established bearer, and the first S1 configuration information of the second to-be-established bearer, and the offloading bearer configuration message is used to instruct the first UE-relay to establish a service bearer for the first LPN.

It should be noted that the first S1 configuration information of the second to-be-established bearer is actually first S1 configuration information of some first to-be-established bearers that can be established by the first UE-relay and that are determined by the first LPN. According to the description in the foregoing example, the first S1 configuration information of the second to-be-established bearer is first S1 configuration information of 1#'.

Specifically, the first UE-relay establishes the service bearer for the first LPN according to the offloading bearer configuration message. Optionally, the service bearer established by the first UE-relay may include a DRB bearer that is established by the first UE-relay according to the DRB configuration information of the second to-be-established bearer, and an S1 bearer that is established by the first UE-relay according to the first S1 configuration information of the second to-be-established bearer. In addition, when a DRB bearer in the second to-be-offloaded bearer is a downlink DRB bearer, the DRB bearer in the bearer established by the first UE-relay is an uplink DRB bearer; or when a DRB bearer in the second to-be-offloaded bearer is an uplink DRB bearer, the DRB bearer in the bearer established by the first UE-relay is a downlink DRB bearer. In addition, when the DRB bearer in the service bearer established by the first UE-relay is an uplink DRB bearer, an idle uplink resource of the first LPN is used for the DRB bearer, so that downlink resources of the base station are prevented from being used to establish a DRB bearer for the first LPN. When the DRB bearer in the service bearer established by the first UE-relay is a downlink DRB bearer, an idle downlink resource of the first LPN is used for the DRB bearer, so that uplink resources of the base station are prevented from being used to establish a DRB bearer for the first LPN, and backhaul load on the uplink resources of the base station is reduced.

S308. The base station receives an offloading bearer configuration acknowledgement message sent by the first UE-relay, where the offloading bearer configuration acknowledgement message includes an ID of the service bearer and second S1 configuration information of the service bearer.

Specifically, after the first UE-relay establishes the service bearer for the first LPN, the first UE-relay adds the ID of the service bearer and the second S1 configuration information of the service bearer to the offloading bearer configuration acknowledgement message, and sends the offloading bearer configuration acknowledgement message to the base station. It should be noted that the ID of the service bearer is the ID of the second to-be-established bearer, and the second S1 configuration information of the service bearer may carry a GTP-TEID and a transport layer address of the first UE-relay on a UE-relay side.

S309. The base station sends a backhaul offloading establishment request acknowledgement message to the MME, where the backhaul offloading establishment request acknowledgement message includes the ID of the service bearer and the second S1 configuration information of the service bearer, the backhaul offloading establishment request acknowledgement message is used to instruct the MME to send, to a core network element, a bearer modification request message that carries the ID of the service bearer and the second S1 configuration information of the service bearer, and the bearer modification request message is used to indicate the service bearer to the core network element.

Specifically, the base station reads the ID of the service bearer and the second S1 configuration information of the service bearer from the offloading bearer configuration acknowledgement message, adds the ID of the service bearer and the second S1 configuration information of the service bearer to the backhaul offloading establishment request acknowledgement message, and sends the backhaul offloading establishment request acknowledgement message to the MME, so that the MME sends, to the core network element, the bearer modification request message that carries the ID of the service bearer and the second S1 configuration information of the service bearer, and indicates specific content of the service bearer to the core network element by using the bearer modification request message. In this case, the core network element learns, by using the second S1 configuration information of the second to-be-established bearer in the bearer modification request message, a UE-relay to which data is to be sent, and learns, by using the ID of the service bearer, a second to-be-offloaded bearer currently to be offloaded by using the service bearer.

Optionally, the backhaul offloading establishment request message may further include a traffic flow template of the first UE-relay, the offloading bearer configuration message may further include the traffic flow template of the first UE-relay, and the traffic flow template of the first UE-relay is used to instruct the first UE-relay to establish a mapping relationship between the DRB bearer and the S1 bearer in the service bearer, so that a correspondence between a wired bearer and a radio bearer in a data transmission process is learned expressly, data misrepresentation is avoided, and data transmission reliability is further improved.

According to the backhaul link establishment method provided in this embodiment of the present disclosure, after sending a second initial backhaul message to an MME, a base station receives a backhaul offloading establishment request message sent by the MME, and sends, to a first LPN according to the backhaul offloading establishment request message, an offloading bearer request message that carries an ID of a first to-be-established bearer, an ID of a first UE-relay, and an ID of a second to-be-offloaded bearer, so that the first LPN determines a second to-be-established bearer that can be established by the first UE-relay. Then, the base station receives an offloading bearer acknowledgement message that is sent by the first LPN and that carries DRB configuration information of the second to-be-established bearer and an ID of the second to-be-established bearer, and sends, to the first UE-relay, an offloading configuration message that carries the ID of the second to-be-established bearer, the DRB configuration information of the second to-be-established bearer, and first S1 configuration information of the second to-be-established bearer, so that the first UE-relay establishes a service bearer for the first LPN according to the offloading bearer configuration message. According to the method provided in this embodiment of the present disclosure, a UE-relay is deployed in a network, and an offloading bearer is established, by using the UE-relay and with reference to an idle uplink/downlink resource and fixed-network resource of a first LPN, for the LPN that is in the network and whose backhaul capacity is limited, so that impact on uplink-downlink resources of a base station that is caused by a prior-art backhaul link between the base station and the LPN is reduced, backhaul load on the uplink-downlink resources of the base station is reduced, and reliable data transmission is ensured.

FIG. 5 is a schematic flowchart of Embodiment 4 of a backhaul link establishment method according to the embodiments of the present disclosure. The method is applicable to the network, shown in FIG. 1, for deploying a small cell. As shown in FIG. 5, the method includes the following steps.

S401. A first LPN receives an offloading bearer request message that is sent by a base station according to an identity ID of the first LPN in a backhaul offloading establishment request message sent by an MME, where the backhaul offloading establishment request message includes the ID of the first LPN, an ID of a first UE-relay, an ID of a first to-be-established bearer of the first LPN, first S1 configuration information of the first to-be-established bearer, and an indicator for a quality of service QoS requirement that the first to-be-established bearer needs to meet, the offloading bearer request message carries the ID of the first UE-relay, the ID of the first to-be-established bearer of the first LPN, and the indicator for the QoS requirement that the first to-be-established bearer needs to meet, the first LPN is one of at least one LPN, and the first UE-relay is one of at least one UE-relay.

Specifically, before the first LPN receives the offloading bearer request message sent by the base station, the base station receives the backhaul offloading establishment request message sent by the MME. Then, when the base station learns, according to the ID of the first LPN in the backhaul offloading establishment request message, that the current first LPN is an LPN for which a bearer needs to be established, the base station sends the offloading bearer request message to the first LPN.

It should be noted that the first LPN corresponding to the ID of the first LPN in the backhaul offloading establishment request message may be an LPN that is in a network, for which a bearer needs to be established, and that is determined by the MME. Optionally, the first LPN may be an LPN that is in the network and whose backhaul capacity is limited, or may be an LPN for which a unique E-RAB bearer needs to be established by using a UE-relay (that is, no bearer is previously established between the LPN and the base station or between the LPN and a core network element). The first UE-relay may be a UE-relay that can establish a bearer for the first LPN and that is determined by the MME. Optionally, the first UE-relay may be a UE-relay that can establish an offloading bearer for the first LPN and that is determined by the MME (the offloading bearer is used to offload one or more to-be-offloaded E-RAB bearers of the first LPN), or may be a UE-relay that can establish a unique E-RAB bearer for the first LPN and that is determined by the MME.

In addition, optionally, the indicator, in the backhaul offloading establishment request message, for the QoS requirement that the first to-be-established bearer needs to meet may be an explicit QoS requirement of the first to-be-established bearer, or may be an implicit QoS requirement of the first to-be-established bearer. For example, when the first to-be-established bearer is an offloading bearer of an E-RAB bearer of the first LPN, the indicator for the QoS requirement that the first to-be-established bearer needs to meet may be an ID of the E-RAB bearer. In this case, the base station is implicitly notified of the QoS requirement of the first to-be-established bearer by using the ID of the E-RAB bearer. Optionally, the first S1 configuration information of the first to-be-established bearer may be information such as a transport layer address (an IP address of the core network element, for example, an ID address of an S-GW) or a GTP TEID or both that are related to the first to-be-established bearer.

S402. The first LPN determines, according to the offloading bearer request message, data radio bearer DRB configuration information of a second to-be-established bearer that can be established by the first UE-relay, where the second to-be-established bearer is a bearer that can be established by the first UE-relay and that is determined by the first LPN from the first to-be-established bearer of the first LPN according to the indicator for the QoS requirement that the first to-be-established bearer needs to meet and the ID of the first to-be-established bearer that are in the offloading bearer request message.

Specifically, the first LPN may determine, from the first to-be-established bearer according to the indicator for the QoS requirement that the first to-be-established bearer needs to meet and the ID of the first to-be-established bearer that are in the offloading bearer request message, the second to-be-established bearer that can be established by the first UE-relay, and determine the DRB configuration information of the second to-be-established bearer. Optionally, the first LPN may determine, based on the ID of the first to-be-established bearer and the indicator for the QoS requirement that the first to-be-established bearer needs to meet and with reference to transmission capability information of the first UE-relay or with reference to a status of an air interface between the first LPN and the first UE-relay, the second to-be-established bearer that can be established by the first UE-relay. After determining the second to-be-established bearer, the first LPN further determines the DRB configuration information of the second to-be-established bearer.

S403. The first LPN sends an offloading bearer acknowledgement message to the base station, where the offloading bearer acknowledgement message includes the DRB configuration information of the second to-be-established bearer and an ID of the second to-be-established bearer, the offloading bearer acknowledgement message is used to instruct the base station to send an offloading bearer configuration message to the first UE-relay according to the ID of the first UE-relay, the offloading bearer configuration message includes the ID of the second to-be-established bearer, the DRB configuration information of the second to-be-established bearer, and first S1 configuration information of the second to-be-established bearer, the offloading bearer configuration message is used to instruct the first UE-relay to establish a service bearer for the first LPN, and the first S1 configuration information of the second to-be-established bearer is determined by the base station according to the ID of the second to-be-established bearer and the first S1 configuration information of the first to-be-established bearer.

Specifically, after determining the DRB configuration information of the second to-be-established bearer, the first LPN sends the offloading bearer acknowledgement message to the base station. The offloading bearer acknowledgement message includes the DRB configuration information that is of the second to-be-established bearer and that is determined by the first LPN and the ID of the second to-be-established bearer. The base station learns, by using the ID of the second to-be-established bearer, an ID of a bearer that can be established by the first UE-relay. It should be noted that the ID of the second to-be-established bearer is actually an ID of a first to-be-established bearer that can be established by the first UE-relay and that is determined by the first LPN from the first to-be-established bearer. For details, refer to the example in Embodiment 1. Details are not described herein again. In addition, for determining the first S1 configuration information of the second to-be-established bearer by the base station according to the ID of the second to-be-established bearer and the first S1 configuration information of the first to-be-established bearer, refer to the example in Embodiment 1. Details are not described herein again.

After receiving the DRB configuration information of the second to-be-established bearer and the ID of the second to-be-established bearer, the base station adds the ID of the second to-be-established bearer, the DRB configuration information of the second to-be-established bearer, and the first S1 configuration information of the second to-be-established bearer to the offloading bearer configuration message, and sends the offloading bearer configuration message to the first UE-relay. It should be noted that the first S1 configuration information of the second to-be-established bearer herein is actually first S1 configuration information of a bearer that can be established by the first UE-relay and that is determined by the first LPN from the first to-be-established bearer (that is, the first S1 configuration information of the second to-be-established bearer is actually first S1 configuration information of some first to-be-established bearers that can be established by the first UE-relay).

Further, the first UE-relay establishes the service bearer for the first LPN according to the offloading bearer configuration message. Optionally, the service bearer established by the first UE-relay may include a wired bearer and a radio bearer. An idle uplink resource or downlink resource of the first LPN is used for the radio bearer. In this embodiment of the present disclosure, when the core network element needs to send downlink data to the first LPN, the first UE-relay may be deployed, so that the first UE-relay can establish a backhaul link (the backhaul link is an uplink radio bearer) for the first LPN by using an idle uplink resource of the first LPN. Therefore, downlink resources of the base station are prevented from being used to establish a downlink backhaul link for the first LPN to transmit the downlink data, and backhaul load on the downlink resources of the base station is reduced. In this embodiment of the present disclosure, when the first LPN needs to send uplink data to the core network element, the first UE-relay may be deployed, so that the first UE-relay can establish a backhaul link (the backhaul link is a downlink radio bearer) for the first LPN by using an idle downlink resource of the first LPN. Therefore, uplink resources of the base station are prevented from being used to establish an uplink backhaul link for the first LPN to transmit the uplink data, and backhaul load on the uplink resources of the base station is reduced.

Still further, after the first UE-relay establishes the service bearer for the first LPN, the first UE-relay sends an ID of the service bearer and second S1 configuration information of the service bearer to the MME, and the MME forwards the ID of the service bearer and the second S1 configuration information of the service bearer to the core network element. It should be noted that the ID of the service bearer is the ID of the second to-be-established bearer, and the second S1 configuration information of the service bearer may carry a GTP-TEID and a transport layer address of the first UE-relay on a UE-relay side, so that the core network element learns, by using the second S1 configuration information of the second to-be-established bearer, a UE-relay to which data is to be sent, and learns, by using the ID of the service bearer, a bearer for sending the data to the first UE-relay.

According to the backhaul link establishment method provided in this embodiment of the present disclosure, a first LPN determines, according to a received offloading bearer request message sent by a base station, DRB configuration information of a second to-be-established bearer that can be established by a first UE-relay, and sends, to the base station, an offloading bearer acknowledgement message that carries the DRB configuration information of the second to-be-established bearer and an ID of the second to-be-established bearer, so that the base station sends, to the first UE-relay, an offloading bearer configuration message that carries the ID of the second to-be-established bearer, the DRB configuration information of the second to-be-established bearer, and first S1 configuration information of the second to-be-established bearer. In this case, the first UE-relay establishes a service bearer for the first LPN according to the offloading bearer configuration message. According to the method provided in this embodiment of the present disclosure, a UE-relay is deployed in a network, and a backhaul link is established for a first LPN by using the UE-relay and an idle uplink/downlink resource of the LPN, or an offloading bearer is established, by using the UE-relay and an idle uplink/downlink resource of a first LPN, for an E-RAB bearer that is of the LPN and whose capacity is limited, so that impact on uplink/downlink resources of a base station that is caused by a prior-art backhaul link between the base station and the LPN is reduced, backhaul load on the uplink/downlink resources of the base station is reduced, and reliable data transmission is ensured.

Further, the service bearer that is established by the first UE-relay according to the offloading bearer configuration message sent by the base station may include a DRB bearer that is established by the first UE-relay according to the DRB configuration information of the second to-be-established bearer, and an S1 bearer that is established by the first UE-relay according to the first S1 configuration information of the second to-be-established bearer.

Figure 6:
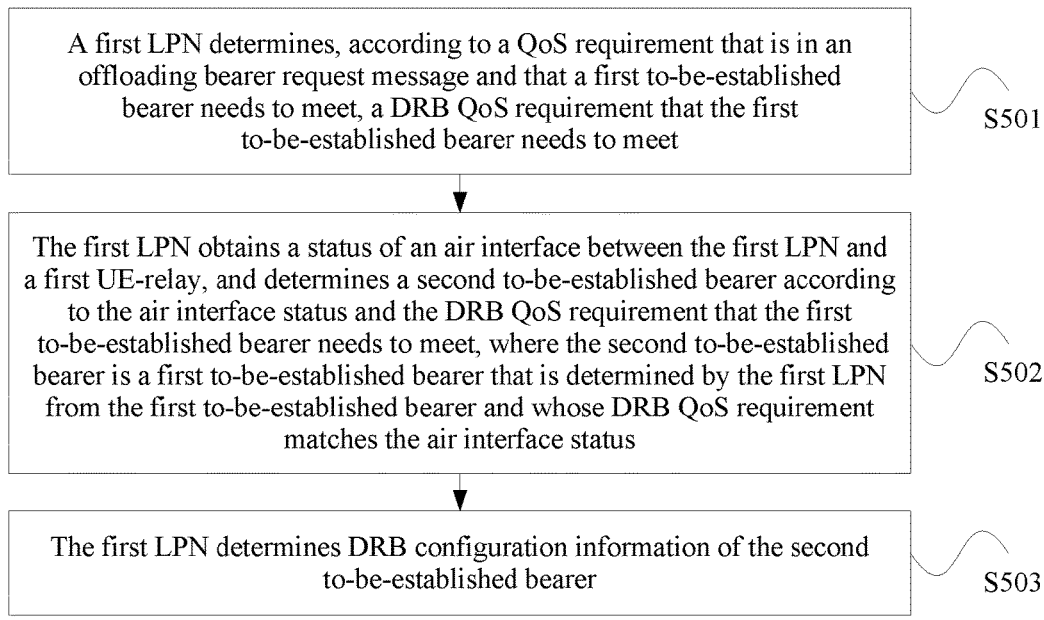
FIG. 6 is a schematic flowchart of Embodiment 5 of a backhaul link establishment method according to the embodiments of the present disclosure.

FIG. 6 is a schematic flowchart of Embodiment 5 of a backhaul link establishment method according to the embodiments of the present disclosure. This embodiment involves a specific process in which a first LPN determines DRB configuration information of a second to-be-established bearer according to content in an offloading bearer request message when no bearer is established between the first LPN and a base station or between the first LPN and a core network element. In this embodiment, an indicator for a QoS requirement that a first to-be-established bearer needs to meet is specifically the QoS requirement that the first to-be-established bearer needs to meet, the first LPN is an LPN for which a bearer needs to be established and that is determined by an MME according to transmission capability information of an LPN in at least one first initial backhaul message sent by the base station, an ID of the first LPN is determined by the MME according to the transmission capability information of the LPN and an ID of the LPN, a first UE-relay is a UE-relay that can establish a bearer for the first LPN and that is determined by the MME according to transmission capability information of each UE-relay in the at least one first initial backhaul message sent by the base station, an ID of the first UE-relay is determined by the MME according to the transmission capability information of each UE-relay and an ID of each UE-relay, and each first initial backhaul message includes an ID of one LPN, an ID of the at least one UE-relay, transmission capability information of the LPN, and the transmission capability information of each UE-relay. The offloading bearer request message may specifically include an ID of the first to-be-established bearer, the ID of the first UE-relay, and the QoS requirement that the first to-be-established bearer needs to meet. As shown in FIG. 6, the method includes the following steps.

S501. The first LPN determines, according to an indicator, in an offloading bearer request message, for a QoS requirement that a first to-be-established bearer needs to meet, a DRB QoS requirement that the first to-be-established bearer needs to meet.

Specifically, in this embodiment, the indicator for the QoS requirement that the first to-be-established bearer needs to meet is the QoS requirement that the first to-be-established bearer needs to meet. Therefore, the first LPN may directly learn, according to the QoS requirement that the first to-be-established bearer needs to meet, the DRB QoS requirement that the first to-be-established bearer needs to meet. The DRB QoS requirement is actually a QoS requirement that a DRB bearer in the first to-be-established bearer needs to meet.

It should be noted that this embodiment involves a scenario in which no bearer is established between the first LPN and the base station or between the first LPN and the core network element. Therefore, on the basis of Embodiment 4, optionally, before the base station receives a backhaul offloading establishment request message sent by the MME, the base station may send at least one first initial backhaul message to the MME. Each first initial backhaul message includes an ID of one LPN in a network, an ID of at least one UE-relay, transmission capability information of the LPN, and transmission capability information of each UE-relay. It should be noted that the at least one UE-relay included in the first initial backhaul message may be specifically a UE-relay that has a capability of establishing a bearer for an LPN. The transmission capability information of the LPN may be NAS-PDU information of the LPN, and the transmission capability information of the UE-relay may be specifically NAS-PDU information of the UE-relay.

After receiving the first initial backhaul message sent by the base station, the MME determines, according to transmission capability information of each LPN in the first initial backhaul message, that the first LPN is an LPN for which a bearer needs to be established, and determines, according to the transmission capability information of each UE-relay in the first initial backhaul message, that the first UE-relay is a UE-relay that can establish a bearer for the first LPN. Then, the MME sends the backhaul offloading establishment request message to the base station, so that the base station sends, to the first LPN, the offloading bearer request message that carries an ID of the first to-be-established bearer, an ID of the first UE-relay, and the QoS requirement that the first to-be-established bearer needs to meet.

S502. The first LPN obtains a status of an air interface between the first LPN and the first UE-relay, and determines a second to-be-established bearer according to the air interface status and the DRB QoS requirement that the first to-be-established bearer needs to meet, where the second to-be-established bearer is a first to-be-established bearer that is determined by the first LPN from the first to-be-established bearer and whose DRB QoS requirement matches the air interface status.

Specifically, the first LPN obtains the status (for example, channel quality or a packet loss rate) of the air interface between the first LPN and the first UE-relay, and determines whether the air interface status meets the determined DRB QOS requirement (that is, determines that the status of the air interface between the first LPN and the first UE-relay is suitable for establishing a DRB bearer in which first to-be-established bearer), so as to determine the second to-be-established bearer. Optionally, the first LPN may actively measure the status of the air interface between the first LPN and the first UE-relay, or the first UE-relay may report the air interface status to the first LPN.

S503. The first LPN determines DRB configuration information of the second to-be-established bearer.

After the first LPN determines the DRB configuration information of the second to-be-established bearer, the first LPN sends an offloading bearer acknowledgement message to the base station, where the offloading bearer acknowledgement message carries the DRB configuration information of the second to-be-established bearer and an ID of the second to-be-established bearer, so as to trigger the base station to send, to the first UE-relay, an offloading bearer configuration message that carries the ID of the second to-be-established bearer, the DRB configuration information of the second to-be-established bearer, and first S1 configuration information of the second to-be-established bearer. In addition, the offloading bearer configuration message is used to instruct the first UE-relay to establish a service bearer for the first LPN.

Optionally, the service bearer established by the first UE-relay may include a DRB bearer that is established by the first UE-relay according to the DRB configuration information of the second to-be-established bearer, and an S1 bearer that is established by the first UE-relay according to the first S1 configuration information of the second to-be-established bearer. In this embodiment of the present disclosure, when the core network element needs to send downlink data to the first LPN, the first UE-relay may be deployed, so that the first UE-relay can establish an uplink backhaul link (that is, an uplink DRB bearer) for the first LPN by using an idle uplink resource of the first LPN. Therefore, downlink resources of the base station are prevented from being used to establish a downlink DRB bearer for the first LPN, and backhaul load on the downlink resources of the base station is reduced. In this embodiment of the present disclosure, when the first LPN needs to send uplink data to the core network element, the first UE-relay may be deployed, so that the first UE-relay can establish a downlink backhaul link (that is, a downlink DRB bearer) for the first LPN by using an idle downlink resource of the first LPN. Therefore, uplink resources of the base station are prevented from being used to establish an uplink DRB bearer for the first LPN, and backhaul load on the uplink resources of the base station is reduced. Therefore, when the first UE-relay establishes an uplink DRB bearer for the first LPN by using an uplink resource of the first LPN, the downlink resources of the base station are prevented from being used to establish a downlink DRB bearer for the first LPN, and the backhaul load on the downlink resources of the base station is reduced. When the first UE-relay establishes a downlink DRB bearer for the first LPN by using a downlink resource of the first LPN, the uplink resources of the base station are prevented from being used to establish an uplink DRB bearer for the first LPN, and the backhaul load on the uplink resources of the base station is reduced.

It should be noted that the first S1 configuration information of the second to-be-established bearer is actually first S1 configuration information of some first to-be-established bearers that can be established by the first UE-relay and that are determined by the first LPN.

According to the backhaul link establishment method provided in this embodiment of the present disclosure, after sending a first initial backhaul message to an MME, a base station receives a backhaul offloading establishment request message sent by the MME, and sends, to a first LPN according to the backhaul offloading establishment request message, an offloading bearer request message that carries an ID of a first to-be-established bearer, an ID of a first UE-relay, and a an indicator for a QoS requirement that the first to-be-established bearer needs to meet, so that the first LPN determines DRB configuration information of a second to-be-established bearer that can be established by the first UE-relay, and sends, to the base station, an offloading bearer acknowledgement message that carries the DRB configuration information of the second to-be-established bearer and an ID of the second to-be-established bearer. In this case, the base station sends, to the first UE-relay, an offloading configuration message that carries the ID of the second to-be-established bearer, the DRB configuration information of the second to-be-established bearer, and first S1 configuration information of the second to-be-established bearer, so that the first UE-relay establishes a service bearer for the first LPN according to the offloading bearer configuration message. According to the method provided in this embodiment of the present disclosure, a UE-relay is deployed in a network, and an E-RAB bearer is established for a first LPN in the network by using the UE-relay and an uplink/downlink resource of the LPN, that is, some backhaul links between a base station and the LPN are established by using uplink/downlink resources of the first LPN, so that a quantity of prior-art backhaul links between the base station and the LPN is reduced, then, impact on uplink/downlink resources of the base station that is caused by the backhaul link between the LPN and the base station is reduced, backhaul load on the uplink/downlink resources of the base station is reduced, and reliable data transmission is ensured.

Figure 7:
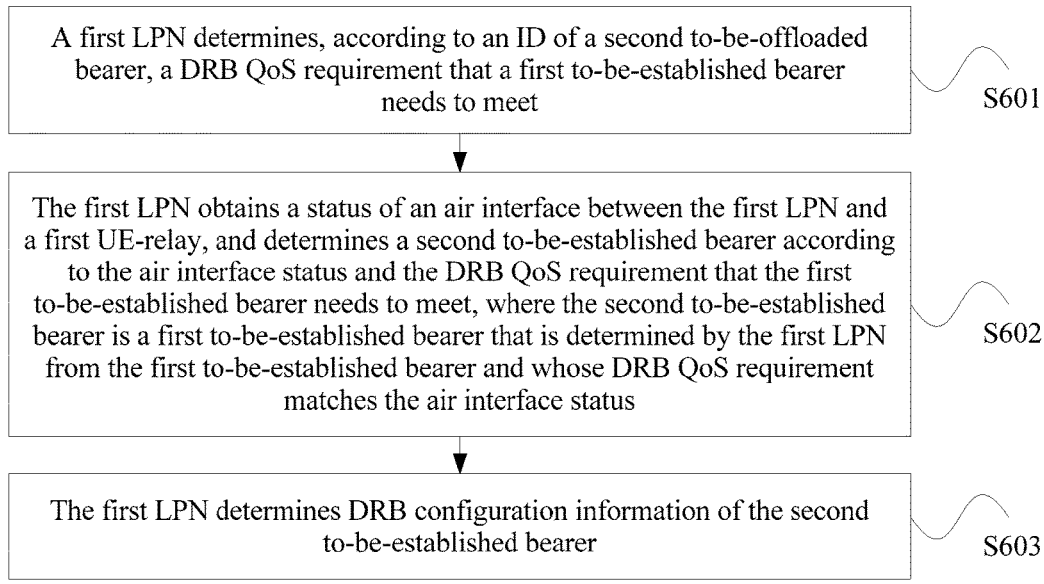
FIG. 7 is a schematic flowchart of Embodiment 6 of a backhaul link establishment method according to the embodiments of the present disclosure.

FIG. 7 is a schematic flowchart of Embodiment 6 of a backhaul link establishment method according to the embodiments of the present disclosure. This embodiment involves a specific process in which a first LPN determines DRB configuration information of a second to-be-established bearer according to content in an offloading bearer request message when the base station learns that a backhaul a base station learns that a backhaul capacity of a second LPN in a network is limited. In this embodiment, the first LPN is an LPN for which an offloading bearer needs to be established and that is determined by an MME from the second LPN according to transmission capability information of the second LPN in at least one second initial backhaul message sent by the base station, an ID of the first LPN is determined by the MME according to the transmission capability information of the second LPN and an ID of the second LPN, the second LPN is an LPN whose backhaul capacity is limited and that is determined by the base station from at least one LPN, the first UE-relay is a first UE-relay that can establish an offloading bearer for the first LPN and that is determined by the MME according to transmission capability information of each UE-relay in the at least one second initial backhaul message sent by the base station, an ID of the first UE-relay is determined by the MME according to the transmission capability information of each UE-relay and an ID of each UE-relay, and each second initial backhaul message includes an ID of one second LPN, an ID of the at least one UE-relay, transmission capability information of the second LPN, the transmission capability information of each UE-relay, and an ID of a first to-be-offloaded bearer of the second LPN. The first to-be-established bearer is an offloading bearer that is determined by the MME and that is corresponding to a second to-be-offloaded bearer of the first LPN, and the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer of the first LPN and transmission capability information of the first UE-relay and/or transmission capability information of the first LPN. In addition, in this embodiment, an indicator for a QoS requirement that the first to-be-established bearer needs to meet is specifically an ID of the second to-be-offloaded bearer. The offloading bearer request message specifically includes an ID of the first to-be-established bearer, the ID of the first UE-relay, and the ID of the second to-be-offloaded bearer. On the basis of the foregoing embodiment, as shown in FIG. 7, the method includes the following steps.

S601. A first to-be-established bearer determines, according to an ID of a second to-be-offloaded bearer, a DRB QoS requirement that the first to-be-established bearer needs to meet.

Specifically, the first LPN may determine a QoS requirement of the second to-be-offloaded bearer according to the ID of the second to-be-offloaded bearer. Because a QoS requirement that the first to-be-established bearer corresponding to the second to-be-offloaded bearer needs to meet is actually the QoS requirement of the second to-be-offloaded bearer, the first LPN learns the QoS requirement of the first to-be-established bearer. Therefore, the first LPN may learn, according to the QoS requirement of the first to-be-established bearer, a DRB QoS requirement that that the first to-be-established bearer needs to meet. The DRB QoS requirement is actually a QoS requirement that a DRB bearer in the first to-be-established bearer needs to meet.

It should be noted that this embodiment involves a scenario in which a backhaul capacity of a second LPN in a network is limited, and the first UE-relay needs to establish an offloading bearer for the LPN whose backhaul capacity is limited. Therefore, on the basis of Embodiment 4, optionally, before the base station receives a backhaul offloading establishment request message sent by the MME, the base station needs to obtain, from at least one LPN in the network, the second LPN whose backhaul capacity is limited. Optionally, the base station may learn, by means of signaling interaction with an LPN, whether a backhaul capacity of the LPN is limited, so as to determine the second LPN whose backhaul capacity is limited. Then, the base station sends at least one second initial backhaul message to the MME. Each second initial backhaul message includes an ID of one second LPN, an ID of at least one UE-relay, transmission capability information of the second LPN, transmission capability information of each UE-relay, and an ID of a first to-be-offloaded bearer of the second LPN. It should be noted that the at least one UE-relay included in the second initial backhaul message may be specifically a UE-relay that has a capability of establishing an offloading bearer for a second LPN. The transmission capability information of the second LPN may be NAS-PDU information of the second LPN, and the transmission capability information of the UE-relay may be specifically NAS-PDU information of the UE-relay.

After receiving the second initial backhaul message sent by the base station, the MME determines, from the second LPN according to transmission capability information of each second LPN, that the first LPN is an LPN for which an offloading bearer needs to be established (that is, determines that the first LPN is an LPN that currently needs to be offloaded. Although backhaul capacities of all the second LPNs are limited, the MME determines that some second LPNs whose backhaul capacities are not greatly limited may not be offloaded first, and the MME may first select, as a first LPN, a second LPN whose backhaul capacity is greatly limited, and offload the second LPN), and determines, according to the transmission capability information of each UE-relay, that the first UE-relay is a UE-relay that can establish an offloading bearer for the first LPN.

In addition, after determining the first LPN and the first UE-relay, the MME screens a first to-be-offloaded bearer of the first LPN to determine the second to-be-offloaded bearer of the first LPN (the second to-be-offloaded bearer is a currently to-be-offloaded bearer). Specifically, the MME determines, as the second to-be-offloaded bearer, from all first to-be-offloaded bearers of the first LPN according to IDs of the first to-be-offloaded bearers of the first LPN and transmission capability information of the first UE-relay and/or transmission capability information of the first LPN, a to-be-offloaded bearer that can be offloaded by using the first UE-relay. For example, assuming that the first UE-relay uses a wired fiber of a maximum of 1 M for offloading (a wired fiber of 1 M may be considered as a capacity limit of an S1 bearer), because the MME knows a capacity of each first to-be-offloaded bearer of the first LPN, the MME may learn a first to-be-offloaded bearer for which the current first UE-relay can establish an offloading bearer, so as to determine a second to-be-offloaded bearer. For another example, assuming that both 1#first to-be-offloaded bearer and 2#first to-be-offloaded bearer of the current first LPN that are determined by the MME have quite heavy load, but the first LPN can still bear load on the 2#first to-be-offloaded bearer, the MME determines that offloading needs to be performed only on the 1#first to-be-offloaded bearer, and therefore, determines that the 1#first to-be-offloaded bearer is a second to-be-offloaded bearer. In addition, the first to-be-established bearer is an offloading bearer corresponding to the second to-be-offloaded bearer, that is, the first to-be-established bearer is used as an offloading bearer of the second to-be-offloaded bearer to offload the second to-be-offloaded bearer. That is, in this embodiment, there is a mapping relationship between the ID of the second to-be-offloaded bearer and an ID of the first to-be-established bearer. After the MME determines the first LPN, the first UE-relay, and the first to-be-established bearer, the MME sends the backhaul offloading establishment request message to the base station.

The base station receives the backhaul offloading establishment request message sent by the MME, and sends, to the first LPN according to the backhaul offloading establishment request message, an offloading bearer request message that carries the ID of the first to-be-established bearer, an ID of the first UE-relay, and the ID of the second to-be-offloaded bearer, so that the first LPN determines, according to the ID of the second to-be-offloaded bearer, the DRB QoS requirement that the first to-be-established bearer needs to meet.

S602. The first LPN obtains a status of an air interface between the first LPN and the first UE-relay, and determines a second to-be-established bearer according to the air interface status and the DRB QoS requirement that the first to-be-established bearer needs to meet, where the second to-be-established bearer is a first to-be-established bearer that is determined by the first LPN from the first to-be-established bearer and whose DRB QoS requirement matches the air interface status.

Specifically, the first LPN obtains the status (for example, channel quality or a packet loss rate) of the air interface between the first LPN and the first UE-relay, and determines whether the air interface status meets the determined DRB QOS requirement (that is, determines that the status of the air interface between the first LPN and the first UE-relay is suitable for establishing a DRB bearer in which first to-be-established bearer), so as to determine the second to-be-established bearer. Optionally, the first LPN may actively measure the status of the air interface between the first LPN and the first UE-relay, or the first UE-relay may report the air interface status to the first LPN.

S603. The first LPN determines DRB configuration information of the second to-be-established bearer.

After the first LPN determines the DRB configuration information of the second to-be-established bearer, the first LPN sends, to the base station, an offloading bearer acknowledgement message that carries the DRB configuration information of the second to-be-established bearer and an ID of the second to-be-established bearer, so as to trigger the base station to send, to the first UE-relay, an offloading bearer configuration message that carries the ID of the second to-be-established bearer, the DRB configuration information of the second to-be-established bearer, and first S1 configuration information of the second to-be-established bearer. In addition, the offloading bearer configuration message is used to instruct the first UE-relay to establish a service bearer for the first LPN (the service bearer is an offloading bearer in this embodiment).

Optionally, the service bearer established by the first UE-relay may include a DRB bearer that is established by the first UE-relay according to the DRB configuration information of the second to-be-established bearer, and an S1 bearer that is established by the first UE-relay according to the first S1 configuration information of the second to-be-established bearer. In addition, when a DRB bearer in the second to-be-offloaded bearer is a downlink DRB bearer, the DRB bearer in the service bearer established by the first UE-relay is an uplink DRB bearer; or when a DRB bearer in the second to-be-offloaded bearer is an uplink DRB bearer, the DRB bearer in the service bearer established by the first UE-relay is a downlink DRB bearer. In addition, when the DRB bearer in the service bearer established by the first UE-relay is an uplink DRB bearer, an idle uplink resource of the first LPN is used for the DRB bearer, so that downlink resources of the base station are prevented from being used to establish a DRB bearer for the first LPN. When the DRB bearer in the service bearer established by the first UE-relay is a downlink DRB bearer, an idle downlink resource of the first LPN is used for the DRB bearer, so that uplink resources of the base station are prevented from being used to establish a DRB bearer for the first LPN, and backhaul load on the uplink resources of the base station is reduced.

It should be noted that the first S1 configuration information of the second to-be-established bearer is actually first S1 configuration information of some first to-be-established bearers that can be established by the first UE-relay and that are determined by the first LPN.

According to the backhaul link establishment method provided in this embodiment of the present disclosure, after sending a second initial backhaul message to an MME, a base station receives a backhaul offloading establishment request message sent by the MME, and sends, to a first LPN according to the backhaul offloading establishment request message, an offloading bearer request message that carries an ID of a first to-be-established bearer, an ID of a first UE-relay, and an ID of a second to-be-offloaded bearer, so that the first LPN determines DRB configuration information of a second to-be-established bearer that can be established by the first UE-relay, and sends, to the base station, an offloading bearer acknowledgement message that carries the DRB configuration information of the second to-be-established bearer and an ID of the second to-be-established bearer. In this case, the base station sends, to the first UE-relay, an offloading configuration message that carries the ID of the second to-be-established bearer, the DRB configuration information of the second to-be-established bearer, and first S1 configuration information of the second to-be-established bearer, so that the first UE-relay establishes an offloading bearer for the first LPN according to the offloading bearer configuration message. According to the method provided in this embodiment of the present disclosure, a UE-relay is deployed in a network, and an offloading bearer is established, by using the UE-relay and with reference to an idle uplink/downlink resource and fixed-network resource of a first LPN, for the LPN that is in the network and whose backhaul capacity is limited, so that impact on uplink-downlink resources of a base station that is caused by a prior-art backhaul link between the base station and the LPN is reduced, backhaul load on the uplink-downlink resources of the base station is reduced, and reliable data transmission is ensured.

FIG. 8 is a schematic flowchart of Embodiment 7 of a backhaul link establishment method according to the embodiments of the present disclosure. The method in this embodiment is applicable to the network, shown in FIG. 1, for deploying a small cell. As shown in FIG. 8, the method specifically includes the following steps.

S701. A first UE-relay receives an offloading bearer configuration message that is sent by a base station according to an identity ID of the first UE-relay, where the offloading bearer configuration message includes an ID of a second to-be-established bearer, first S1 configuration information of the second to-be-established bearer, and DRB configuration information of the second to-be-established bearer, the second to-be-established bearer is a bearer that can be established by the first UE-relay and that is determined by a first LPN from a first to-be-established bearer of the first LPN according to an indicator for a QoS requirement that the first to-be-established bearer needs to meet and an ID of the first to-be-established bearer of the first LPN that are in an offloading bearer request message sent by the base station, the offloading bearer request message carries the ID of the first UE-relay, the ID of the first to-be-established bearer, and the indicator for the QoS requirement that the first to-be-established bearer needs to meet, the offloading bearer request message is used to instruct the first LPN to determine the DRB configuration information of the second to-be-established bearer, the first LPN is one of the one LPN, and first UE-relay is one of the at least one UE-relay.

Specifically, optionally, before the base station sends the offloading bearer configuration message to the first UE-relay, the base station sends the offloading bearer request message to the first LPN according to a received backhaul offloading establishment request message sent by an MME. The offloading bearer request message is used to instruct the first LPN to determine the second to-be-established bearer and the DRB configuration information of the second to-be-established bearer. Optionally, the backhaul offloading establishment request message may include an ID of the first LPN, the ID of the first UE-relay, the ID of the first to-be-established bearer of the first LPN, the first S1 configuration information of the first to-be-established bearer, and the indicator for the QoS requirement that the first to-be-established bearer needs to meet. The first LPN is an LPN that is in a network, for which a bearer needs to be established, and that is determined by the MME. Optionally, the first LPN may be an LPN that is in the network and whose backhaul capacity is limited, or may be an LPN for which a unique E-RAB bearer needs to be established by using a UE-relay (that is, no bearer is previously established between the LPN and the base station or between the LPN and a core network element). The first UE-relay may be a UE-relay that can establish a bearer for the first LPN and that is determined by the MME. Optionally, the first UE-relay may be a UE-relay that can establish an offloading bearer for the first LPN and that is determined by the MME, or may be a UE-relay that can establish a unique E-RAB bearer for the first LPN and that is determined by the MME. Optionally, the first S1 configuration information of the first to-be-established bearer may be information such as a transport layer address or a GTP TED related to the first to-be-established bearer.

Further, when the base station learns, according to the ID of the first LPN, that the current first LPN is an LPN for which a bearer needs to be established, the base station sends the offloading bearer request message to the first LPN, so that the first LPN feeds the ID of the second to-be-established bearer and the DRB configuration information of the second to-be-established bearer back to the base station after determining the second to-be-established bearer and the DRB configuration information of the second to-be-established bearer according to the indicator for the quality of service QoS requirement that the first to-be-established bearer needs to meet and the ID of the first to-be-established bearer of the first LPN that are in the offloading bearer request message. In this case, the base station adds the ID of the second to-be-established bearer, the DRB configuration information of the second to-be-established bearer, and the first S1 configuration information of the second to-be-established bearer to the offloading bearer configuration message, and sends the offloading bearer configuration message to the first UE-relay. Optionally, the DRB configuration information of the second to-be-established bearer may be an identity of a DRB bearer in the second to-be-established bearer, or may be at least one of information about configurations of a DRB bearer in the second to-be-established bearer at the following layers: a PDCP layer, an RLC layer, a MAC layer, and a physical layer.

It should be noted that the first S1 configuration information of the second to-be-established bearer is actually first S1 configuration information of a bearer that can be established by the first UE-relay and that is determined by the first LPN from the first to-be-established bearer (that is, the first S1 configuration information of the second to-be-established bearer is actually first S1 configuration information of some first to-be-established bearers that can be established by the first UE-relay).

S702. The first UE-relay establishes a service bearer for the first LPN according to the first S1 configuration information of the second to-be-established bearer and the DRB configuration information of the second to-be-established bearer.

Optionally, the service bearer established by the first UE-relay may include a wired bearer and a radio bearer. An idle uplink resource or downlink resource of the first LPN is used for the radio bearer. In this embodiment of the present disclosure, when the core network element needs to send downlink data to the first LPN, the first UE-relay may be deployed, so that the first UE-relay can establish a backhaul link (the backhaul link is an uplink radio bearer) for the first LPN by using an idle uplink resource of the first LPN. Therefore, downlink resources of the base station are prevented from being used to establish a downlink backhaul link for the first LPN, and backhaul load on the downlink resources of the base station is reduced. In this embodiment of the present disclosure, when the first LPN needs to send uplink data to the core network element, the first UE-relay may be deployed, so that the first UE-relay can establish a backhaul link (the backhaul link is a downlink radio bearer) for the first LPN by using an idle downlink resource of the first LPN. Therefore, uplink resources of the base station are prevented from being used to establish an uplink backhaul link for the first LPN, and backhaul load on the uplink resources of the base station is reduced.

S703. The first UE-relay sends an ID of the service bearer and second S1 configuration information of the service bearer to a core network element by using the base station and an MME, where the ID of the service bearer is the ID of the second to-be-established bearer.

Specifically, after the first UE-relay establishes the service bearer for the first LPN, the first UE-relay sends the ID of the service bearer and the second S1 configuration information of the service bearer to the MME by using the base station, and the MME forwards the ID of the service bearer and the second S1 configuration information of the service bearer to the core network element. It should be noted that the ID of the service bearer is the ID of the second to-be-established bearer, and the second S1 configuration information of the service bearer may carry a GTP-TEID and a transport layer address of the first UE-relay on a UE-relay side, so that the core network element learns, by using the second S1 configuration information of the second to-be-established bearer, a UE-relay to which data is to be sent, and learns, by using the ID of the service bearer, a bearer for sending the data to the first UE-relay.

According to the backhaul link establishment method provided in this embodiment of the present disclosure, a base station sends, to a first UE-relay, an offloading bearer configuration message that carries an ID of a second to-be-established bearer, DRB configuration information of the second to-be-established bearer, and first S1 configuration information of the second to-be-established bearer, so that the first UE-relay establishes a service bearer for a first LPN according to the offloading bearer configuration message and an uplink/downlink resource of the first LPN. According to the method provided in this embodiment of the present disclosure, a UE-relay is deployed in a network, and backhaul links are established for some LPNs by using the UE-relay and idle uplink/downlink resources of the LPNs, or offloading bearers are established, by using the UE-relay and idle uplink/downlink resources of an LPN, for some E-RAB bearers that are of the LPN and whose capacities are limited, so that impact on uplink/downlink resources of a base station that is caused by a prior-art backhaul link between the base station and the LPN is reduced, backhaul load on the uplink/downlink resources of the base station is reduced, and reliable data transmission is ensured.

On the basis of the foregoing embodiment, in a possible implementation of this embodiment of the present disclosure, this embodiment involves a specific process in which the first UE-relay establishes the service bearer for the first LPN when no bearer is established between the first LPN and the base station or between the first LPN and the core network element. In this case, S702 specifically includes: establishing, by the first UE-relay, an S1 bearer between the first UE-relay and the core network element according to the first S1 configuration information of the second to-be-established bearer, and establishing a DRB bearer between the first UE-relay and the first LPN according to the DRB configuration information of the second to-be-established bearer.

In this embodiment, the indicator for the QoS requirement that the first to-be-established bearer needs to meet may be an explicit QoS requirement that the first to-be-established bearer needs to meet, the offloading bearer request message may specifically include the ID of the first to-be-established bearer, the ID of the first UE-relay, and the QoS requirement that the first to-be-established bearer needs to meet, the first LPN is an LPN for which a bearer needs to be established and that is determined by the MME according to transmission capability information of an LPN in at least one first initial backhaul message sent by the base station, the ID of the first LPN is determined by the MME according to the transmission capability information of the LPN and an ID of the LPN, the first UE-relay is a UE-relay that can establish a bearer for the first LPN and that is determined by the MME according to transmission capability information of each UE-relay in the at least one first initial backhaul message sent by the base station, the ID of the first UE-relay is determined by the MME according to the transmission capability information of each UE-relay and an ID of each UE-relay, and each first initial backhaul message includes an ID of one LPN, an ID of the at least one UE-relay, transmission capability information of the LPN, and the transmission capability information of each UE-relay.

Specifically, the first LPN may directly learn, according to the QoS requirement that the first to-be-established bearer needs to meet, DRB QoS that the first to-be-established bearer needs to meet. The DRB QoS requirement is actually a QoS requirement that a DRB bearer in the first to-be-established bearer needs to meet.

It should be noted that this embodiment involves a scenario in which no bearer is established between the first LPN and the base station or between the first LPN and the core network element. Therefore, on the basis of Embodiment 7, optionally, before the base station receives the backhaul offloading establishment request message sent by the MME, the base station may send the at least one first initial backhaul message to the MME. It should be noted that the at least one UE-relay included in the first initial backhaul message may be specifically a UE-relay that has a capability of establishing a bearer for an LPN. The transmission capability information of the LPN may be NAS-PDU information of the LPN, and the transmission capability information of the UE-relay may be specifically NAS-PDU information of the UE-relay.

After receiving the first initial backhaul message sent by the base station, the MME determines, according to transmission capability information of each LPN in the first initial backhaul message, that the first LPN is an LPN for which a bearer needs to be established, and determines, according to the transmission capability information of each UE-relay in the first initial backhaul message, that the first UE-relay is a UE-relay that can establish a bearer for the first LPN. Then, the MME sends the backhaul offloading establishment request message to the base station, so that the base station sends, to the first LPN, the offloading bearer request message that carries the ID of the first to-be-established bearer, the ID of the first UE-relay, and the QoS requirement that the first to-be-established bearer needs to meet.

Further, the first LPN obtains a status (for example, channel quality or a packet loss rate) of an air interface between the first LPN and the first UE-relay, and determines whether the air interface status meets the determined DRB QOS requirement (that is, determines that the status of the air interface between the first LPN and the first UE-relay is suitable for establishing a DRB bearer in which first to-be-established bearer), so as to determine the second to-be-established bearer. Optionally, the first LPN may actively measure the status of the air interface between the first LPN and the first UE-relay, or the first UE-relay may report the air interface status to the first LPN.

After the first LPN determines the second to-be-established bearer and the DRB configuration information of the second to-be-established bearer, the first LPN sends, to the base station, an offloading bearer acknowledgement message that carries the DRB configuration information of the second to-be-established bearer and the ID of the second to-be-established bearer, so as to trigger the base station to send, to the first UE-relay, the offloading bearer configuration message that carries the ID of the second to-be-established bearer, the DRB configuration information of the second to-be-established bearer, and the first S1 configuration information of the second to-be-established bearer. In this case, the first UE-relay establishes the bearer for the first LPN, that is, the first UE-relay establishes the S1 bearer between the first UE-relay and the core network element according to the first S1 configuration information of the second to-be-established bearer, and establishes the DRB bearer between the first UE-relay and the first LPN according to the DRB configuration information of the second to-be-established bearer.

In this embodiment of the present disclosure, when the core network element needs to send downlink data to the first LPN, the first UE-relay may be deployed, so that the first UE-relay can establish an uplink backhaul link (that is, an uplink DRB bearer) for the first LPN by using an idle uplink resource of the first LPN. Therefore, downlink resources of the base station are prevented from being used to establish a downlink DRB bearer for the first LPN, and backhaul load on the downlink resources of the base station is reduced. In this embodiment of the present disclosure, when the first LPN needs to send uplink data to the core network element, the first UE-relay may be deployed, so that the first UE-relay can establish a downlink backhaul link (that is, a downlink DRB bearer) for the first LPN by using an idle downlink resource of the first LPN. Therefore, uplink resources of the base station are prevented from being used to establish an uplink DRB bearer for the first LPN, and backhaul load on the uplink resources of the base station is reduced. Therefore, when the first UE-relay establishes an uplink DRB bearer for the first LPN by using an uplink resource of the first LPN, the downlink resources of the base station are prevented from being used to establish a downlink DRB bearer for the first LPN, and the backhaul load on the downlink resources of the base station is reduced. When the first UE-relay establishes a downlink DRB bearer for the first LPN by using a downlink resource of the first LPN, the uplink resources of the base station are prevented from being used to establish an uplink DRB bearer for the first LPN, and the backhaul load on the uplink resources of the base station is reduced.

It should be noted that the first S1 configuration information of the second to-be-established bearer is actually first S1 configuration information of some first to-be-established bearers that can be established by the first UE-relay and that are determined by the first LPN.

Optionally, the offloading bearer configuration message may further include a traffic flow template of the first UE-relay, and the traffic flow template of the first UE-relay is used to instruct the first UE-relay to establish a mapping relationship between the DRB bearer and the S1 bearer in the service bearer, so that a correspondence between a wired bearer and a radio bearer in a data transmission process is learned expressly, data misrepresentation is avoided, and data transmission reliability is further improved.

According to the backhaul link establishment method provided in this embodiment of the present disclosure, a base station sends, to a first UE-relay, an offloading configuration message that carries an ID of a second to-be-established bearer, DRB configuration information of the second to-be-established bearer, and first S1 configuration information of the second to-be-established bearer, so that the first UE-relay establishes a service bearer for a first LPN according to the offloading bearer configuration message. According to the method provided in this embodiment of the present disclosure, a UE-relay is deployed in a network, and E-RAB bearers are established for some LPNs in the network by using the UE-relay and uplink/downlink resources of the LPNs, that is, backhaul links of the LPNs are all established by using the UE-relay and uplink/downlink resources of the LPNs (that is, no bearer is established between the LPNs and a base station), so that a quantity of prior-art backhaul links between the base station and the LPN is reduced, then, impact on uplink/downlink resources of the base station that is caused by the backhaul link between the LPN and the base station is reduced, backhaul load on the uplink/downlink resources of the base station is reduced, and reliable data transmission is ensured.

On the basis of the foregoing embodiment, in another possible implementation of this embodiment of the present disclosure, this embodiment involves a specific process in which when the base station learns that a backhaul capacity of a second LPN in the network is limited, the first UE-relay offloads the LPN whose backhaul capacity is limited. In this case, S702 specifically includes: establishing, by the first UE-relay, an S1 bearer between the first UE-relay and the core network element according to the first S1 configuration information of the second to-be-established bearer, and establishing a DRB bearer between the first UE-relay and the first LPN according to the DRB configuration information of the second to-be-established bearer.

In this embodiment, the indicator for the QoS requirement that the first to-be-established bearer needs to meet is an ID of a second to-be-offloaded bearer of the first LPN, and the offloading bearer request message specifically includes the ID of the first to-be-established bearer, the ID of the first UE-relay, and the ID of the second to-be-offloaded bearer. The second to-be-offloaded bearer is a to-be-offloaded bearer that can be offloaded by using the first UE-relay and that is determined by the MME from a first to-be-offloaded bearer of the first LPN according to an ID of the first to-be-offloaded bearer of the first LPN and transmission capability information of the first UE-relay and/or transmission capability information of the first LPN, and the first to-be-established bearer is an offloading bearer corresponding to the second to-be-offloaded bearer. In addition, in this embodiment, the first LPN is an LPN for which an offloading bearer needs to be established and that is determined by the MME from the second LPN according to transmission capability information of the second LPN in at least one second initial backhaul message sent by the base station, the ID of the first LPN is determined by the MME according to the transmission capability information of the second LPN and an ID of the second LPN, the second LPN is an LPN whose backhaul capacity is limited and that is determined by the base station from the at least one LPN, the first UE-relay is a UE-relay that can establish an offloading bearer for the first LPN and that is determined by the MME according to transmission capability information of each UE-relay in the at least one second initial backhaul message sent by the base station, the ID of the first UE-relay is determined by the MME according to the transmission capability information of each UE-relay and an ID of each UE-relay, and each second initial backhaul message includes an ID of one second LPN, an ID of the at least one UE-relay, transmission capability information of the second LPN, the transmission capability information of each UE-relay, and an ID of a first to-be-offloaded bearer of the second LPN.

Specifically, the first LPN may determine a QoS requirement of the second to-be-offloaded bearer according to the ID of the second to-be-offloaded bearer. Because the QoS requirement that the first to-be-established bearer corresponding to the second to-be-offloaded bearer needs to meet is actually the QoS requirement of the second to-be-offloaded bearer, the first LPN learns the QoS requirement of the first to-be-established bearer. Therefore, the first LPN may learn, according to the QoS requirement of the first to-be-established bearer, DRB QoS that the first to-be-established bearer needs to meet. The DRB QoS requirement is actually a QoS requirement that a DRB bearer in the first to-be-established bearer needs to meet.

It should be noted that this embodiment involves a scenario in which the backhaul capacity of the second LPN in the network is limited, and the first UE-relay needs to establish an offloading bearer for the LPN whose backhaul capacity is limited. Therefore, on the basis of Embodiment 7, optionally, before the base station receives the backhaul offloading establishment request message sent by the MME, the base station needs to obtain, from the at least one LPN in the network, the second LPN whose backhaul capacity is limited. Optionally, the base station may learn, by means of signaling interaction with an LPN, whether a backhaul capacity of the LPN is limited, so as to determine the second LPN whose backhaul capacity is limited. Then, the base station sends the at least one second initial backhaul message to the MME. It should be noted that the at least one UE-relay included in the second initial backhaul message may be specifically a UE-relay that has a capability of establishing an offloading bearer for a second LPN. The transmission capability information of the second LPN may be NAS-PDU information of the second LPN, and the transmission capability information of the UE-relay may be specifically NAS-PDU information of the UE-relay.

After receiving the second initial backhaul message sent by the base station, the MME determines, from the second LPN according to transmission capability information of each second LPN in the second initial backhaul message, that the first LPN is an LPN for which an offloading bearer needs to be established (that is, determines that the first LPN is an LPN that currently needs to be offloaded. Although backhaul capacities of all the second LPNs are limited, the MME determines that some second LPNs whose backhaul capacities are not greatly limited may not be offloaded first, and the MME may first select, as a first LPN, a second LPN whose backhaul capacity is greatly limited, and offload the second LPN), and determines, according to the transmission capability information of each UE-relay in the second initial backhaul message, that the first UE-relay is a UE-relay that can establish an offloading bearer for the first LPN. In addition, after determining the first LPN and the first UE-relay, the MME screens the first to-be-offloaded bearer of the first LPN to determine the second to-be-offloaded bearer of the first LPN (the second to-be-offloaded bearer is a currently to-be-offloaded bearer). Specifically, the MME determines, from all first to-be-offloaded bearers of the first LPN according to IDs of the first to-be-offloaded bearers of the first LPN and the transmission capability information of the first UE-relay and/or the transmission capability information of the first LPN, a to-be-offloaded bearer that can be offloaded by using the first UE-relay. For example, assuming that the first UE-relay uses a wired fiber of a maximum of 1 M for offloading (a wired fiber of 1 M may be considered as a capacity limit of an S1 bearer), because the MME knows a capacity of each first to-be-offloaded bearer of the first LPN, the MME may learn a first to-be-offloaded bearer for which the current first UE-relay can establish an offloading bearer, so as to determine a second to-be-offloaded bearer. For another example, assuming that both 1#first to-be-offloaded bearer and 2#first to-be-offloaded bearer of the current first LPN that are determined by the MME have quite heavy load, but the first LPN can still bear load on the 2#first to-be-offloaded bearer, the MME determines that offloading needs to be performed only on the 1#first to-be-offloaded bearer, and therefore, determines that the 1#first to-be-offloaded bearer is a second to-be-offloaded bearer. In addition, the first to-be-established bearer is used as an offloading bearer of the second to-be-offloaded bearer to offload the second to-be-offloaded bearer. That is, in this embodiment, there is a mapping relationship between the ID of the second to-be-offloaded bearer and the ID of the first to-be-established bearer.

Then, the MME sends the backhaul offloading establishment request message to the base station, so that the base station sends, to the first LPN, the offloading bearer request message that carries the ID of the first to-be-established bearer, the ID of the first UE-relay, and the indicator for the QoS requirement that the first to-be-established bearer needs to meet. In this case, the first LPN learns, according to the ID of the second to-be-offloaded bearer in the offloading bearer request message, the DRB QoS that the first to-be-established bearer needs to meet. Further, the first LPN obtains a status (for example, channel quality or a packet loss rate) of an air interface between the first LPN and the first UE-relay, and determines whether the air interface status meets the determined DRB QOS requirement (that is, determines that the status of the air interface between the first LPN and the first UE-relay is suitable for establishing a DRB bearer in which first to-be-established bearer), so as to determine the second to-be-established bearer and the DRB configuration information of the second to-be-established bearer. Then, the first LPN sends, to the base station, an offloading bearer acknowledgement message that carries the DRB configuration information of the second to-be-established bearer and the ID of the second to-be-established bearer, so as to trigger the base station to send, to the first UE-relay, the offloading bearer configuration message that carries the ID of the second to-be-established bearer, the DRB configuration information of the second to-be-established bearer, and the first S1 configuration information of the second to-be-established bearer. In this case, the first UE-relay establishes the bearer for the first LPN, that is, the first UE-relay establishes the S1 bearer between the first UE-relay and the core network element according to the first S1 configuration information of the second to-be-established bearer, and establishes the DRB bearer between the first UE-relay and the first LPN according to the DRB configuration information of the second to-be-established bearer.

That is, the service bearer established by the first UE-relay may include the DRB bearer that is established by the first UE-relay according to the DRB configuration information of the second to-be-established bearer, and the S1 bearer that is established by the first UE-relay according to the first S1 configuration information of the second to-be-established bearer. In addition, when a DRB bearer in the second to-be-offloaded bearer is a downlink DRB bearer, the DRB bearer in the bearer established by the first UE-relay is an uplink DRB bearer; or when a DRB bearer in the second to-be-offloaded bearer is an uplink DRB bearer, the DRB bearer in the bearer established by the first UE-relay is a downlink DRB bearer. In addition, when the DRB bearer in the bearer established by the first UE-relay is an uplink DRB bearer, an idle uplink resource of the first LPN is used for the DRB bearer, so that downlink resources of the base station are prevented from being used to establish a DRB bearer for the first LPN. When the DRB bearer in the bearer established by the first UE-relay is a downlink DRB bearer, an idle downlink resource of the first LPN is used for the DRB bearer, so that uplink resources of the base station are prevented from being used to establish a DRB bearer for the first LPN, and backhaul load on the uplink resources of the base station is reduced.

It should be noted that the first S1 configuration information of the second to-be-established bearer is actually first S1 configuration information of some first to-be-established bearers that can be established by the first UE-relay and that are determined by the first LPN.

Optionally, the offloading bearer configuration message may further include a traffic flow template of the first UE-relay, and the traffic flow template of the first UE-relay is used to instruct the first UE-relay to establish a mapping relationship between the DRB bearer and the S1 bearer in the service bearer, so that a correspondence between a wired bearer and a radio bearer in a data transmission process is learned expressly, data misrepresentation is avoided, and data transmission reliability is further improved.

According to the backhaul link establishment method provided in this embodiment of the present disclosure, a base station sends, to a first UE-relay, an offloading configuration message that carries an ID of a second to-be-established bearer, DRB configuration information of the second to-be-established bearer, and first S1 configuration information of the second to-be-established bearer, so that the first UE-relay establishes a service bearer for a first LPN according to the offloading bearer configuration message. According to the method provided in this embodiment of the present disclosure, a UE-relay is deployed in a network, and an offloading bearer is established, by using the UE-relay and with reference to an idle uplink/downlink resource and fixed-network resource of a first LPN, for the LPN that is in the network and whose backhaul capacity is limited, so that impact on uplink-downlink resources of a base station that is caused by a prior-art backhaul link between the base station and the LPN is reduced, backhaul load on the uplink-downlink resources of the base station is reduced, and reliable data transmission is ensured.

Figure 9A:
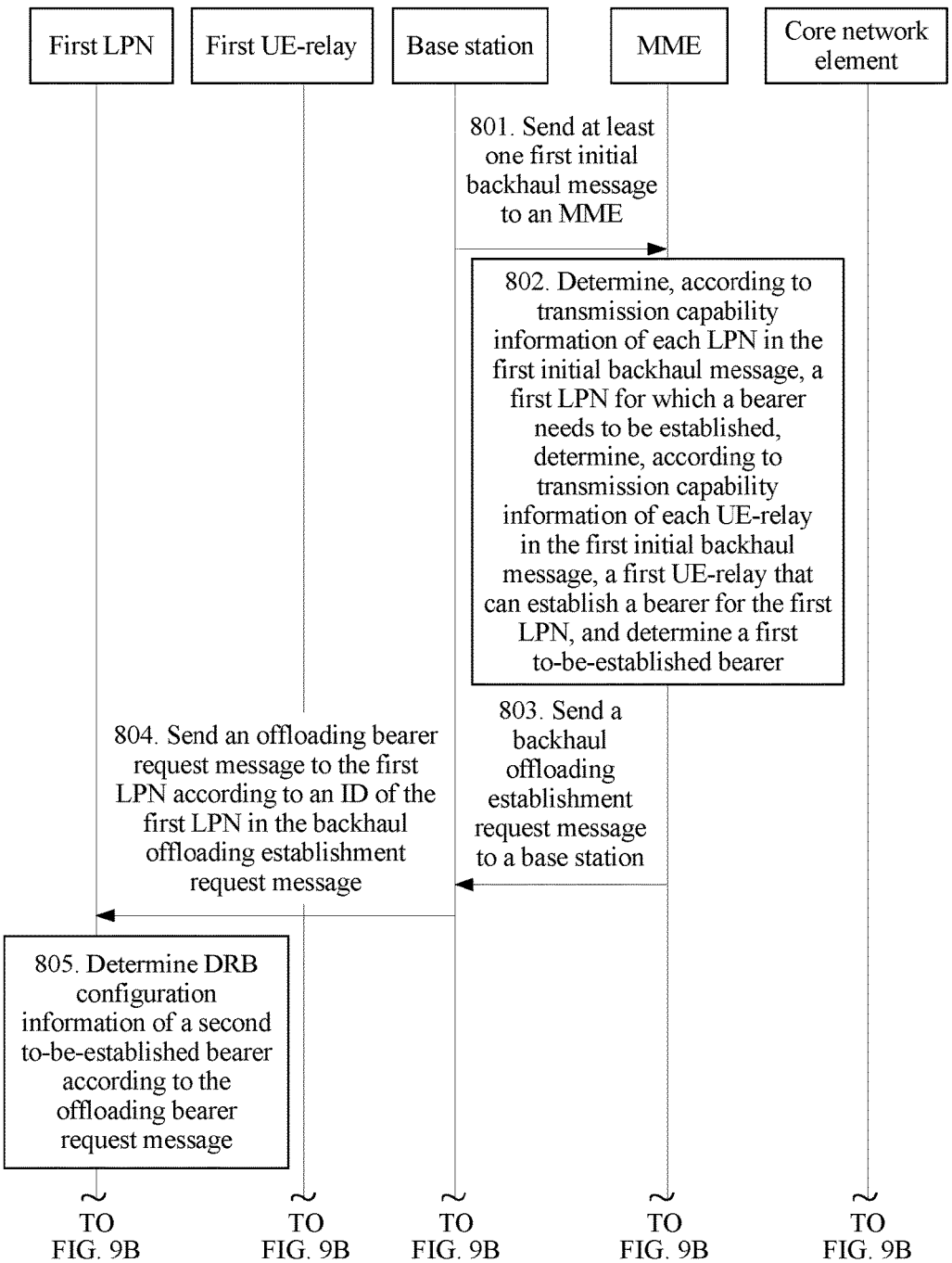
FIG. 9A, FIG. 9B, and FIG. 9C are a signaling flowchart of Embodiment 8 of a backhaul link establishment method according to the embodiments of the present disclosure.
Figure 9B:
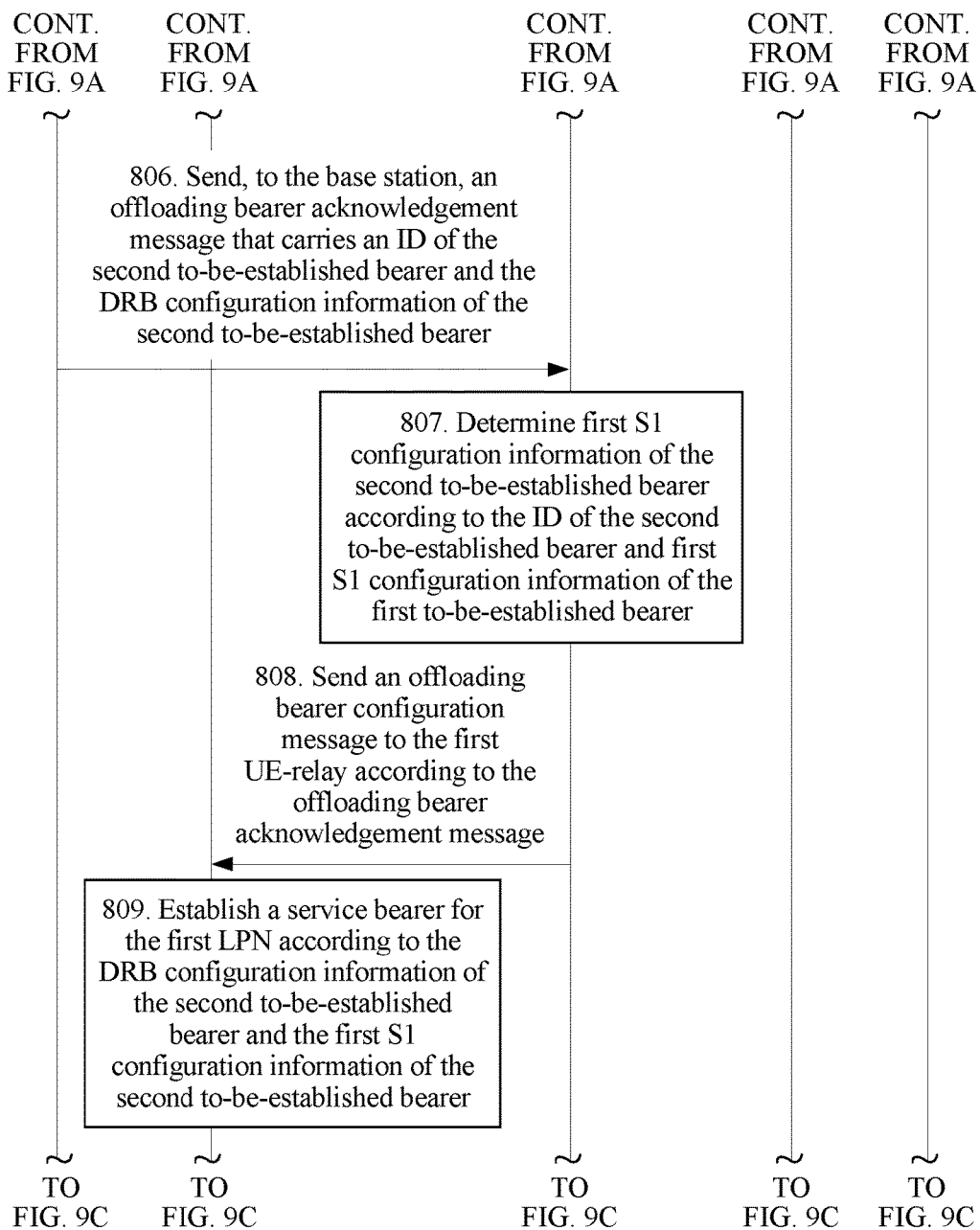
Figure 9C:
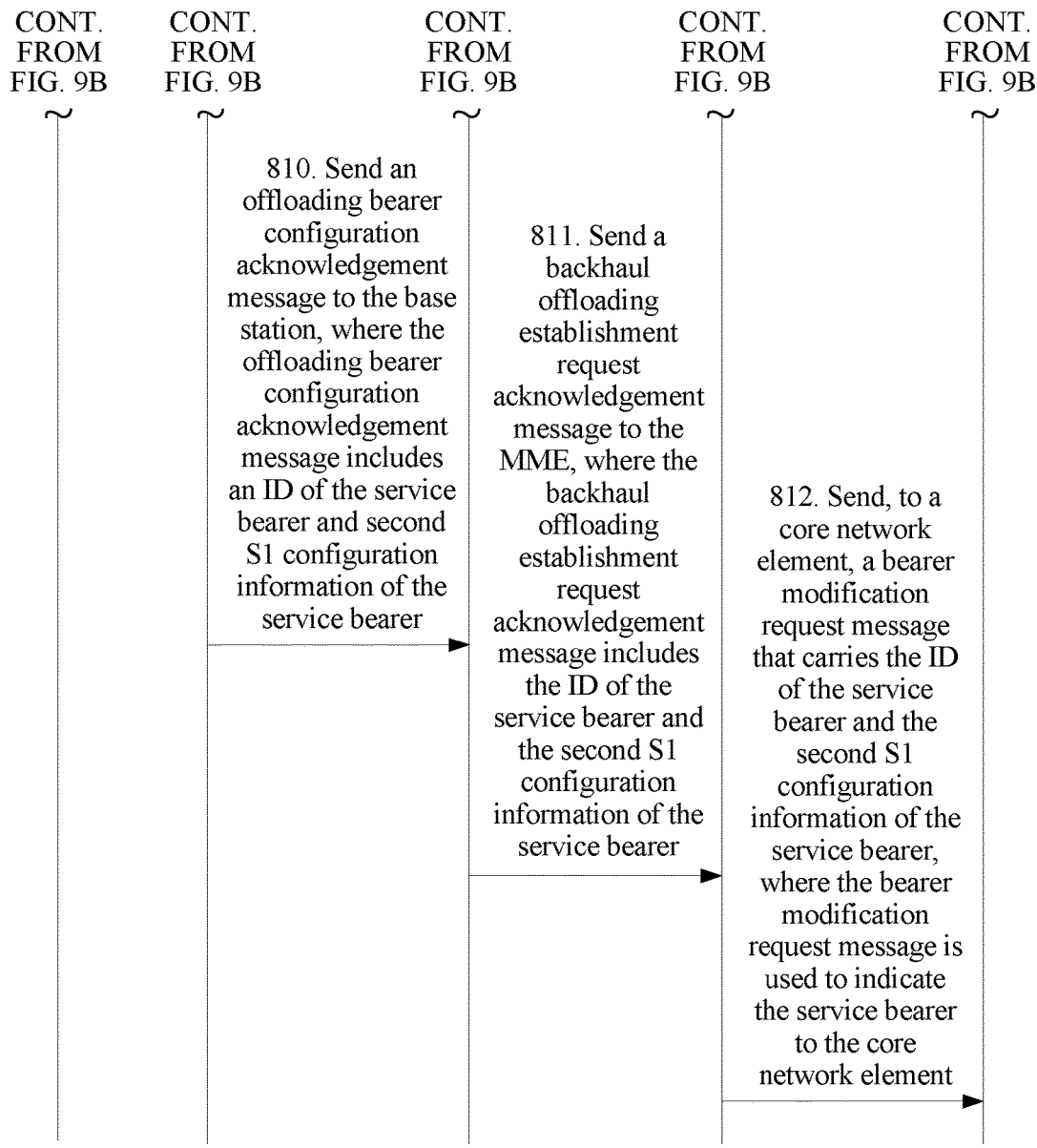

FIG. 9A, FIG. 9B, and FIG. 9C are a signaling flowchart of Embodiment 8 of a backhaul link establishment method according to the embodiments of the present disclosure. This embodiment involves a specific process in which a first UE-relay establishes a bearer for a first LPN when no bearer is established between the first LPN and a base station or between the first LPN and a core network element. As shown in FIG. 9A, FIG. 9B, and FIG. 9C, the method includes the following steps.

S801. The base station sends at least one first initial backhaul message to an MME.

Each first initial backhaul message includes an ID of one LPN, an ID of at least one UE-relay, transmission capability information of the LPN, and transmission capability information of each UE-relay.

S802. The MME determines, according to transmission capability information of each LPN in the first initial backhaul message, the first LPN for which a bearer needs to be established, determines, according to transmission capability information of each UE-relay in the first initial backhaul message, the first UE-relay that can establish a bearer for the first LPN, and determines a first to-be-established bearer.

S803. The MME sends a backhaul offloading establishment request message to the base station.

The backhaul offloading establishment request message includes an ID of the first LPN, an ID of the first UE-relay, an ID of the first to-be-established bearer of the first LPN, first S1 configuration information of the first to-be-established bearer, and an indicator for a QoS requirement that the first to-be-established bearer needs to meet, and the indicator for the QoS requirement that the first to-be-established bearer needs to meet is the QoS requirement that the first to-be-established bearer needs to meet.

S804. The base station sends an offloading bearer request message to the first LPN according to an ID of the first LPN in the backhaul offloading establishment request message.

The offloading bearer request message includes the ID of the first to-be-established bearer, the ID of the first UE-relay, and the QoS requirement that the first to-be-established bearer needs to meet.

S805. The first LPN determines DRB configuration information of a second to-be-established bearer according to the offloading bearer request message.

The second to-be-established bearer is a bearer that can be established by the UE-relay and that is determined by the first LPN from the first to-be-established bearer of the first LPN according to the offloading bearer request message.

S806. The first LPN sends, to the base station, an offloading bearer acknowledgement message that carries an ID of the second to-be-established bearer and the DRB configuration information of the second to-be-established bearer.

S807. The base station determines first S1 configuration information of the second to-be-established bearer according to the ID of the second to-be-established bearer and first S1 configuration information of the first to-be-established bearer.

S808. The base station sends an offloading bearer configuration message to the first UE-relay according to the offloading bearer acknowledgement message.

The offloading bearer configuration message includes the ID of the second to-be-established bearer, the DRB configuration information of the second to-be-established bearer, and the first S1 configuration information of the second to-be-established bearer, and the offloading bearer configuration message is used to instruct the first UE-relay to establish a bearer for the first LPN.

S809. The first UE-relay establishes a service bearer for the first LPN according to the DRB configuration information of the second to-be-established bearer and the first S1 configuration information of the second to-be-established bearer.

S810. The first UE-relay sends an offloading bearer configuration acknowledgement message to the base station, where the offloading bearer configuration acknowledgement message includes an ID of the service bearer and second S1 configuration information of the service bearer.

S811. The base station sends a backhaul offloading establishment request acknowledgement message to the MME, where the backhaul offloading establishment request acknowledgement message includes the ID of the service bearer and the second S1 configuration information of the service bearer.

S812. The MME sends, to the core network element, a bearer modification request message that carries the ID of the service bearer and the second S1 configuration information of the service bearer, where the bearer modification request message is used to indicate the service bearer to the core network element.

For a specific execution process of S801 to S812, refer to specific descriptions in the foregoing embodiment. Implementation principles and technical effects thereof are similar, and details are not described herein again.

Figure 10A:
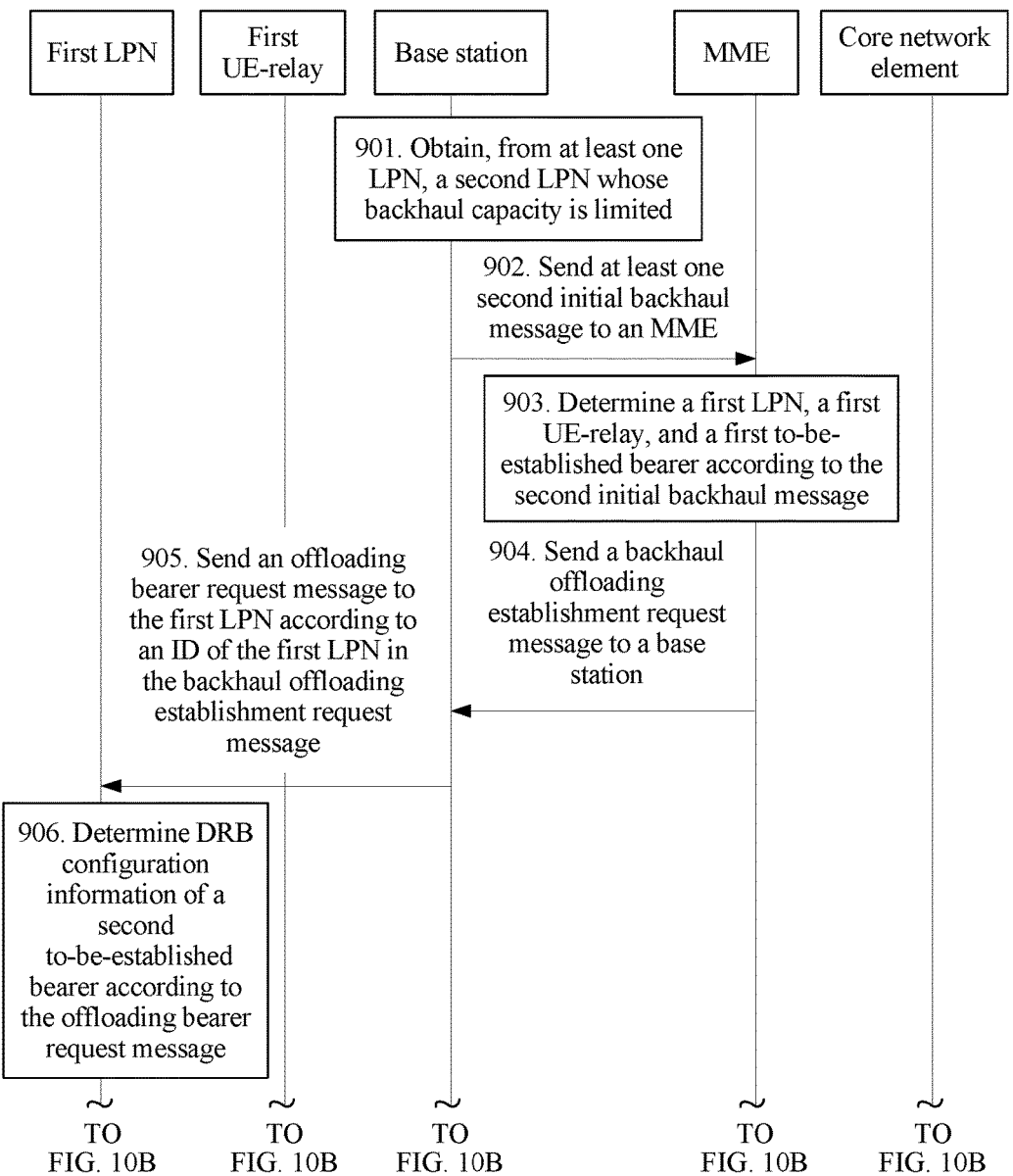
FIG. 10A, FIG. 10B, and FIG. 10C are a signaling flowchart of Embodiment 9 of a backhaul link establishment method according to the embodiments of the present disclosure.
Figure 10B:
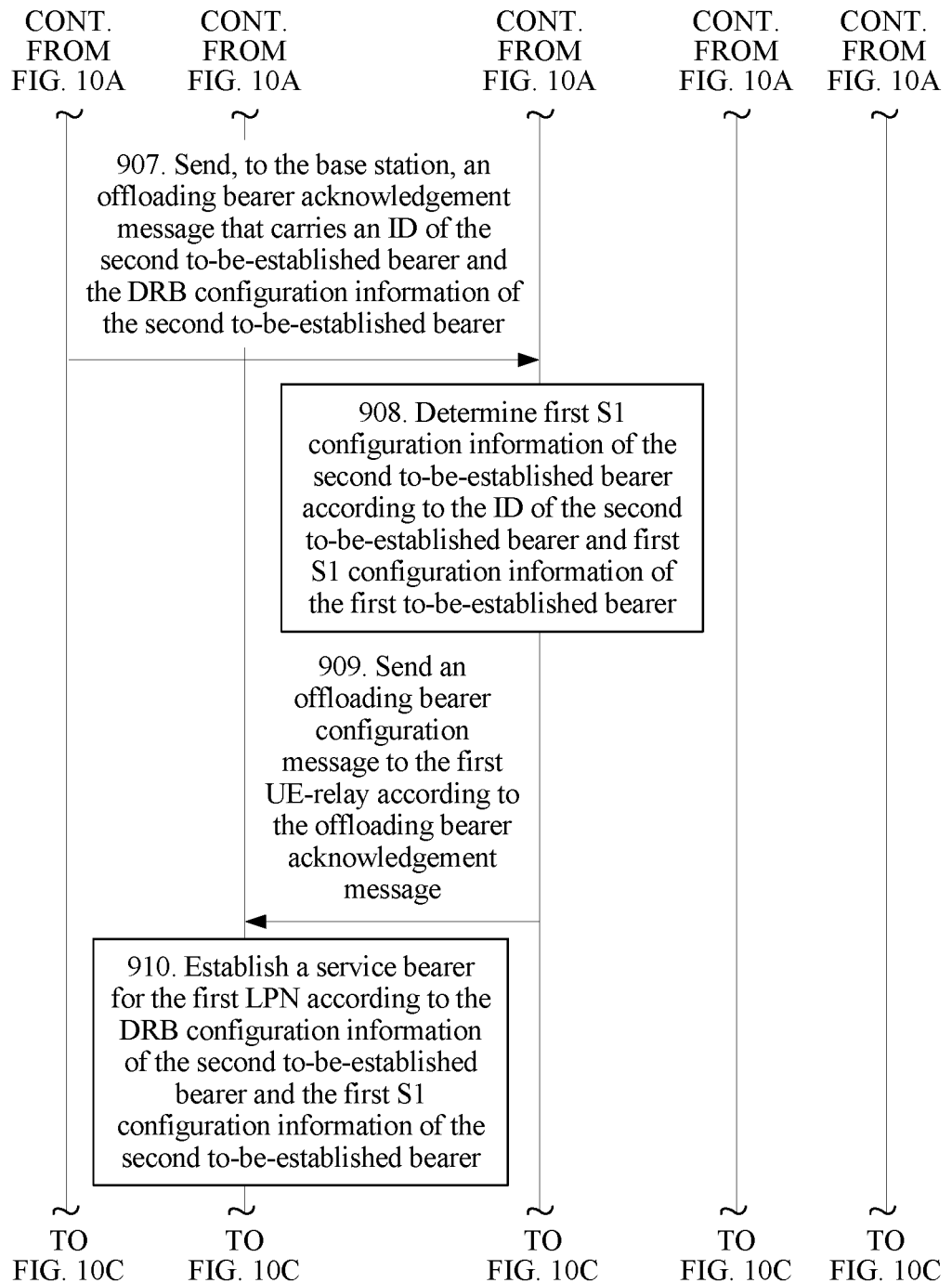
Figure 10C:
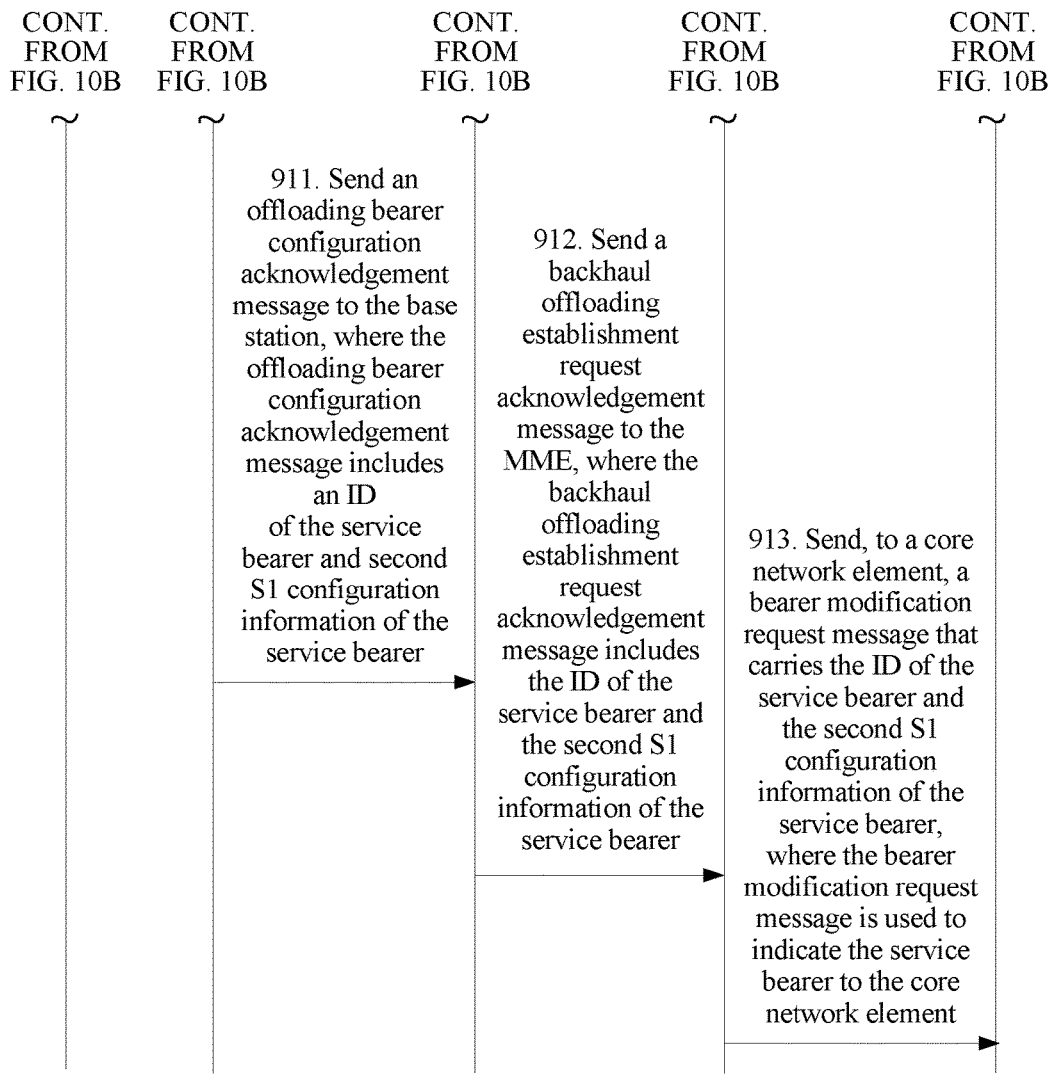
Figure 11:
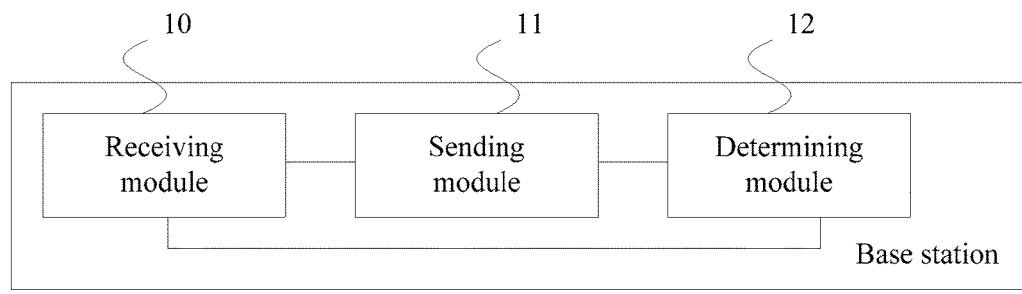
FIG. 11 is a schematic structural diagram of Embodiment 1 of a base station according to the embodiments of the present disclosure.
Figure 12:
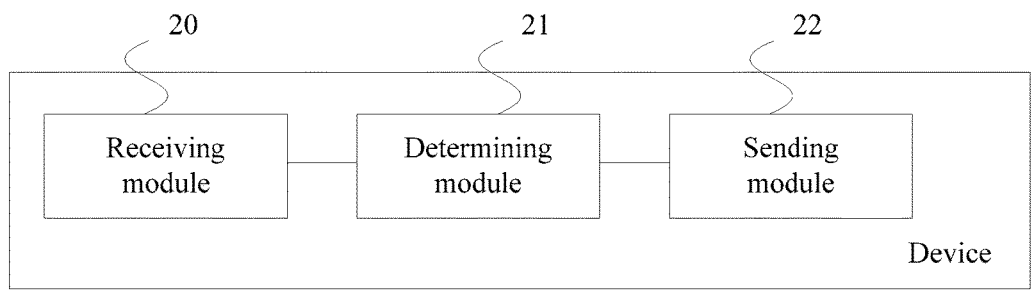
FIG. 12 is a schematic structural diagram of Embodiment 1 of a device according to the embodiments of the present disclosure.
Figure 13:
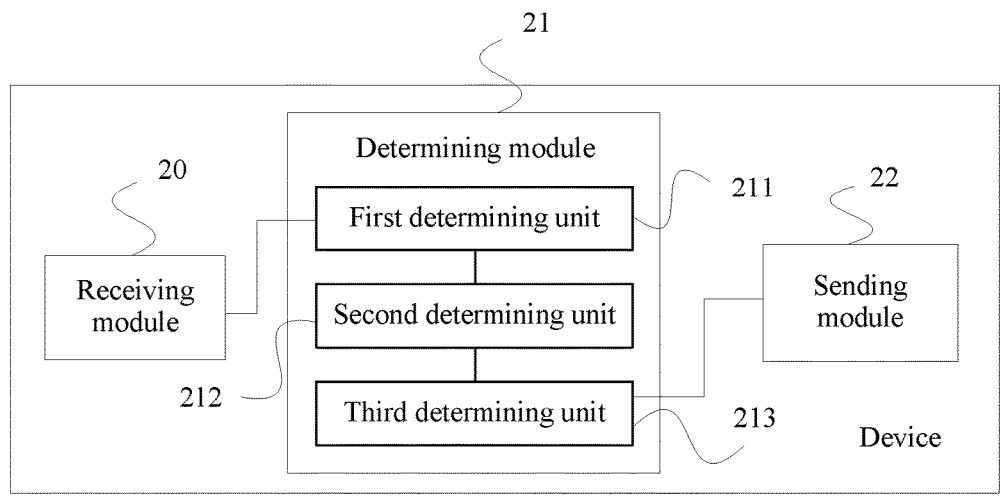
FIG. 13 is a schematic structural diagram of Embodiment 2 of a device according to the embodiments of the present disclosure.
Figure 14:
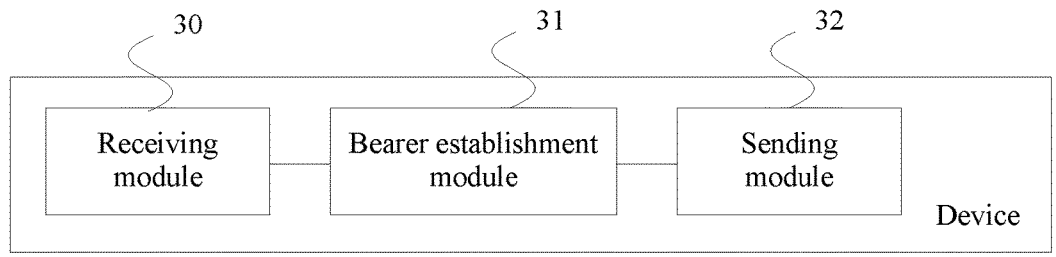
FIG. 14 is a schematic structural diagram of Embodiment 3 of a device according to the embodiments of the present disclosure.

FIG. 10A, FIG. 10B, and FIG. 10C are a signaling flowchart of Embodiment 9 of a backhaul link establishment method according to the embodiments of the present disclosure. This embodiment involves a specific process in which after a base station learns that backhaul capacities of some LPNs in a network are limited, a UE-relay offloads the LPNs whose backhaul capacities are limited. As shown in FIG. 10A, FIG. 10B, and FIG. 10C, the method includes the following steps.

S901. The base station obtains, from at least one LPN, a second LPN whose backhaul capacity is limited.

S902. The base station sends at least one second initial backhaul message to an MME.

Each second initial backhaul message includes an ID of one second LPN, an ID of at least one UE-relay, transmission capability information of the second LPN, transmission capability information of each UE-relay, and an ID of a first to-be-offloaded bearer of the second LPN.

S903. The MME determines a first LPN, a first UE-relay, and a first to-be-established bearer according to the second initial backhaul message.

Specifically, the MME determines, according to transmission capability information of each second LPN in the second initial backhaul message, the first LPN for which an offloading bearer needs to be established, determines, according to the transmission capability information of each UE-relay in a second initial backhaul message, the first UE-relay that can establish an offloading bearer for the first LPN, determines, from a first to-be-offloaded bearer of the first LPN according to an ID of the first to-be-offloaded bearer and transmission capability information of the first UE-relay and/or transmission capability information of the first LPN, a second to-be-offloaded bearer that can be offloaded by using the first UE-relay, and determines the first to-be-established bearer corresponding to the second to-be-offloaded bearer.

S904. The MME sends a backhaul offloading establishment request message to the base station.

The backhaul offloading establishment request message includes an ID of the first LPN, an ID of the first UE-relay, an ID of the first to-be-established bearer of the first LPN, first S1 configuration information of the first to-be-established bearer, and an indicator for a QoS requirement that the first to-be-established bearer needs to meet. The indicator for the QoS requirement that the first to-be-established bearer needs to meet is an ID of the second to-be-offloaded bearer.

S905. The base station sends an offloading bearer request message to the first LPN according to an ID of the first LPN in the backhaul offloading establishment request message.

The offloading bearer request message includes the ID of the first to-be-established bearer, the ID of the first UE-relay, and the ID of the second to-be-offloaded bearer.

S906. The first LPN determines DRB configuration information of a second to-be-established bearer according to the offloading bearer request message.

The second to-be-established bearer is a bearer that can be established by the UE-relay and that is determined by the first LPN from the first to-be-established bearer of the first LPN according to the offloading bearer request message.

S907. The first LPN sends, to the base station, an offloading bearer acknowledgement message that carries an ID of the second to-be-established bearer and the DRB configuration information of the second to-be-established bearer.

S908. The base station determines first S1 configuration information of the second to-be-established bearer according to the ID of the second to-be-established bearer and first S1 configuration information of the first to-be-established bearer.

S909. The base station sends an offloading bearer configuration message to the first UE-relay according to the offloading bearer acknowledgement message.

The offloading bearer configuration message includes the ID of the second to-be-established bearer, the DRB configuration information of the second to-be-established bearer, and the first S1 configuration information of the second to-be-established bearer, and the offloading bearer configuration message is used to instruct the first UE-relay to establish a bearer for the first LPN.

S910. The first UE-relay establishes a service bearer for the first LPN according to the DRB configuration information of the second to-be-established bearer and the first S1 configuration information of the second to-be-established bearer.

S911. The first UE-relay sends an offloading bearer configuration acknowledgement message to the base station, where the offloading bearer configuration acknowledgement message includes an ID of the service bearer and second S1 configuration information of the service bearer.

S912. The base station sends a backhaul offloading establishment request acknowledgement message to the MME, where the backhaul offloading establishment request acknowledgement message includes the ID of the service bearer and the second S1 configuration information of the service bearer.

S913. The MME sends, to a core network element, a bearer modification request message that carries the ID of the service bearer and the second S1 configuration information of the service bearer, where the bearer modification request message is used to indicate the service bearer to the core network element.

For a specific execution process of S901 to S913, refer to specific descriptions in the foregoing embodiment. Implementation principles and technical effects thereof are similar, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The storage medium includes any medium that can store program code, such as a ROM, a RAM, a magnetic disk, or an optical disc.

Figure 15:
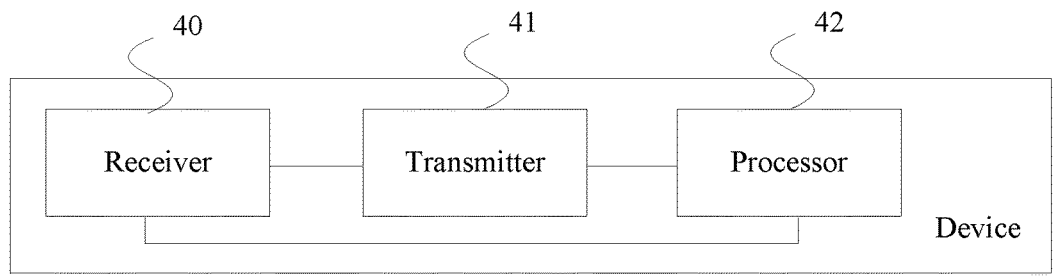
FIG. 15 is a schematic structural diagram of Embodiment 2 of a base station according to the embodiments of the present disclosure.

FIG. 15 is a schematic structural diagram of Embodiment 2 of a base station according to the embodiments of the present disclosure. The base station is applicable to the network, shown in FIG. 1, for deploying a small cell, the network includes at least one UE-relay, at least one LPN, the base station, an MME, and a core network element, the UE-relay is wiredly connected to the core network element, and the UE-relay is wirelessly connected to the LPN. As shown in FIG. 15, the base station includes a receiver 40, a transmitter 41, and a processor 42.

The receiver 40 is configured to receive a backhaul offloading establishment request message sent by the MME, where the backhaul offloading establishment request message includes an identity ID of a first LPN, an ID of a first UE-relay, an ID of a first to-be-established bearer of the first LPN, first S1 configuration information of the first to-be-established bearer, and an indicator for a quality of service QoS requirement that the first to-be-established bearer needs to meet, the first LPN is one of the at least one LPN, and the first UE-relay is one of the at least one UE-relay.

The transmitter 41 is configured to send an offloading bearer request message to the first LPN according to the ID of the first LPN that is received by the receiver 40, where the offloading bearer request message carries the ID of the first UE-relay, the ID of the first to-be-established bearer, and the indicator for the QoS requirement that the first to-be-established bearer needs to meet, the offloading bearer request message is used to instruct the first LPN to determine data radio bearer DRB configuration information of a second to-be-established bearer, and the second to-be-established bearer is a bearer that can be established by the first UE-relay and that is determined by the first LPN from the first to-be-established bearer according to the indicator for the QoS requirement that the first to-be-established bearer needs to meet and the ID of the first to-be-established bearer that are in the offloading bearer request message.

The receiver 40 is further configured to receive an offloading bearer acknowledgement message that is sent by the first LPN and that carries the DRB configuration information of the second to-be-established bearer and an ID of the second to-be-established bearer.

The processor 42 is configured to determine first S1 configuration information of the second to-be-established bearer according to the ID of the second to-be-established bearer and the first S1 configuration information of the first to-be-established bearer that are received by the receiver 40.

The transmitter 41 is further configured to: send an offloading bearer configuration message to the first UE-relay according to the ID of the first UE-relay that is received by the receiver 40, where the offloading bearer configuration message includes the ID of the second to-be-established bearer, the DRB configuration information of the second to-be-established bearer, and the first S1 configuration information of the second to-be-established bearer, and the offloading bearer configuration message is used to instruct the first UE-relay to establish a service bearer for the first LPN; and send, to the core network element by using the MME, a received ID of the service bearer and received second S1 configuration information of the service bearer that are sent by the first UE-relay, where the ID of the service bearer is the ID of the second to-be-established bearer.

The base station provided in this embodiment of the present disclosure may execute the foregoing method embodiments. Implementation principles and technical effects thereof are similar, and details are not described herein again.

Further, the service bearer includes a DRB bearer that is established by the first UE-relay according to the DRB configuration information of the second to-be-established bearer, and an S1 bearer that is established by the first UE-relay according to the first S1 configuration information of the second to-be-established bearer.

Optionally, the transmitter 41 is further configured to: before the receiver 40 receives the backhaul offloading establishment request message sent by the MME, send at least one first initial backhaul message to the MME, where each first initial backhaul message includes an ID of one LPN, an ID of the at least one UE-relay, transmission capability information of the LPN, and transmission capability information of each UE-relay. The indicator for the QoS requirement that the first to-be-established bearer needs to meet is the QoS requirement that the first to-be-established bearer needs to meet, the first LPN is an LPN for which a bearer needs to be established and that is determined by the MME according to transmission capability information of each LPN, the ID of the first LPN is determined by the MME according to the transmission capability information of each LPN and an ID of each LPN, the first UE-relay is a UE-relay that can establish a bearer for the first LPN and that is determined by the MME according to the transmission capability information of each UE-relay, and the ID of the first UE-relay is determined by the MME according to the transmission capability information of each UE-relay and an ID of each UE-relay.

Optionally, the processor 42 is further configured to: before the receiver 40 receives the backhaul offloading establishment request message sent by the MME, obtain, from the at least one LPN, a second LPN whose backhaul capacity is limited. The transmitter 41 is further configured to send at least one second initial backhaul message to the MME, where each second initial backhaul message includes an ID of one second LPN, an ID of the at least one UE-relay, transmission capability information of the second LPN, transmission capability information of each UE-relay, and an ID of a first to-be-offloaded bearer of the second LPN.

The first LPN is an LPN for which an offloading bearer needs to be established and that is determined by the MME from the second LPN according to transmission capability information of each second LPN, the ID of the first LPN is determined by the MME according to the transmission capability information of each second LPN and an ID of each second LPN, the first UE-relay is a UE-relay that can establish an offloading bearer for the first LPN and that is determined by the MME according to the transmission capability information of each UE-relay, the ID of the first UE-relay is determined by the MME according to the transmission capability information of each UE-relay and an ID of each UE-relay, the first to-be-established bearer is an offloading bearer that is determined by the MME and that is corresponding to a second to-be-offloaded bearer of the first LPN, the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer and transmission capability information of the first UE-relay and/or transmission capability information of the first LPN, and the indicator for the QoS requirement that the first to-be-established bearer needs to meet is an ID of the second to-be-offloaded bearer.

Further, if a DRB bearer in the second to-be-offloaded bearer is a downlink DRB bearer, the DRB bearer in the service bearer is an uplink DRB bearer; or if a DRB bearer in the second to-be-offloaded bearer is an uplink DRB bearer, the DRB bearer in the service bearer is a downlink DRB bearer.

Still further, the backhaul offloading establishment request message further includes a traffic flow template of the first UE-relay, the offloading bearer configuration message further includes the traffic flow template of the first UE-relay, and the traffic flow template of the first UE-relay is used to instruct the first UE-relay to establish a mapping relationship between the DRB bearer and the S1 bearer in the service bearer.

The base station provided in this embodiment of the present disclosure may execute the foregoing method embodiments. Implementation principles and technical effects thereof are similar, and details are not described herein again.

Figure 16:
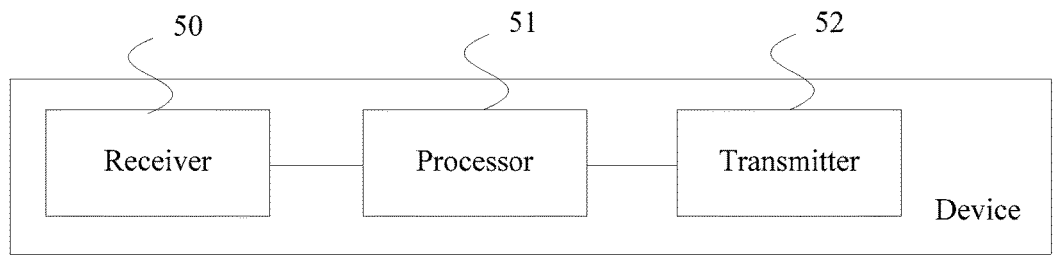
FIG. 16 is a schematic structural diagram of Embodiment 4 of a device according to the embodiments of the present disclosure.

FIG. 16 is a schematic structural diagram of Embodiment 4 of a device according to the embodiments of the present disclosure. The device may be a first LPN, the device is applicable to the network, shown in FIG. 1, for deploying a small cell, the network includes at least one UE-relay, at least one LPN, a base station, an MME, and a core network element, the UE-relay is wiredly connected to the core network element, the UE-relay is wirelessly connected to the LPN, and the first LPN is one of the at least one LPN. The device includes a receiver 50, a processor 51, and a transmitter 52.

The receiver 50 is configured to receive an offloading bearer request message that is sent by the base station according to an identity ID of the first LPN in a backhaul offloading establishment request message sent by the MME, where the backhaul offloading establishment request message includes the ID of the first LPN, an ID of a first UE-relay, an ID of a first to-be-established bearer of the first LPN, first S1 configuration information of the first to-be-established bearer, and an indicator for a quality of service QoS requirement that the first to-be-established bearer needs to meet, the offloading bearer request message carries the ID of the first UE-relay, the ID of the first to-be-established bearer of the first LPN, and the indicator for the QoS requirement that the first to-be-established bearer needs to meet, and the first UE-relay is one of the at least one UE-relay.

The processor 51 is configured to determine, according to the offloading bearer request message received by the receiver 50, data radio bearer DRB configuration information of a second to-be-established bearer that can be established by the first UE-relay, where the second to-be-established bearer is a bearer that can be established by the first UE-relay and that is determined by the first LPN from the first to-be-established bearer of the first LPN according to the indicator for the QoS requirement that the first to-be-established bearer needs to meet and the ID of the first to-be-established bearer that are in the offloading bearer request message.

The transmitter 52 is configured to send an offloading bearer acknowledgement message to the base station, where the offloading bearer acknowledgement message includes the DRB configuration information that is of the second to-be-established bearer and that is determined by the processor 51 and an ID of the second to-be-established bearer, the offloading bearer acknowledgement message is used to instruct the base station to send an offloading bearer configuration message to the first UE-relay according to the ID of the first UE-relay, the offloading bearer configuration message includes the ID of the second to-be-established bearer, the DRB configuration information of the second to-be-established bearer, and first S1 configuration information of the second to-be-established bearer, the offloading bearer configuration message is used to instruct the first UE-relay to establish a service bearer for the first LPN, and the first S1 configuration information of the second to-be-established bearer is determined by the base station according to the ID of the second to-be-established bearer and the first S1 configuration information of the first to-be-established bearer.

The device provided in this embodiment of the present disclosure may execute the foregoing method embodiments. Implementation principles and technical effects thereof are similar, and details are not described herein again.

Further, the service bearer includes a DRB bearer that is established by the first UE-relay according to the DRB configuration information of the second to-be-established bearer, and an S1 bearer that is established by the first UE-relay according to the first S1 configuration information of the second to-be-established bearer.

In a possible implementation of this embodiment of the present disclosure, the indicator for the QoS requirement that the first to-be-established bearer needs to meet is the QoS requirement that the first to-be-established bearer needs to meet, the first LPN is an LPN for which a bearer needs to be established and that is determined by the MME according to transmission capability information of an LPN in at least one first initial backhaul message sent by the base station, the ID of the first LPN is determined by the MME according to the transmission capability information of the LPN and an ID of the LPN, the first UE-relay is a UE-relay that can establish a bearer for the first LPN and that is determined by the MME according to transmission capability information of each UE-relay in the at least one first initial backhaul message sent by the base station, the ID of the first UE-relay is determined by the MME according to the transmission capability information of each UE-relay and an ID of each UE-relay, and each first initial backhaul message includes an ID of one LPN, an ID of the at least one UE-relay, transmission capability information of the LPN, and the transmission capability information of each UE-relay.

In another possible implementation of this embodiment of the present disclosure, the first LPN is an LPN for which an offloading bearer needs to be established and that is determined by the MME from a second LPN according to transmission capability information of the second LPN in at least one second initial backhaul message sent by the base station, the ID of the first LPN is determined by the MME according to the transmission capability information of the second LPN and an ID of the second LPN, and the second LPN is an LPN whose backhaul capacity is limited and that is determined by the base station from the at least one LPN.

The first UE-relay is a UE-relay that can establish an offloading bearer for the first LPN and that is determined by the MME according to transmission capability information of each UE-relay in the at least one second initial backhaul message sent by the base station, the ID of the first UE-relay is determined by the MME according to the transmission capability information of each UE-relay and an ID of each UE-relay, and each second initial backhaul message includes an ID of one second LPN, an ID of the at least one UE-relay, transmission capability information of the second LPN, the transmission capability information of each UE-relay, and an ID of a first to-be-offloaded bearer of the second LPN.

The first to-be-established bearer is an offloading bearer that is determined by the MME and that is corresponding to the second to-be-offloaded bearer, the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer of the first LPN and transmission capability information of the first UE-relay and/or transmission capability information of the first LPN, and the indicator for the QoS requirement that the first to-be-established bearer needs to meet is an ID of the second to-be-offloaded bearer.

Further, if a DRB bearer in the second to-be-offloaded bearer is a downlink DRB bearer, the DRB bearer in the service bearer is an uplink DRB bearer; or if a DRB bearer in the second to-be-offloaded bearer is an uplink DRB bearer, the DRB bearer in the service bearer is a downlink DRB bearer.

Still further, the processor 51 is specifically configured to: determine, according to the indicator for the QoS requirement that the first to-be-established bearer needs to meet, a DRB QoS requirement that the first to-be-established bearer needs to meet; obtain a status of an air interface between the first LPN and the first UE-relay, and establish the second to-be-established bearer according to the air interface status and the DRB QoS requirement that the first to-be-established bearer needs to meet; and determine the DRB configuration information of the second to-be-established bearer, where the second to-be-established bearer is a first to-be-established bearer that is determined by the first LPN from the first to-be-established bearer and whose DRB QoS requirement matches the air interface status.

The device provided in this embodiment of the present disclosure may execute the foregoing method embodiments. Implementation principles and technical effects thereof are similar, and details are not described herein again.

Figure 17:
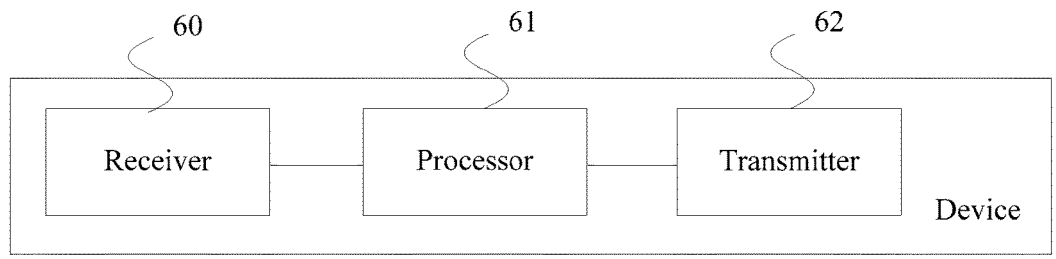
FIG. 17 is a schematic structural diagram of Embodiment 5 of a device according to the embodiments of the present disclosure.

FIG. 17 is a schematic structural diagram of Embodiment 5 of a device according to the embodiments of the present disclosure. The device may be a first UE-relay, the device is applicable to the network, shown in FIG. 1, for deploying a small cell, the network includes at least one UE-relay, at least one LPN, a base station, an MME, and a core network element, the UE-relay is wiredly connected to the core network element, the UE-relay is wirelessly connected to the LPN, and the first UE-relay is one of the at least one UE-relay. The device includes a receiver 60, a processor 61, and a transmitter 62.

The receiver 60 is configured to receive an offloading bearer configuration message that is sent by the base station according to an identity ID of the first UE-relay, where the offloading bearer configuration message includes an identity ID of a second to-be-established bearer, first S1 configuration information of the second to-be-established bearer, and data radio bearer DRB configuration information of the second to-be-established bearer, the second to-be-established bearer is a bearer that can be established by the first UE-relay and that is determined by a first LPN from a first to-be-established bearer of the first LPN according to an indicator for a quality of service QoS requirement that the first to-be-established bearer needs to meet and an ID of the first to-be-established bearer of the first LPN that are in an offloading bearer request message sent by the base station, the offloading bearer request message carries the ID of the first UE-relay, the ID of the first to-be-established bearer, and the indicator for the QoS requirement that the first to-be-established bearer needs to meet, the offloading bearer request message is used to instruct the first LPN to determine the DRB configuration information of the second to-be-established bearer, and the first LPN is one of the at least one LPN.

The processor 61 is configured to establish a service bearer for the first LPN according to the first S1 configuration information of the second to-be-established bearer and the DRB configuration information of the second to-be-established bearer that are received by the receiver 60.

The transmitter 62 is configured to send an ID of the service bearer established by the processor 61 and second S1 configuration information of the service bearer to the core network element by using the base station and the MME, where the ID of the service bearer is the ID of the second to-be-established bearer.

The device provided in this embodiment of the present disclosure may execute the foregoing method embodiments. Implementation principles and technical effects thereof are similar, and details are not described herein again.

Further, the processor 61 is specifically configured to: establish an S1 bearer between the first UE-relay and the core network element according to the first S1 configuration information that is of the second to-be-established bearer and that is received by the receiver 60, and establish a DRB bearer between the first UE-relay and the first LPN according to the DRB configuration information that is of the second to-be-established bearer and that is received by the receiver 60.

In a possible implementation of this embodiment of the present disclosure, the indicator for the QoS requirement that the first to-be-established bearer needs to meet is the QoS requirement that the first to-be-established bearer needs to meet.

The first LPN is an LPN for which an offloading bearer needs to be established and that is determined by the MME from an LPN according to transmission capability information of the LPN in at least one first initial backhaul message sent by the base station, an ID of the first LPN is determined by the MME according to the transmission capability information of the LPN and an ID of the LPN, the first UE-relay is a UE-relay that can establish a bearer for the first LPN and that is determined by the MME according to transmission capability information of each UE-relay in the at least one first initial backhaul message sent by the base station, the ID of the first UE-relay is determined by the MME according to the transmission capability information of each UE-relay and an ID of each UE-relay, and each first initial backhaul message includes an ID of one LPN, an ID of the at least one UE-relay, transmission capability information of the LPN, and the transmission capability information of each UE-relay.

In another possible implementation of this embodiment of the present disclosure, the indicator for the QoS requirement that the first to-be-established bearer needs to meet is an ID of a second to-be-offloaded bearer of the first LPN.

The first LPN is an LPN for which an offloading bearer needs to be established and that is determined by the MME from a second LPN according to transmission capability information of the second LPN in at least one second initial backhaul message sent by the base station, an ID of the first LPN is determined by the MME according to the transmission capability information of the second LPN and an ID of the second LPN, the second LPN is an LPN whose backhaul capacity is limited and that is determined by the base station from the at least one LPN, the first UE-relay is a UE-relay that can establish an offloading bearer for the first LPN and that is determined by the MME according to transmission capability information of each UE-relay in the at least one second initial backhaul message sent by the base station, the ID of the first UE-relay is determined by the MME according to the transmission capability information of each UE-relay and an ID of each UE-relay, and each second initial backhaul message includes an ID of one second LPN, an ID of the at least one UE-relay, transmission capability information of the second LPN, the transmission capability information of each UE-relay, and an ID of a first to-be-offloaded bearer of the second LPN.

The first to-be-established bearer is an offloading bearer that is determined by the MME and that is corresponding to the second to-be-offloaded bearer of the first LPN, and the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer of the first LPN and transmission capability information of the first UE-relay and/or transmission capability information of the first LPN.

Further, if a DRB bearer in the second to-be-offloaded bearer is a downlink DRB bearer, the DRB bearer in the service bearer is an uplink DRB bearer; or if a DRB bearer in the second to-be-offloaded bearer is an uplink DRB bearer, the DRB bearer in the service bearer is a downlink DRB bearer.

Still further, the offloading bearer configuration message further includes a traffic flow template of the first UE-relay, and the traffic flow template of the first UE-relay is used to instruct the first UE-relay to establish a mapping relationship between the DRB bearer and the S1 bearer in the service bearer.

The device provided in this embodiment of the present disclosure may execute the foregoing method embodiments. Implementation principles and technical effects thereof are similar, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A base station, applicable to a network for deploying a small cell, wherein the network comprises at least one user equipment relay (UE-relay), at least one low power node (LPN), the base station, a mobility management entity (MME), and a core network element, wherein the UE-relay is wiredly connected to the core network element and the UE-relay is wirelessly connected to the LPN, the base station comprising:
a receiver, configured to receive a backhaul offloading establishment request message sent by the MME, wherein the backhaul offloading establishment request message comprises an identity (ID) of a first LPN, an ID of a first UE-relay, an ID of a first to-be-established bearer of the first LPN, first S1 configuration information of the first to-be-established bearer, and an indicator for a quality of service (QoS) requirement of the first to-be-established bearer, wherein the first LPN is one of the at least one LPN and the first UE-relay is one of the at least one UE-relay;
a transmitter, configured to send an offloading bearer request message to the first LPN according to the ID of the first LPN received by the receiver, wherein the offloading bearer request message carries the ID of the first UE-relay, the ID of the first to-be-established bearer, and the indicator for the QoS requirement of the first to-be-established bearer, wherein the offloading bearer request message is used to instruct the first LPN to determine data radio bearer (DRB) configuration information of a second to-be-established bearer, and the second to-be-established bearer is a bearer that can be established by the first UE-relay and that is determined by the first LPN from the first to-be-established bearer according to the indicator for the QoS requirement of the first to-be-established bearer and the ID of the first to-be-established bearer that are in the offloading bearer request message;
wherein the receiver is further configured to receive an offloading bearer acknowledgement message sent by the first LPN that carries the DRB configuration information of the second to-be-established bearer and an ID of the second to-be-established bearer;
a processor, configured to determine first S1 configuration information of the second to-be-established bearer according to the ID of the second to-be-established bearer and the first S1 configuration information of the first to-be-established bearer that are received by the receiver; and
wherein the transmitter is further configured to:
send an offloading bearer configuration message to the first UE-relay according to the ID of the first UE-relay that is received by the receiver, wherein the offloading bearer configuration message comprises the ID of the second to-be-established bearer, the DRB configuration information of the second to-be-established bearer, and the first S1 configuration information of the second to-be-established bearer, and the offloading bearer configuration message is used to instruct the first UE-relay to establish a service bearer for the first LPN, and
send, to the core network element by using the MME, a received ID of the service bearer and received second S1 configuration information of the service bearer that are sent by the first UE-relay, wherein the ID of the service bearer is the ID of the second to-be-established bearer.

2. The base station according to claim 1, wherein the service bearer comprises:
a DRB bearer established by the first UE-relay according to the DRB configuration information of the second to-be-established bearer; and an S1 bearer established by the first UE-relay according to the first S1 configuration information of the second to-be-established bearer.

3. The base station according to claim 2, wherein:
the transmitter is further configured to: before the receiver receives the backhaul offloading establishment request message sent by the MME, send at least one first initial backhaul message to the MME, wherein each first initial backhaul message comprises an ID of one LPN, an ID of the at least one UE-relay, transmission capability information of the LPN, and transmission capability information of each UE-relay;
the first LPN is an LPN for which a bearer needs to be established and that is determined by the MME according to transmission capability information of each LPN, and the ID of the first LPN is determined by the MME according to the transmission capability information of each LPN and an ID of each LPN; and
the first UE-relay is a UE-relay that can establish a bearer for the first LPN and that is determined by the MME according to the transmission capability information of each UE-relay, and the ID of the first UE-relay is determined by the MME according to the transmission capability information of each UE-relay and an ID of each UE-relay.

4. The base station according to claim 2, wherein:
the processor is further configured to: before the receiver receives the backhaul offloading establishment request message sent by the MME, obtain, from the at least one LPN, a second LPN whose backhaul capacity is limited;
the transmitter is further configured to send at least one second initial backhaul message to the MME, wherein each second initial backhaul message comprises an ID of one second LPN, an ID of the at least one UE-relay, transmission capability information of the second LPN, transmission capability information of each UE-relay, and an ID of a first to-be-offloaded bearer of the second LPN;
the first LPN is an LPN for which an offloading bearer needs to be established and that is determined by the MME from the second LPN according to transmission capability information of each second LPN, and the ID of the first LPN is determined by the MME according to the transmission capability information of each second LPN and an ID of each second LPN;
the first UE-relay is a UE-relay that can establish an offloading bearer for the first LPN and that is determined by the MME according to the transmission capability information of each UE-relay, and the ID of the first UE-relay is determined by the MME according to the transmission capability information of each UE-relay and an ID of each UE-relay;
the first to-be-established bearer is an offloading bearer determined by the MME and corresponding to a second to-be-offloaded bearer of the first LPN, the second to-be-offloaded bearer is a to-be-offloaded bearer that can be offloaded by using the first UE-relay and that is determined by the MME from a first to-be-offloaded bearer of the first LPN according to an ID of the first to-be-offloaded bearer and transmission capability information of the first UE-relay and/or transmission capability information of the first LPN, and the indicator for the QoS requirement of the first to-be-established bearer is an ID of the second to-be-offloaded bearer.

5. The base station according to claim 4, wherein:
if a DRB bearer in the second to-be-offloaded bearer is a downlink DRB bearer, the DRB bearer in the service bearer is an uplink DRB bearer; and
if a DRB bearer in the second to-be-offloaded bearer is an uplink DRB bearer, the DRB bearer in the service bearer is a downlink DRB bearer.

6. The base station according to claim 2, wherein:
the backhaul offloading establishment request message further comprises a traffic flow template of the first UE-relay;
the offloading bearer configuration message further comprises the traffic flow template of the first UE-relay; and
the traffic flow template of the first UE-relay is used to instruct the first UE-relay to establish a mapping relationship between the DRB bearer and the S1 bearer in the service bearer.

7. A first low power node (LPN) applicable to a network for deploying a small cell, wherein the network comprises at least one user equipment relay (UE-relay), at least one LPN, a base station, a mobility management entity (MME), and a core network element, and the UE-relay is wiredly connected to the core network element and the UE-relay is wirelessly connected to the LPN, the first LPN is one of the at least one LPN, the first LPN comprising:
a receiver, configured to receive an offloading bearer request message sent by the base station according to an identity (ID) of the first LPN in a backhaul offloading establishment request message sent by the MME, wherein the backhaul offloading establishment request message comprises the ID of the first LPN, an ID of a first UE-relay, an ID of a first to-be-established bearer of the first LPN, first S1 configuration information of the first to-be-established bearer, and an indicator for a quality of service (QoS) requirement of the first to-be-established bearer, the offloading bearer request message carries the ID of the first UE-relay, the ID of the first to-be-established bearer of the first LPN, and the indicator for the QoS requirement of the first to-be-established bearer, and wherein the first UE-relay is one of the at least one UE-relay;
a processor, configured to determine, according to the offloading bearer request message received by the receiver, data radio bearer (DRB) configuration information of a second to-be-established bearer that can be established by the first UE-relay, wherein the second to-be-established bearer is determined by the first LPN from the first to-be-established bearer of the first LPN according to the indicator for the QoS requirement of the first to-be-established bearer and the ID of the first to-be-established bearer that are in the offloading bearer request message; and
a transmitter, configured to send an offloading bearer acknowledgement message to the base station, wherein the offloading bearer acknowledgement message comprises the DRB configuration information of the second to-be-established bearer and that is determined by the processor and an ID of the second to-be-established bearer, the offloading bearer acknowledgement message is used to instruct the base station to send an offloading bearer configuration message to the first UE-relay according to the ID of the first UE-relay, the offloading bearer configuration message comprises the ID of the second to-be-established bearer, the DRB configuration information of the second to-be-established bearer, and first S1 configuration information of the second to-be-established bearer, the offloading bearer configuration message is used to instruct the first UE-relay to establish a service bearer for the first LPN, and the first S1 configuration information of the second to-be-established bearer is determined by the base station according to the ID of the second to-be-established bearer and the first S1 configuration information of the first to-be-established bearer.

8. The LPN according to claim 7, wherein the service bearer comprises:
a DRB bearer established by the first UE-relay according to the DRB configuration information of the second to-be-established bearer; and
an S1 bearer established by the first UE-relay according to the first S1 configuration information of the second to-be-established bearer.

9. A first user equipment relay (UE-relay) applicable to a network for deploying a small cell, wherein the network comprises at least one UE-relay, at least one low power node (LPN), a base station, a mobility management entity (MME), and a core network element, the UE-relay is wiredly connected to the core network element and the UE-relay is wirelessly connected to the LPN, the first UE-relay is one of the at least one UE-relay, the first UE-relay comprising:
a receiver, configured to receive an offloading bearer configuration message sent by the base station according to an identity ID of the first UE-relay, wherein the offloading bearer configuration message comprises an identity ID of a second to-be-established bearer, first S1 configuration information of the second to-be-established bearer, and data radio bearer (DRB) configuration information of the second to-be-established bearer, the second to-be-established bearer is a bearer that can be established by the first UE-relay and determined by a first LPN from a first to-be-established bearer of the first LPN according to an indicator for a quality of service (QoS) requirement of the first to-be-established bearer and an ID of the first to-be-established bearer of the first LPN that are in an offloading bearer request message sent by the base station, the offloading bearer request message carries the ID of the first UE-relay, the ID of the first to-be-established bearer, and the indicator for the QoS requirement of the first to-be-established bearer, the offloading bearer request message is used to instruct the first LPN to determine the DRB configuration information of the second to-be-established bearer, and the first LPN is one of the at least one LPN;
a processor, configured to establish a service bearer for the first LPN according to the first S1 configuration information of the second to-be-established bearer and the DRB configuration information of the second to-be-established bearer that are received by the receiver; and
a transmitter, configured to send an ID of the service bearer established by the processor and second S1 configuration information of the service bearer to the core network element by using the base station and the MME, wherein the ID of the service bearer is the ID of the second to-be-established bearer.

10. The device according to claim 9, wherein the processor is configured to:
establish an S1 bearer between the first UE-relay and the core network element according to the first S1 configuration information of the second to-be-established bearer and that is received by the receiver; and
establish a DRB bearer between the first UE-relay and the first LPN according to the DRB configuration information of the second to-be-established bearer and that is received by the receiver.

11. A backhaul link establishment method for use in a network for deploying a small cell, wherein the network comprises at least one user equipment relay (UE-relay), at least one low power node (LPN), a base station, a mobility management entity (MME), and a core network element, the UE-relay is wiredly connected to the core network element and the UE-relay is wirelessly connected to the LPN, the method comprising:
receiving, by the base station, a backhaul offloading establishment request message sent by the MME, wherein the backhaul offloading establishment request message comprises an identity (ID) of a first LPN, an ID of a first UE-relay, an ID of a first to-be-established bearer of the first LPN, first S1 configuration information of the first to-be-established bearer, and an indicator for a quality of service (QoS) requirement of the first to-be-established bearer, the first LPN is one of the at least one LPN, and the first UE-relay is one of the at least one UE-relay;
sending, by the base station, an offloading bearer request message to the first LPN according to the ID of the first LPN, wherein the offloading bearer request message carries the ID of the first UE-relay, the ID of the first to-be-established bearer, and the indicator for the QoS requirement of the first to-be-established bearer, the offloading bearer request message is used to instruct the first LPN to determine data radio bearer (DRB) configuration information of a second to-be-established bearer, and the second to-be-established bearer is a bearer that can be established by the first UE-relay and determined by the first LPN from the first to-be-established bearer according to the indicator for the QoS requirement of the first to-be-established bearer and the ID of the first to-be-established bearer that are in the offloading bearer request message;
receiving, by the base station, an offloading bearer acknowledgement message sent by the first LPN and that carries the DRB configuration information of the second to-be-established bearer and an ID of the second to-be-established bearer;
determining, by the base station, first S1 configuration information of the second to-be-established bearer according to the ID of the second to-be-established bearer and the first S1 configuration information of the first to-be-established bearer;
sending, by the base station, an offloading bearer configuration message to the first UE-relay according to the ID of the first UE-relay, wherein the offloading bearer configuration message comprises the ID of the second to-be-established bearer, the DRB configuration information of the second to-be-established bearer, and the first S1 configuration information of the second to-be-established bearer, and wherein the offloading bearer configuration message is used to instruct the first UE-relay to establish a service bearer for the first LPN; and
sending, by the base station to the core network element by using the MME, a received ID of the service bearer and received second S1 configuration information of the service bearer that are sent by the first UE-relay, wherein the ID of the service bearer is the ID of the second to-be-established bearer.

12. The method according to claim 11, wherein the service bearer comprises:
- a DRB bearer established by the first UE-relay according to the DRB configuration information of the second to-be-established bearer; and
- an S1 bearer established by the first UE-relay according to the first S1 configuration information of the second to-be-established bearer.

13. The method according to claim 12, wherein before receiving, by the base station, a backhaul offloading establishment request message sent by the MME, the method further comprises:
- obtaining, by the base station from the at least one LPN, a second LPN whose backhaul capacity is limited; and
- sending, by the base station, at least one second initial backhaul message to the MME, wherein each second initial backhaul message comprises an ID of one second LPN, an ID of the at least one UE-relay, transmission capability information of the second LPN, transmission capability information of each UE-relay, and an ID of a first to-be-offloaded bearer of the second LPN;
- wherein the first LPN is an LPN for which an offloading bearer needs to be established and is determined by the MME from the second LPN according to transmission capability information of each second LPN, the ID of the first LPN is determined by the MME according to the transmission capability information of each second LPN and an ID of each second LPN;
- wherein the first UE-relay is a UE-relay that can establish an offloading bearer for the first LPN and is determined by the MME according to the transmission capability information of each UE-relay, the ID of the first UE-relay is determined by the MME according to the transmission capability information of each UE-relay and an ID of each UE-relay; and
- wherein the first to-be-established bearer is an offloading bearer that is determined by the MME and that is corresponding to a second to-be-offloaded bearer of the first LPN, the second to-be-offloaded bearer is a to-be-offloaded bearer that can be offloaded by using the first UE-relay and is determined by the MME from a first to-be-offloaded bearer of the first LPN according to an ID of the first to-be-offloaded bearer and transmission capability information of the first UE-relay and/or transmission capability information of the first LPN, and the indicator for the QoS requirement of the first to-be-established bearer is an ID of the second to-be-offloaded bearer.

14. The method according to claim 13, wherein:
- if a DRB bearer in the second to-be-offloaded bearer is a downlink DRB bearer, the DRB bearer in the service bearer is an uplink DRB bearer; and
- if a DRB bearer in the second to-be-offloaded bearer is an uplink DRB bearer, the DRB bearer in the service bearer is a downlink DRB bearer.

15. The method according to claim 12, wherein:
- the backhaul offloading establishment request message further comprises a traffic flow template of the first UE-relay;
- the offloading bearer configuration message further comprises the traffic flow template of the first UE-relay; and
- the traffic flow template of the first UE-relay is used to instruct the first UE-relay to establish a mapping relationship between the DRB bearer and the S1 bearer in the service bearer.

16. A backhaul link establishment method for use in a network for deploying a small cell, wherein the network comprises at least one user equipment relay (UE-relay), at least one low power node (LPN), a base station, a mobility management entity (MME), and a core network element, the UE-relay is wiredly connected to the core network element and the UE-relay is wirelessly connected to the LPN, the method comprising:
- receiving, by a first LPN, an offloading bearer request message sent by the base station according to an identity (ID) of the first LPN in a backhaul offloading establishment request message sent by the MME, wherein the backhaul offloading establishment request message comprises the ID of the first LPN, an ID of a first UE-relay, an ID of a first to-be-established bearer of the first LPN, first S1 configuration information of the first to-be-established bearer, and an indicator for a quality of service (QoS) requirement of the first to-be-established bearer, the offloading bearer request message carries the ID of the first UE-relay, the ID of the first to-be-established bearer of the first LPN, and the indicator for the QoS requirement of the first to-be-established bearer, and wherein the first LPN is one of the at least one LPN, and the first UE-relay is one of the at least one UE-relay;
- determining, by the first LPN according to the offloading bearer request message, data radio bearer (DRB) configuration information of a second to-be-established bearer that can be established by the first UE-relay, wherein the second to-be-established bearer is a bearer that can be established by the first UE-relay and is determined by the first LPN from the first to-be-established bearer of the first LPN according to the indicator for the QoS requirement of the first to-be-established bearer and the ID of the first to-be-established bearer that are in the offloading bearer request message; and
- sending, by the first LPN, an offloading bearer acknowledgement message to the base station, wherein the offloading bearer acknowledgement message comprises the DRB configuration information of the second to-be-established bearer and an ID of the second to-be-established bearer, the offloading bearer acknowledgement message is used to instruct the base station to send an offloading bearer configuration message to the first UE-relay according to the ID of the first UE-relay, the offloading bearer configuration message comprises the ID of the second to-be-established bearer, the DRB configuration information of the second to-be-established bearer, and first S1 configuration information of the second to-be-established bearer, the offloading bearer configuration message is used to instruct the first UE-relay to establish a service bearer for the first LPN, wherein and the first S1 configuration information of the second to-be-established bearer is determined by the base station according to the ID of the second to-be-established bearer and the first S1 configuration information of the first to-be-established bearer.

17. The method according to claim 16, wherein the service bearer comprises:
- a DRB bearer established by the first UE-relay according to the DRB configuration information of the second to-be-established bearer; and
- an S1 bearer established by the first UE-relay according to the first S1 configuration information of the second to-be-established bearer.

18. The method according to claim 17, wherein:

the first LPN is an LPN for which an offloading bearer needs to be established and is determined by the MME from a second LPN according to transmission capability information of the second LPN in at least one second initial backhaul message sent by the base station, the ID of the first LPN is determined by the MME according to the transmission capability information of the second LPN and an ID of the second LPN, and the second LPN is an LPN whose backhaul capacity is limited and determined by the base station from the at least one LPN;

the first UE-relay is a UE-relay that can establish an offloading bearer for the first LPN and is determined by the MME according to transmission capability information of each UE-relay in the at least one second initial backhaul message sent by the base station, the ID of the first UE-relay is determined by the MME according to the transmission capability information of each UE-relay and an ID of each UE-relay, and each second initial backhaul message comprises an ID of one second LPN, an ID of the at least one UE-relay, transmission capability information of the second LPN, the transmission capability information of each UE-relay, and an ID of a first to-be-offloaded bearer of the second LPN; and the first to-be-established bearer is an offloading bearer determined by the MME and that is corresponding to the second to-be-offloaded bearer, the second to-be-offloaded bearer is a to-be-offloaded bearer that can be offloaded by using the first UE-relay and determined by the MME from a first to-be-offloaded bearer of the first LPN according to an ID of the first to-be-offloaded bearer of the first LPN and transmission capability information of the first UE-relay and/or transmission capability information of the first LPN, and the indicator for the QoS requirement of the first to-be-established bearer is an ID of the second to-be-offloaded bearer.

19. A backhaul link establishment method for use in a network for deploying a small cell, wherein the network comprises at least one user equipment relay (UE-relay), at least one low power node (LPN), a base station, a mobility management entity (MME), and a core network element, the UE-relay is wiredly connected to the core network element and the UE-relay is wirelessly connected to the LPN, the method comprising:

receiving, by a first UE-relay, an offloading bearer configuration message sent by the base station according to an identity (ID) of the first UE-relay, wherein the offloading bearer configuration message comprises an identity ID of a second to-be-established bearer, first S1 configuration information of the second to-be-established bearer, and data radio bearer (DRB) configuration information of the second to-be-established bearer, the second to-be-established bearer is a bearer that can be established by the first UE-relay and determined by a first LPN from a first to-be-established bearer of the first LPN according to an indicator for a quality of service (QoS) requirement of the first to-be-established bearer and an ID of the first to-be-established bearer of the first LPN that are in an offloading bearer request message sent by the base station, the offloading bearer request message carries the ID of the first UE-relay, the ID of the first to-be-established bearer, and the indicator for the QoS requirement of the first to-be-established bearer, the offloading bearer request message is used to instruct the first LPN to determine the DRB configuration information of the second to-be-established bearer, the first LPN is one of the at least one LPN, and the first UE-relay is one of the at least one UE-relay;

establishing, by the first UE-relay, a service bearer for the first LPN according to the first S1 configuration information of the second to-be-established bearer and the DRB configuration information of the second to-be-established bearer; and sending, by the first UE-relay, an ID of the service bearer and second S1 configuration information of the service bearer to the core network element by using the base station and the MME, wherein the ID of the service bearer is the ID of the second to-be-established bearer.

20. The method according to claim 19, wherein establishing, by the first UE-relay, a service bearer for the first LPN according to the first S1 configuration information of the second to-be-established offloading bearer and the DRB configuration information of the second to-be-established bearer comprises:

establishing, by the first UE-relay, an S1 bearer between the first UE-relay and the core network element according to the first S1 configuration information of the second to-be-established bearer; and establishing, by the first UE-relay, a DRB bearer between the first UE-relay and the first LPN according to the DRB configuration information of the second to-be-established bearer.

* * * * *